US010640649B2

(12) United States Patent
Sheiko et al.

(10) Patent No.: US 10,640,649 B2
(45) Date of Patent: May 5, 2020

(54) SOLVENT-FREE SUPERSOFT AND SUPERELASTIC MATERIALS

(71) Applicant: The University of North Carolina at Chapel Hill, Chapel Hill, NC (US)

(72) Inventors: Sergei Sheiko, Chapel Hill, NC (US); Mohammad Vatankhah Varnoosfaderani, Carrboro, NC (US); Will Daniel, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 129 days.

(21) Appl. No.: 15/742,741

(22) PCT Filed: Jul. 22, 2016

(86) PCT No.: PCT/US2016/043692
§ 371 (c)(1),
(2) Date: Jan. 8, 2018

(87) PCT Pub. No.: WO2017/015614
PCT Pub. Date: Jan. 26, 2017

(65) Prior Publication Data
US 2018/0201785 A1 Jul. 19, 2018

Related U.S. Application Data

(60) Provisional application No. 62/196,183, filed on Jul. 23, 2015.

(51) Int. Cl.
| | |
|---|---|
| C08G 77/442 | (2006.01) |
| C08F 230/08 | (2006.01) |
| C08L 83/06 | (2006.01) |
| C08F 220/16 | (2006.01) |
| C08F 236/02 | (2006.01) |
| C08F 2/48 | (2006.01) |
| C08K 5/00 | (2006.01) |

(52) U.S. Cl.
CPC .............. *C08L 83/06* (2013.01); *C08F 2/48* (2013.01); *C08F 220/16* (2013.01); *C08F 230/08* (2013.01); *C08F 236/02* (2013.01); *C08G 77/442* (2013.01); *C08K 5/0025* (2013.01)

(58) Field of Classification Search
CPC .................................................. C08F 230/08
USPC ........................................................ 526/279
See application file for complete search history.

(56) References Cited

U.S. PATENT DOCUMENTS

| | | | |
|---|---|---|---|
| 4,153,641 A | 5/1979 | Deichert et al. | |
| 4,743,667 A | 5/1988 | Mizutani et al. | |
| 5,260,000 A * | 11/1993 | Nandu | B29D 11/00932 264/2.1 |
| 5,807,944 A | 9/1998 | Hirt et al. | |
| 7,019,082 B2 | 3/2006 | Matyjaszewski et al. | |
| 7,585,900 B2 * | 9/2009 | Cordova | A61L 27/16 523/107 |
| 9,086,528 B2 * | 7/2015 | Jan | C08F 230/08 |
| 2007/0222094 A1 | 9/2007 | Alli et al. | |
| 2008/0231798 A1 * | 9/2008 | Zhou | C08F 283/12 351/159.33 |
| 2010/0144958 A1 | 6/2010 | Findlay et al. | |
| 2012/0220743 A1 * | 8/2012 | Francis | C08F 230/08 526/279 |
| 2012/0220744 A1 * | 8/2012 | Liu | G02B 1/043 526/279 |
| 2012/0309919 A1 * | 12/2012 | Laredo | A61L 27/16 526/279 |
| 2013/0131275 A1 | 5/2013 | Tillman et al. | |
| 2013/0172504 A1 | 7/2013 | Phelan | |
| 2014/0198294 A1 | 7/2014 | Nakamura et al. | |
| 2015/0094393 A1 * | 4/2015 | Holland | C08L 83/04 522/66 |

FOREIGN PATENT DOCUMENTS

| | | |
|---|---|---|
| EP | 16828649.0 | 2/2018 |
| WO | WO-2014/082786 A2 | 6/2014 |
| WO | PCT/US2016/043692 | 7/2016 |

OTHER PUBLICATIONS

"Improving the Structural Control of Graft Copolymers by Combining ATRP with the Macromonomer Method" authored by Shinoda et al. and published in Macromolecules (2001) 34, 3186-3194.*
Product data sheet for Gelsest MCR-M17 (no date).*
Anseth, K.S. et al., Mechanical Properties of Hydrogels and Their Experimental Determination. Biomaterials. 1996; 17(17):1647-57.
Baumberger, T. et al., Solvent Control of Crack Dynamics in a Reversible Hydrogel. Nat Mater. 2006; 5(7):552-5.
Discher, D.E. et al., Tissue Cells Feel and Respond to the Stiffness of Their Substrate. Science. 2005; 310(5751):1139-43.
Drury, J.L. and Mooney, D.J., Hydrogels for Tissue Engineering: Scaffold Design Variables and Applications. Biomaterials. 2003; 24(24):4337-51.
Langer, R. and Tirrel, D.A., Designing Materials for Biology and Medicine. Nature. 2004. 428:487-92.
Levental, I. et al., Soft Biological Materials and Their Impact on Cell Function. Soft Matter. 2007; 3:299-306.
Morrison and Boyd, Organic Chemistry, (5th Ed., 1987), Ch. 13, entitled "Aromaticity," pp. 477-497.
Pelham, R.J., Jr. and Wang, Yl, Cell Locomotion and Focal Adhesions are Regulated Substrate Flexibility. Proc Natl Acad Sci USA. 1997; 94(25):13661-5.

(Continued)

*Primary Examiner* — Marc S Zimmer
(74) *Attorney, Agent, or Firm* — Ballard Spahr LLP

(57) ABSTRACT

The invention generally relates to compositions comprising polymer bottle brush and comb networks and methods of making polymer networks. Specifically, the disclosed polymer networks are prepared by polymerizing a siloxane monomer in the presence of a crosslinker. Alternatively, the disclosed polymer networks can be prepared by polymerizing a siloxane monomer in the presence of a radical initiator. This abstract is intended as a scanning tool for purposes of searching in the particular art and is not intended to be limiting of the present invention.

17 Claims, 8 Drawing Sheets

(56) References Cited

OTHER PUBLICATIONS

Rus, D. and Tolley, M.T., Design, Fabrication and control of Soft Robots. Nature. 2015; 521(7553):467-75.
Van Diest, P.J. et al., Pathology of Silicone Leakage from Breast Implants. J Clin Pathol. 1998; 51(7):493-7.
Wichterle, O. and Lim, D., Hydrophilic Gels for Biological Use. Nature. 1960; 185:117-8.
Williams, D.F., On the Mechanisms of Biocompatibility. Biomaterials. 2003; 29(20):2941-53.
International Search Report and Written Opinion dated Oct. 6, 2016 by the International Searching Authority for Patent Application No. PCT/US2016/043692, which was filed on Jul. 22, 2016 and published as WO 2017/015614 on Jan. 26, 2017 (Inventor—Sheiko et al.; Applicant—University of North Carolina at Chapel Hill) (8 pages).
International Preliminary Report on Patentability dated Jan. 23, 2018 by the International Searching Authority for Patent Application No. PCT/US2016/043692, which was filed on Jul. 22, 2016 and published as WO 2017/015614 on Jan. 26, 2017 (Inventor—Sheiko et al.; Applicant—University of North Carolina at Chapel Hill) (7 pages).
European Search Report and Written Opinion dated Mar. 14, 2019 by the European Patent Office for Patent Application No. 16828649.0, which was filed on Jul. 22, 2016 and published as EP 3325541 on May 30, 2018 (Inventor—Sheiko et al.; Applicant—The University of North Carolina at Chapel Hill) (9 pages).
U.S. Appl. No. 62/196,183, filed Jul. 23, 2015, Sergei Sheiko (Univ. of North Carolina at Chapel.

* cited by examiner

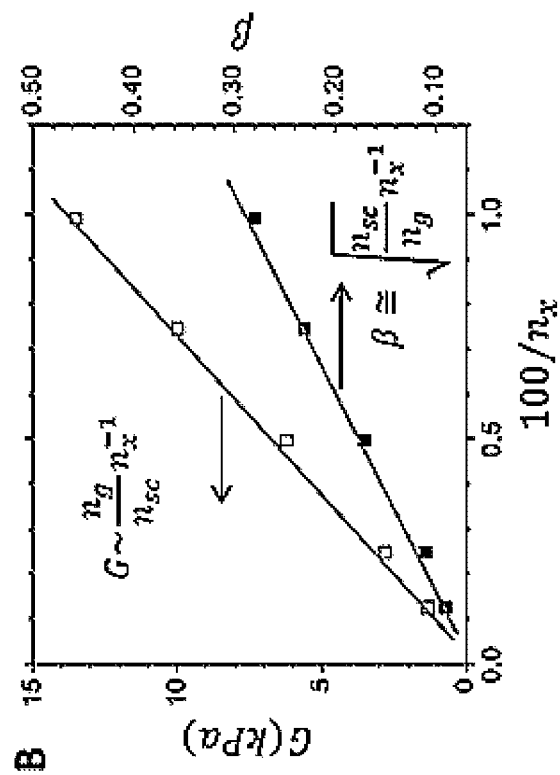
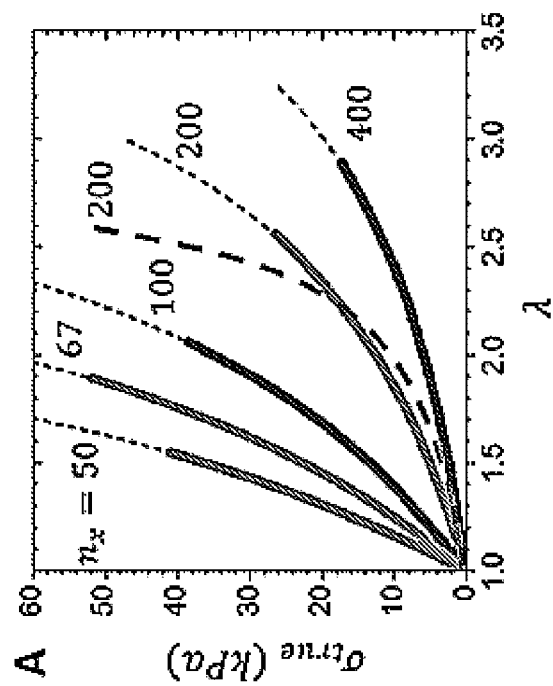
FIG. 3B
FIG. 3A

SOLVENT-FREE SUPERSOFT AND SUPERELASTIC MATERIALS

CROSS-REFERENCE TO RELATED APPLICATIONS

This Application is a national phase filing under 35 U.S.C. § 371 of International Application No. PCT/US2016/043692, filed on Jul. 22, 2016, which claims the benefit of U.S. Provisional Application No. 62/196,183, filed on Jul. 23, 2015, the contents of which are incorporated herein by reference in their entireties.

STATEMENT REGARDING FEDERALLY SPONSORED RESEARCH

This invention was made with government support under Grant No. DMR 1436201 and DMR 1407645 awarded by the National Science Foundation. The government has certain rights in the invention.

BACKGROUND

Soft elastic materials with a Young's modulus below 1 atm (100 kPa) are vital for the creation of biocompatible implants, substrates, and robots with mechanical properties matching that of live cells, tissues, and organs (Levental, I. et al. (2007) *Soft Matter* 3: 299-306; Williams, D. F. (2008) *Biomaterials* 29: 2941-2953; Rus and Tolley (2015) *Nature* 521: 467-475; Drury and Mooney (2003) *Biomaterials* 24: 4337-4351). Currently, polymer gels are the only viable class of synthetic materials for low modulus applications, yet with a caveat: their properties are entirely dependent on the fraction of solvent in the system (Langer and Tirrel (2004) *Nature* 428: 487-492; Wichterle and Lim (1960) *Nature* 185: 117-118; Pelham and Wang (1997) *PNAS* 94: 13661-13665; Discher et al. (2005) *Science* 310: 1139-1143; Anseth et al. (1996) *Biomaterials* 17: 1647-1657; Baumberger et al. (2006) *Nature Mater.* 5: 552-555). Solvent is a potential source for various complications including phase separation, drying, and leakage upon deformation that not only compromise the gel elasticity, but may also elicit severe inflammatory response in surrounding tissues (Van Diest et al. (1998) *J Clin. Pathol.* 51: 493-497).

To lower the modulus of elastomers, one possible approach is to prepare a crosslinked gel from a solution of linear polymers at a low concentration at which they are not entangled, and then graft linear polymers from the network strands between crosslinks. These grafted polymers make the network strand "fat," effectively increasing its molecular weight, lowering the density of crosslinks, and thus lowering the shear modulus. After removing the solvent molecules, one obtains a "dry," yet soft network. Despite these advances, the scope of this approach has remained limited due its complex and expensive synthesis, as well as the biocompatibility of the gel due to residual solvent molecules. Accordingly, there remains a need for soft, solvent-free, and biocompatible elastomers.

SUMMARY

In accordance with the purpose(s) of the invention, as embodied and broadly described herein, the invention, in one aspect, relates to methods of preparing elastomeric compositions.

Disclosed are compositions comprising a polymer network, wherein the polymer network comprises the reaction product of: (a) a monomer having a structure represented by a formula:

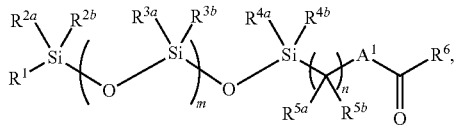

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

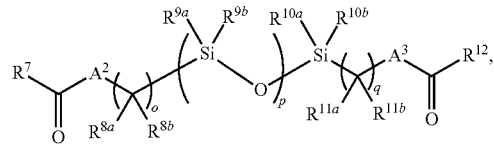

wherein each of o and q is independently an integer selected from 0, 1, 2, 3, 4, and 5; wherein p is an integer selected from 2 to 800; wherein each of $A^2$ and $A^3$ is selected from O and NH; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

Also disclosed are compositions comprising a polymer network, wherein the polymer network comprises the reaction product of: (a) a monomer having a structure represented by a formula:

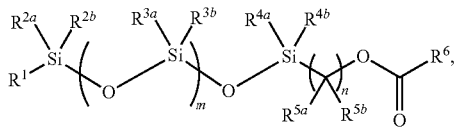

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

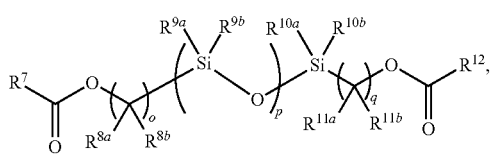

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

Also disclosed are compositions comprising a polymer network, wherein the polymer network comprises at least one residue having a structure represented by a formula:

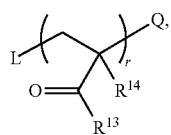

wherein each occurrence of $R^{13}$ is a structure represented by a formula selected from:

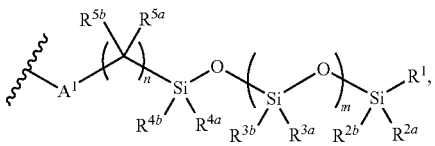

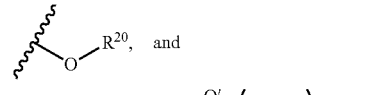

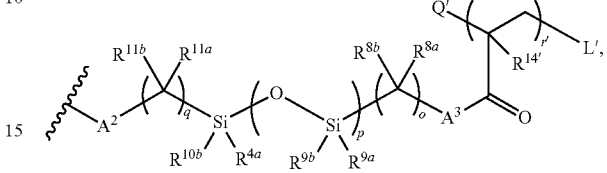

provided that at least one occurrence of $R^{13}$ is a structure represented by a formula selected from:

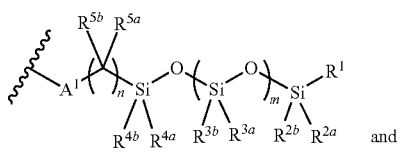

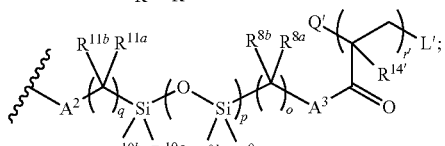

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of $A^1$, $A^2$, and $A^3$ is independently selected from O and NH; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; wherein each occurrence of $R^{14}$ and $R^{14'}$ is independently selected from hydrogen and C1-C10 alkyl; and wherein each occurrence of $R^{20}$ is independently selected from C1-C10 alkyl, $Cy^1$, and $Ar^1$.

Also disclosed are compositions comprising a polymer network, wherein the polymer network comprises at least one residue having a structure represented by a formula:

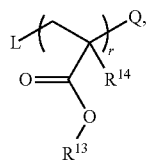

wherein each occurrence of $R^{13}$ is a structure represented by a formula selected from:

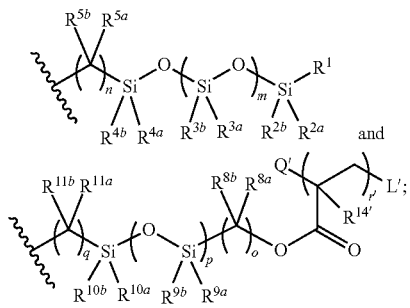

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; and wherein each occurrence of $R^{14}$ and $R^{14'}$ is independently selected from hydrogen and C1-C10 alkyl.

Also disclosed are methods of making a polymer network, the method comprising polymerizing a mixture comprising: (a) a monomer having a structure represented by a formula:

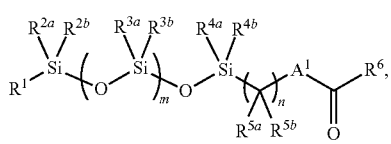

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl, wherein the unsaturated bond is alpha to the carbonyl; (b) a cross-linker having a structure represented by a formula:

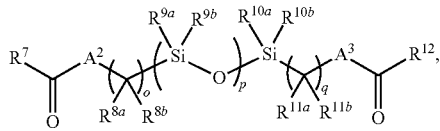

wherein each of o and q is independently an integer selected from 0, 1, 2, 3, 4, and 5; wherein p is an integer selected from 2 to 800; wherein each of $A^2$ and $A^3$ is selected from O and NH; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl; and (c) optionally, a diluent monomer having a structure represented by a formula:

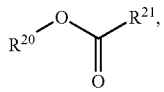

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl.

Also disclosed are methods of making a polymer network, the method comprising polymerizing a mixture comprising: (a) a monomer having a structure represented by a formula:

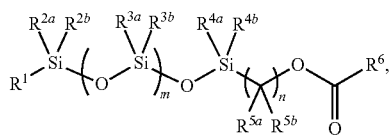

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl, wherein the unsaturated bond is alpha to the carbonyl; and (b) a cross-linker having a structure represented by a formula:

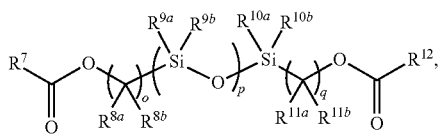

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

Also disclosed are methods of making a polymer network, the method comprising polymerizing a mixture comprising: (a) a monomer having a structure represented by a formula:

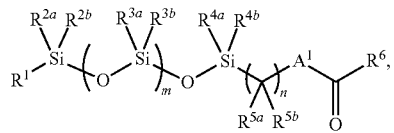

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl and C2-C10 alkynyl; (b) a radical initiator; and (c) optionally, a diluent monomer having a structure represented by a formula:

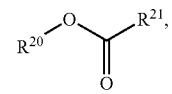

wherein $R^{20}$ is selected from C1-C10 alkyl, $Cy^1$, and $Ar^1$; and wherein $R^{20}$ is C2-C10 alkenyl, wherein the unsaturated bond is alpha to the carbonyl.

Also disclosed are methods of making a polymer network, the method comprising polymerizing a mixture comprising: (a) a monomer having a structure represented by a formula:

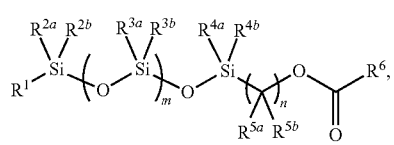

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl and C2-C10 alkynyl; and (b) a radical initiator.

Also disclosed are two- and three-dimensional tissue scaffolds comprising the disclosed compositions.

Also disclosed are implants comprising the disclosed compositions.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

FIG. 3A shows representative data presenting true stress as a function of uniaxial extension upon tensile deformation of bottlebrush elastomers with different cross-link densities ($\sim n_x^{-1}$) and side-chain lengths ($\sim n_{sc}$). The solid and long dashed lines correspond to the elastomer series of samples with $n_{sc}=14$ and $n_{sc}=28$, respectively.

FIG. 3B shows representative data illustrating the shear modulus (G) and non-linearity parameter ($\beta$). G and $\beta$ were extracted from fitting the stress-strain curves in (A) with Eq. 1 (short dashed lines) and plotted as a function of the crosslink density ($n_x^{-1}$). In agreement with theoretical predictions, both properties increase linearly with increasing cross-link density and exhibit linear dependence with $n_x^{-1}$.

Figure 1A:
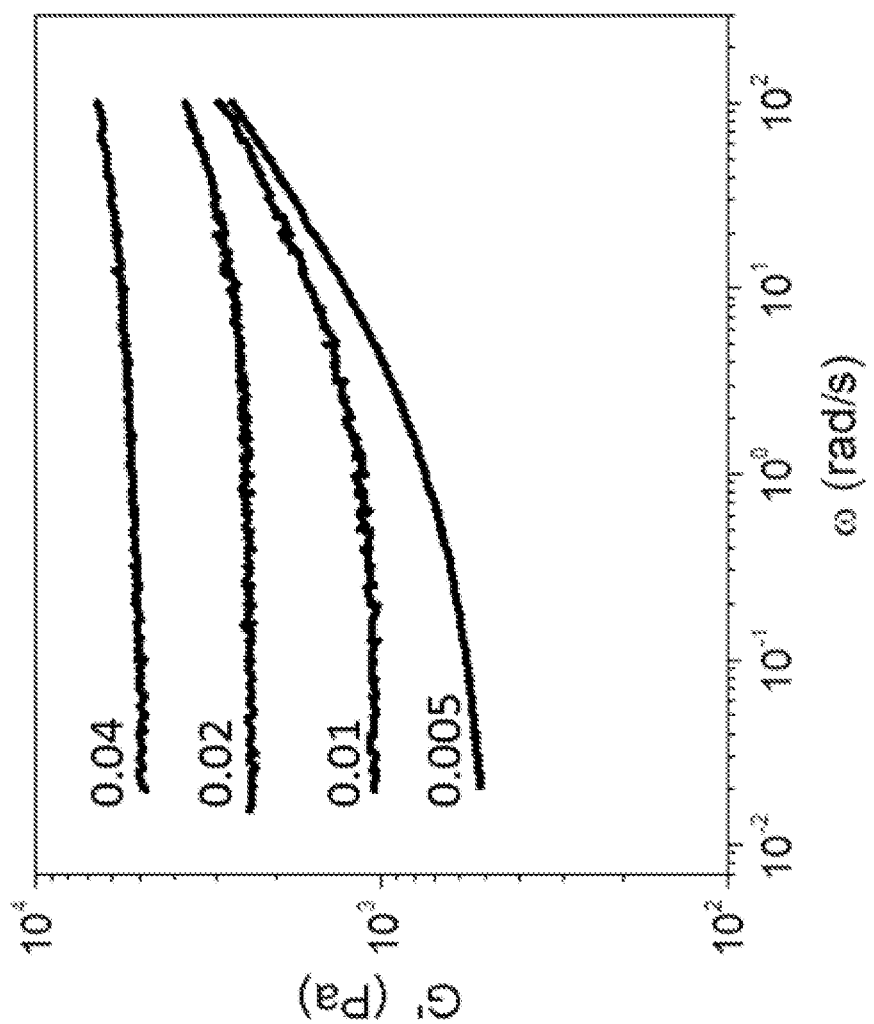
FIG. 1A-C show representative images illustrating that low entanglements lead to lower possible elastomer moduli and larger maximum deformations.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. DEFINITIONS

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "catalytically effective" refers to the amount of a catalyst that is sufficient to facilitate a reaction (e.g., atom-transfer radical polymerization as disclosed herein).

As used herein, the term "polymer" refers to a relatively high molecular weight organic compound, natural or synthetic, whose structure can be represented by a repeated small unit, the monomer (e.g., monomethacryloxypropyl terminated polydimethylsiloxane). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "molecular weight" (MW) refers to the mass of one molecule of that substance, relative to the unified atomic mass unit u (equal to 1/12 the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w on average. The weight average molecular weight can be determined by light scattering, small angle neutron scattering (SANS), X-ray scattering, and sedimentation velocity.

As used herein, the terms "dispersity" and "dispersity index" (PDI) refer to the ratio of the weight average to the number average ($M_w/M_n$).

As used herein, the terms "initiator" and "radical initiator" refer to substances that can produce radical species under mild conditions and promote radical polymerization reactions. These substances generally possess bonds that have small bond dissociation energies. Examples include halogen molecules, azo compounds, and organic peroxides. Chlorine, for example, gives two chlorine radicals (Cl.) by irradiation with ultraviolet light. Azo compounds (R—N=N—R') can be the precursor of two carbon-centered radicals (R. and R'.) and nitrogen gas upon heating and/or by irradiation. For example, AIBN and ABCN yield isobutyronitrile and cyclohexanecarbonitrile radicals, respectively. Organic peroxides each have a peroxide bond (—O—O—), which is readily cleaved to give two oxygen-centered radicals. For example, di-t(tertiary)-butylperoxide (tBuOOtBu) gives two t-butanoyl radicals (tBuO.) and the radicals become methyl radicals ($CH_3$.) with the loss of acetone. Benzoyl peroxide (($PhCOO)_2$) generates benzoyloxyl radicals (PhCOO.), each of which loses carbon dioxide to be converted into a phenyl radical (Ph.). In various aspects, the terms "initiator" and "radical initiator" can refer to a photoinitiator. Examples of photoinitiators include, but are not limited to, acetophenone, anisoin, anthraquinone, anthraquinone-2-sulfonic acid sodium salt monohydrate, (benzene) tricarbonylchromium, benzil, benzoin, benzoin ethyl ether, benzoin isobutyl ether, benzoin methyl ether, benzophenone, 1-hydroxycyclohexyl phenyl ketone, 3,3',4, 4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, (cumene)cyclopentadienyliron (II) hexafluorophosphate, dibenzosuberenone, 2,2-diethyoxyacetophenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide, 4'-ethoxyacetophenone, 2-ethylanthraquinone, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, thioxanthen-9-one, triarylsulfonium hexafluoroantimonate salts, and triarylsulfonium hexafluorophosphate salts.

As used herein, the term "polymerizable group" refers to a group (i.e., a chemical functionality) capable of undergoing a polymerization reaction at a polymerization temperature and/or in response to a polymerization initiator to form a polymer or an oligomer. In one aspect, the polymerization reaction is a radical polymerization (e.g., atom-transfer radical polymerization (ATRP)). It is understood that catalysts can be employed in connection with the polymerization reaction. It is contemplated that, in various aspects, polymerizable groups can be used in, for example, chain growth reactions. Exemplary polymerizable groups include residues of vinyl, styryl, acryloyl, methacryloyl, aryl, and heteroaryl compounds.

As used herein, the term "living polymerization" refers to a form of addition polymerization where the ability of a growing polymer chain to terminate has been removed. Examples of living polymerizations include, but are not limited to, atom transfer radical polymerization (ATRP), living anionic polymerization, living cationic polymerization, living ring-opening metathesis polymerization, reversible addition-fragmentation chain transfer (RAFT) polymerization, and living chain-growth polycondensations.

As used herein, the terms "atom transfer radical polymerization" and "ATRP" refer to a type of living polymerization in which both the molecular weight and the molecular weight distribution are controllable. As a living polymerization, it also permits the controlled formation of polymer architectures, for example random copolymers or else block copolymer structures. By means of appropriate initiators, for example, unusual block copolymers and star polymers are additionally obtainable.

As used herein, the term "star polymer" refers to a branched polymer molecule in which a single branch point gives rise to multiple linear chains or arms. The single branch point can be a single chemical moiety or can be a highly crosslinked section of polymer. In one aspect, a star polymer can be generally spherical in shape. In a further aspect, a star polymer can be particle shaped. If the arms are identical the star polymer molecule is said to be regular. If adjacent arms are composed of different repeating subunits, the star polymer molecule is said to be variegated.

As used herein, the term "brush polymer" refers to a polymer in which a relatively large number of relatively uniform "arms" emanate from a contiguous polymeric backbone, and wherein the distribution of the arms along the backbone is relatively uniform. The average contour length of the spacer between neighboring side chains should be significantly (notably) smaller than the square root of the average contour length of side chains (where the contour length is the length of a fully extended chain). The "arms" are typically linear polymer chains. But, on some instances, arms may be branched polymer chains or dendritic polymers or a mixture thereof As used herein, the term "comb polymer" refers to a polymer in which a relatively smaller number of relatively uniform "arms" emanate from a contiguous polymeric backbone, and wherein the polymeric backbone contains at least two three-way branch points. The average contour length of the spacer between neighboring side chains should be significantly (notably) larger than the square root of the average contour length of side chains.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. For example, an ethylene glycol residue in a polysiloxane refers to one or more —OCH$_2$CH$_2$O— units in the polysiloxane, regardless of whether ethylene glycol was used to prepare the polysiloxane.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" or "aliphatic group," as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-20 carbon atoms. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, ether, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, ether, hydroxy, nitro, silyl, sulfo-oxo, or thiol as described herein.

The term "polyalkylene group" as used herein is a group having two or more $CH_2$ groups linked to one another. The polyalkylene group can be represented by the formula $-(CH_2)_a-$, where "a" is an integer of from 2 to 500.

The terms "alkoxy" and "alkoxyl" as used herein to refer to an alkyl or cycloalkyl group bonded through an ether linkage; that is, an "alkoxy" group can be defined as $-OA^1$ where $A^1$ is alkyl or cycloalkyl as defined above. "Alkoxy" also includes polymers of alkoxy groups as just described; that is, an alkoxy can be a polyether such as $-OA^1-OA^2$ or $-OA^1-(OA^2)_a-OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, carboxylic acid, ester, ether, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, carboxylic acid, ester, ether, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, carboxylic acid, ester, ether, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, alkyl, cycloalkyl, alkoxy, alkenyl, cycloalkenyl, alkynyl, cycloalkynyl, aryl, heteroaryl, aldehyde, carboxylic acid, ester, ether, hydroxy, ketone, azide, nitro, silyl, sulfo-oxo, or thiol as described herein.

The term "aromatic group" as used herein refers to a ring structure having cyclic clouds of delocalized π electrons above and below the plane of the molecule, where the π clouds contain (4n+2) π electrons. A further discussion of aromaticity is found in Morrison and Boyd, Organic Chemistry, (5th Ed., 1987), Chapter 13, entitled "Aromaticity," pages 477-497, incorporated herein by reference. The term "aromatic group" is inclusive of both aryl and heteroaryl groups.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, carboxylic acid, ester, ether, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula —$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "alkylamino" as used herein is represented by the formula —NH(-alkyl) where alkyl is a described herein. Representative examples include, but are not limited to, methylamino group, ethylamino group, propylamino group, isopropylamino group, butylamino group, isobutylamino group, (sec-butyl)amino group, (tert-butyl)amino group, pentylamino group, isopentylamino group, (tert-pentyl) amino group, hexylamino group, and the like.

The term "dialkylamino" as used herein is represented by the formula —N(-alkyl)$_2$ where alkyl is a described herein. Representative examples include, but are not limited to, dimethylamino group, diethylamino group, dipropylamino group, diisopropylamino group, dibutylamino group, diisobutylamino group, di(sec-butyl)amino group, di(tert-butyl)amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —OC(O)$A^1$ or —C(O)O$A^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The terms "halo," "halogen" or "halide", as used herein can be used interchangeably and refer to F, Cl, Br, or I.

The terms "pseudohalide," "pseudohalogen" or "pseudohalo," as used herein can be used interchangeably and refer to functional groups that behave substantially similar to halides. Such functional groups include, by way of example, cyano, thiocyanato, azido, trifluoromethyl, trifluoromethoxy, perfluoroalkyl, and perfluoroalkoxy groups.

The term "heteroalkyl," as used herein refers to an alkyl group containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized. Heteroalkyls can be substituted as defined above for alkyl groups.

The term "heteroaryl," as used herein refers to an aromatic group that has at least one heteroatom incorporated within the ring of the aromatic group. Examples of heteroatoms include, but are not limited to, nitrogen, oxygen, sulfur, and phosphorus, where N-oxides, sulfur oxides, and dioxides are permissible heteroatom substitutions. The heteroaryl group can be substituted or unsubstituted. The heteroaryl group can be substituted with one or more groups including, but not limited to, alkyl, cycloalkyl, alkoxy, amino, ether, halide, hydroxy, nitro, silyl, sulfo-oxo, or thiol as described herein. Heteroaryl groups can be monocyclic, or alternatively fused ring systems. Heteroaryl groups include, but are not limited to, furyl, imidazolyl, pyrimidinyl, tetrazolyl, thienyl, pyridinyl, pyrrolyl, N-methylpyrrolyl, quinolinyl, isoquinolinyl, pyrazolyl, triazolyl, thiazolyl, oxazolyl, isoxazolyl, oxadiazolyl, thiadiazolyl, isothiazolyl, pyridazinyl, pyrazinyl, benzofuranyl, benzodioxolyl, benzothiophenyl, indolyl, indazolyl, benzimidazolyl, imidazopyridinyl, pyrazolopyridinyl, and pyrazolopyrimidinyl. Further not limiting examples of heteroaryl groups include, but are not limited to, pyridinyl, pyridazinyl, pyrimidinyl, pyrazinyl, thiophenyl, pyrazolyl, imidazolyl, benzo[d]oxazolyl, benzo[d]thiazolyl, quinolinyl, quinazolinyl, indazolyl, imidazo[1,2-b]pyridazinyl, imidazo[1,2-a]pyrazinyl, benzo[c][1,2,5]thiadiazolyl, benzo[c][1,2,5]oxadiazolyl, and pyrido[2,3-b]pyrazinyl.

The term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "bicyclic heterocycle" or "bicyclic heterocyclyl," as used herein refers to a ring system in which at least one of the ring members is other than carbon. Bicyclic heterocyclyl encompasses ring systems wherein an aromatic ring is fused with another aromatic ring, or wherein an aromatic ring is fused with a non-aromatic ring. Bicyclic heterocyclyl encompasses ring systems wherein a benzene ring is fused to a 5- or a 6-membered ring containing 1, 2 or 3 ring heteroatoms or wherein a pyridine ring is fused to a 5- or a 6-membered ring containing 1, 2 or 3 ring heteroatoms. Bicyclic heterocyclic groups include, but are not limited to, indolyl, indazolyl, pyrazolo[1,5-a]pyridinyl, benzofuranyl, quinolinyl, quinoxalinyl, 1,3-benzodioxolyl, 2,3-dihydro-1,4-benzodioxinyl, 3,4-dihydro-2H-chromenyl, 1H-pyrazolo[4,3-c]pyridin-3-yl; 1H-pyrrolo[3,2-b]pyridin-3-yl; and 1H-pyrazolo[3,2-b]pyridin-3-yl.

The term "heterocycloalkyl" as used herein refers to an aliphatic, partially unsaturated or fully saturated, 3- to 14-membered ring system, including single rings of 3 to 8 atoms and bi- and tricyclic ring systems. The heterocycloalkyl ring-systems include one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The term "hydroxyl" or "hydroxyl" as used herein is represented by the formula —OH.

The term "ketone" as used herein is represented by the formula $A^1C(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "azide" or "azido" as used herein is represented by the formula —$N_3$.

The term "nitro" as used herein is represented by the formula —$NO_2$.

The term "nitrile" or "cyano" as used herein is represented by the formula —CN.

The term "silyl" as used herein is represented by the formula —$SiA^1A^2A^3$, where $A^1$, $A^2$, and $A^3$ can be, independently, hydrogen or an alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —$S(O)A^1$, —$S(O)_2A^1$, —$OS(O)_2A^1$, or —$OS(O)_2OA^1$, where $A^1$ can be hydrogen or an alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —$S(O)_2A^1$, where $A^1$ can be hydrogen or an alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, an alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "thiol" as used herein is represented by the formula —SH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

The term "stable," as used herein, refers to compounds that are not substantially altered when subjected to conditions to allow for their production, detection, and, in certain aspects, their recovery, purification, and use for one or more of the purposes disclosed herein.

Suitable monovalent substituents on a substitutable carbon atom of an "optionally substituted" group is independently —$(CH_2)_{0-4}R°$; —$(CH_2)_{0-4}OR°$; —O—$(CH_2)_{0-4}R°$, —O—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with $R°$; —$(CH_2)_{0-4}O(CH_2)_{0-1}Ph$ which may be substituted with $R°$; —CH=CHPh, which may be substituted with $R°$; —$(CH_2)_{0-4}O(CH_2)_{0-1}$-pyridyl which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)$ $N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR$—, $SC(S)SR°$; —$(CH_2)_{0-4}SC(O)R°$; —$(CH_2)_{0-4}C(O)NR°_2$; —$C(S)NR°_2$; —$C(S)SR°$; $SC(S)SR°$, —$(CH_2)_{0-4}OC(O)NR°_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$P(O)(OR°)_2$; $SiR°_3$; —$(C_{1-4}$ straight or branched)alkylene)O—$N(R°)_2$; or —$(C_{1-4}$ straight or branched)alkylene)C(O)O—$N(R°)_2$, wherein each $R°$ may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of $R°$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R°$ (or the ring formed by taking two independent occurrences of $R°$ together with their intervening atoms), is independently —$(CH_2)_{0-2}R^●$, -(haloR$^●$), —$(CH_2)_{0-2}OH$, —$(CH_2)_{0-2}OR^●$, —$(CH_2)_{0-2}CH(OR^●)_2$; —O(haloR$^●$), —CN, —$N_3$, —$(CH_2)_{0-2}C(O)R^●$, —$(CH_2)_{0-2}C(O)OH$, —$(CH_2)_{0-2}C(O)$ $OR^●$, —$(CH_2)_{0-2}SR^●$, —$(CH_2)_{0-2}SH$, —$(CH_2)_{0-2}NHR^●$, $(CH_2)_{0-2}NR^●_2$, —$NO_2$, —$SiR^●_3$, —$OSiR^●_3$, —$C(O)SR^●$, —$(C_{1-4}$ straight or branched alkylene)C(O)OR$^●$, or —$SSR^●$ wherein each $R^●$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R°$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include —R$^\bullet$, —OH, —OR$^\bullet$, —CN, —C(O)OH, —C(O)OR$^\bullet$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\backslash_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger_2$, —C(S)NR$^\dagger_2$, —C(NH)NR$^\dagger_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono or bicyclic ring having 0-4 heteroatoms independently selected from nitrogen, oxygen, or sulfur.

Suitable substituents on the aliphatic group of R$^\dagger$ is independently —R$^\bullet$, —OH, —OR$^\bullet$, —CN, —C(O)OH, —C(O)OR$^\bullet$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

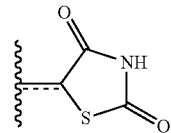

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5, 6, 7, 8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

"Inorganic radicals," as the term is defined and used herein, contain no carbon atoms and therefore comprise only atoms other than carbon. Inorganic radicals comprise bonded combinations of atoms selected from hydrogen, nitrogen, oxygen, silicon, phosphorus, sulfur, selenium, and halogens such as fluorine, chlorine, bromine, and iodine, which can be present individually or bonded together in their chemically stable combinations. Inorganic radicals have 10 or fewer, or preferably one to six or one to four inorganic atoms as listed above bonded together. Examples of inorganic radicals include, but not limited to, amino, hydroxy, halogens, nitro, thiol, sulfate, phosphate, and like commonly known inorganic radicals. The inorganic radicals do not have bonded therein the metallic elements of the periodic table (such as the alkali metals, alkaline earth metals, transition metals, lanthanide metals, or actinide metals), although such metal ions can sometimes serve as a pharmaceutically acceptable cation for anionic inorganic radicals such as a sulfate, phosphate, or like anionic inorganic radical. Inorganic radicals do not comprise metalloids elements such as boron, aluminum, gallium, germanium, arsenic, tin, lead, or tellurium, or the noble gas elements, unless otherwise specifically indicated elsewhere herein.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Ingold-Prelog system can be used to assign the (R) or (S) configuration to a chiral carbon.

The compounds described in the invention can be present as a solvate. In some cases, the solvent used to prepare the solvate is an aqueous solution, and the solvate is then often referred to as a hydrate. The compounds can be present as a hydrate, which can be obtained, for example, by crystallization from a solvent or from aqueous solution. In this connection, one, two, three or any arbitrary number of solvate or water molecules can combine with the compounds according to the invention to form solvates and hydrates. Unless stated to the contrary, the invention includes all such possible solvates.

It is known that chemical substances form solids which are present in different states of order which are termed polymorphic forms or modifications. The different modifications of a polymorphic substance can differ greatly in their physical properties. The compounds according to the invention can be present in different polymorphic forms, with it being possible for particular modifications to be metastable. Unless stated to the contrary, the invention includes all such possible polymorphic forms.

In some aspects, a structure of a compound can be represented by a formula:

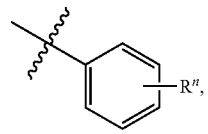

which is understood to be equivalent to a formula:

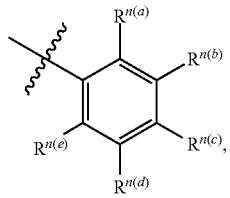

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental Volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow;

plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. COMPOSITIONS

In one aspect, disclosed are compositions comprising a polymer network, wherein the polymer network comprises the reaction product of: (a) a monomer having a structure represented by a formula:

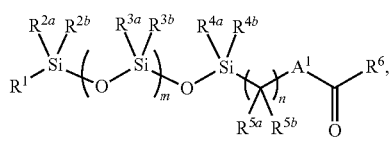

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

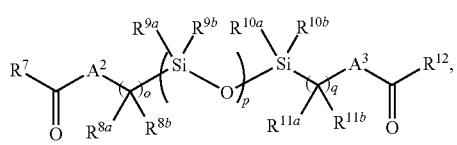

wherein each of o and q is independently an integer selected from 0, 1, 2, 3, 4, and 5; wherein p is an integer selected from 2 to 800; wherein each of $A^2$ and $A^3$ is selected from O and NH; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl. In a further aspect, the reaction product further comprises at least one residue of a diluent monomer having a structure represented by a formula:

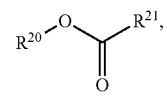

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl.

In one aspect, disclosed are compositions comprising a polymer network, wherein the polymer network comprises the reaction product of: (a) a monomer having a structure represented by a formula:

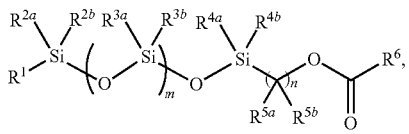

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl;

wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

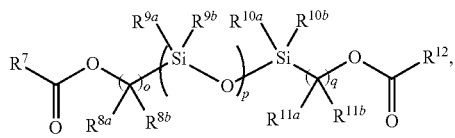

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

In one aspect, disclosed are compositions comprising a polymer network, wherein the polymer network comprises at least one residue having a structure represented by a formula:

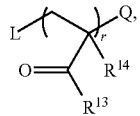

wherein each occurrence of $R^{13}$ is a structure represented by a formula selected from:

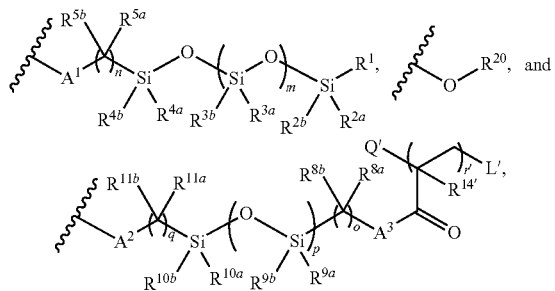

provided that at least one occurrence of $R^{13}$ is a structure represented by a formula selected from:

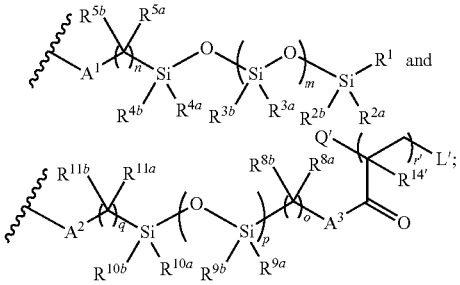

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of $A^1$, $A^2$, and $A^3$ is independently selected from O and NH; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; wherein each occurrence of $R^{14}$ and $R^{14'}$ is independently selected from hydrogen and C1-C10 alkyl; and wherein each occurrence of $R^{20}$ is independently selected from C1-C10 alkyl, $Cy^1$, and $Ar^1$.

In one aspect, disclosed are compositions comprising a polymer network, wherein the polymer network comprises at least one residue having a structure represented by a formula:

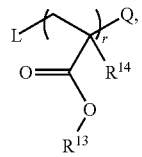

wherein each occurrence of $R^{13}$ is a structure represented by a formula selected from:

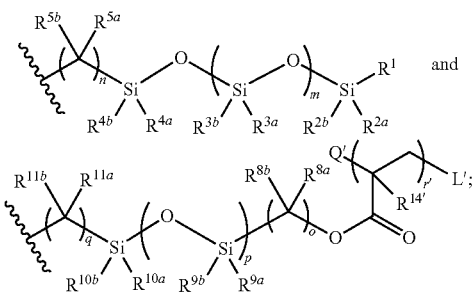

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; and wherein each occurrence of $R^{14}$ and $R^{14'}$ is independently selected from hydrogen and C1-C10 alkyl.

1. Polymer Networks

In one aspect, disclosed are polymer networks comprising the reaction product of: (a) a monomer having a structure represented by a formula:

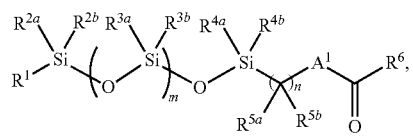

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

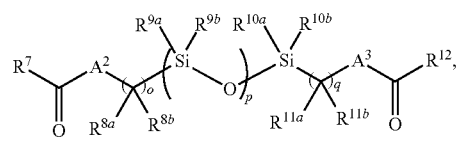

wherein each of o and q is independently an integer selected from 0, 1, 2, 3, 4, and 5; wherein p is an integer selected from 2 to 800; wherein each of $A^2$ and $A^3$ is selected from O and NH; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$ and $R^{11b}$ is independently selected from hydrogen and C1-C10 alkyl. In a further aspect, the reaction product further comprises at least one residue of a diluent monomer having a structure represented by a formula:

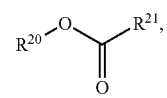

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl.

In one aspect, disclosed are polymer networks comprising the reaction product of: (a) a monomer having a structure represented by a formula:

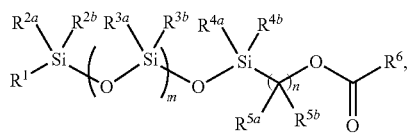

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl; and (b) a cross-linker having a structure represented by a formula:

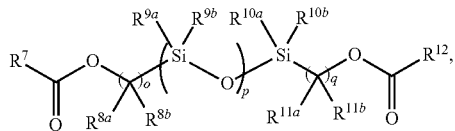

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

In one aspect, disclosed are polymer networks comprising at least one residue having a structure represented by a formula:

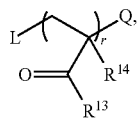

wherein each occurrence of $R^{13}$ is a structure represented by a formula selected from:

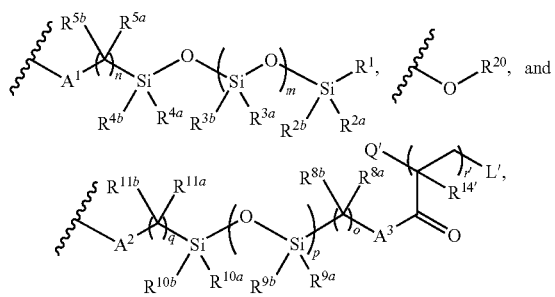

provided that at least one occurrence of $R^{13}$ is a structure represented by a formula selected from:

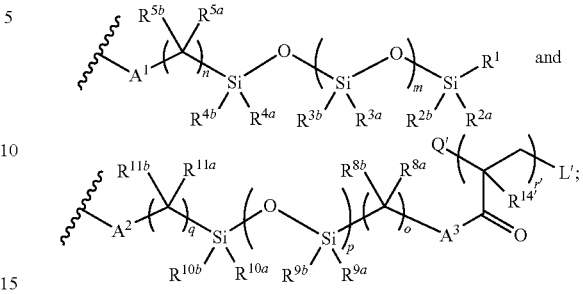

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of $A^1$, $A^2$, and $A^3$ is independently selected from O and NH; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; wherein each occurrence of $R^{14}$ and $R^{14'}$ is independently selected from hydrogen and C1-C10 alkyl; and wherein each occurrence of $R^{20}$ is independently selected from C1-C10 alkyl, $Cy^1$, and $Ar^1$.

In one aspect, disclosed are polymer networks comprising at least one residue having a structure represented by a formula:

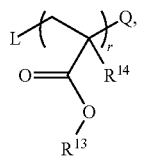

wherein each occurrence of $R^{13}$ is a structure represented by a formula selected from:

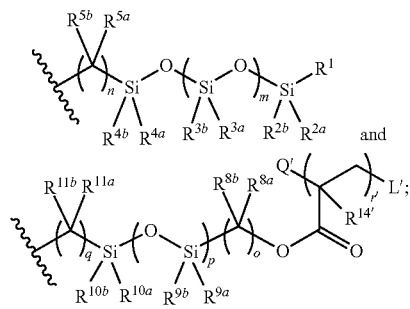

wherein each occurrence of m is an integer independently selected from 5 to 300; wherein each occurrence of n is an integer independently selected from 0, 1, 2, 3, 4, and 5; wherein each occurrence of o and each occurrence of q is independently an integer selected from 0, 1, 2, 3, 4, and 5; wherein each occurrence of p is an integer independently selected from 2 to 800; wherein each occurrence of r and r' is an integer independently selected from 2 to 800; wherein each occurrence of L and L' is independently a residue of a radical initiator; wherein each occurrence of Q and Q' is independently a residue of a quenching agent; wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{5a}$ and $R^{5b}$ is independently selected from hydrogen and C1-C10 alkyl; wherein each occurrence of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each occurrence of $R^{8a}$, $R^{8b}$, $R^{11a}$, and $R^{11b}$ is independently selected from hydrogen and C1-C10 alkyl; and wherein each occurrence of $R^{14}$ and $R^{14'}$ is independently selected from hydrogen and C1-C10 alkyl.

In a further aspect, the polymer network has a rubbery plateau in the modulus of elasticity of less than about $10^5$ Pa. In a still further aspect, the polymer network has a rubbery plateau in the modulus of elasticity of less than about $10^4$ Pa. In yet a further aspect, the polymer network has a rubbery plateau in the modulus of elasticity of less than about $10^3$ Pa. In an even further aspect, the polymer network has a rubbery plateau in the modulus of elasticity of less than about 500 Pa. In a still further aspect, the polymer network has a rubbery plateau in the modulus of elasticity of less than about 100 Pa.

In a further aspect, the polymer network has a maximum extendability of at least about 10. In a still further aspect, the polymer network has a maximum extendability of at least about 20. In yet a further aspect, the polymer network has a maximum extendability of at least about 50.

In a further aspect, the polymer network comprises the reaction product of the monomer, the crosslinker, and a radical initiator.

In a further aspect, the polymer network comprises at least one residue having a structure represented by a formula:

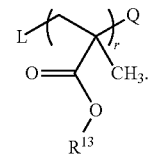

In a further aspect, the polymer network comprises at least one residue having a structure represented by a formula:

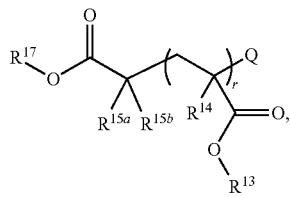

wherein each of $R^{15a}$ and $R^{15b}$ is independently selected from hydrogen and C1-C10 alkyl; and wherein $R^{17}$ is selected from —OH, —CN, —NO$_2$, —N$_3$, C1-C8 alkyl, —(C1-C8 alkyl)-O—(C=O)(C1-C8 alkyl), and $Cy^3$ and substituted with 0 or 1 group selected from —OH, —CN, —NO$_2$, and —N$_3$. In a still further aspect, the polymer network comprises at least one residue having a structure represented by a formula:

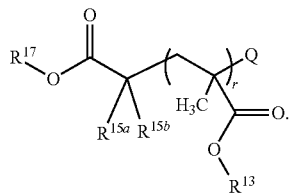

In yet a further aspect, the polymer network comprises at least one residue having a structure represented by a formula:

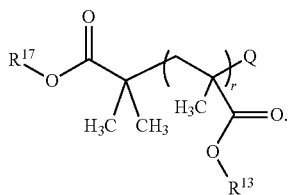

In a further aspect, the polymer network comprises at least one residue having a structure represented by a formula:

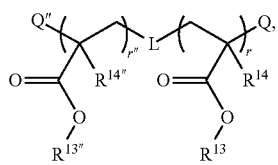

wherein each occurrence of r''' is an integer independently selected from 2 to 800; wherein each occurrence of Q'' is independently a residue of a quenching agent; wherein each occurrence of $R^{13''}$ is a structure represented by a formula selected from:

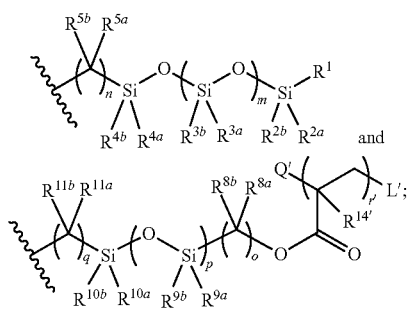

and wherein each occurrence of $R^{14''}$ is independently selected from hydrogen and C1-C10 alkyl.

In a further aspect, the polymer network comprises at least one residue having a structure represented by a formula:

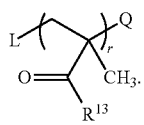

In a further aspect, each occurrence of the —$CO_2R^{20}$ side chain may be grouped together to form, for example, a blocky polymer. Thus, in various aspects, the polymer network comprises at least one residue having a structure represented by a formula:

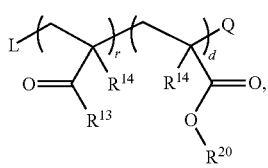

wherein each occurrence of d is an integer selected from 2 to 800.

In a further aspect, each occurrence of the —$CO_2R^{20}$ side chain may be dispersed between the other side chains. For example, in various aspects, the polymer network comprises at least one residue having a structure represented by a formula:

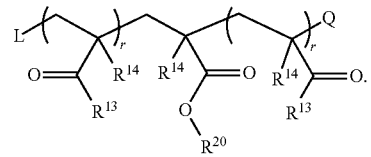

In a further aspect, each occurrence of the —$CO_2R^{20}$ side chain may either be grouped together, e.g., a blocky polymer, or dispersed between the other side chains. For example, in various aspects, the polymer network comprises at least one residue having a structure represented by a formula:

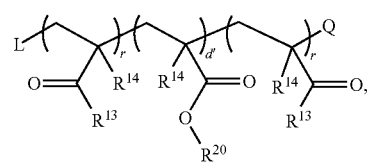

wherein each occurrence of d' is an integer selected from 1 to 800.

In a further aspect, the polymer network comprises at least one residue having a structure represented by a formula:

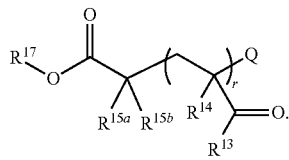

In a further aspect, the polymer network comprises at least one residue having a structure represented by a formula:

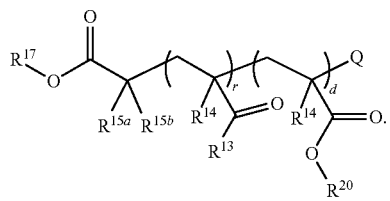

In a further aspect, the polymer network comprises at least one residue having a structure represented by a formula:

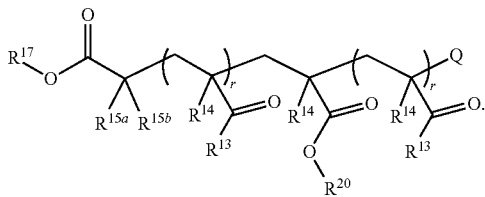

In a further aspect, the polymer network comprises at least one residue having a structure represented by a formula:

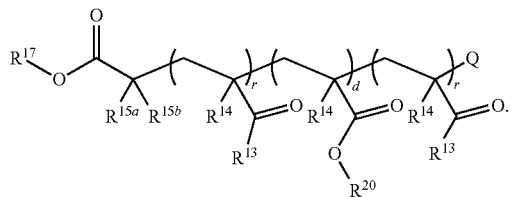

In a further aspect, the polymer network comprises at least one residue having a structure represented by a formula:

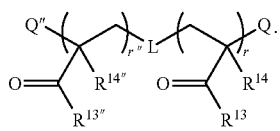

In a further aspect, the polymer network comprises at least one residue having a structure represented by a formula:

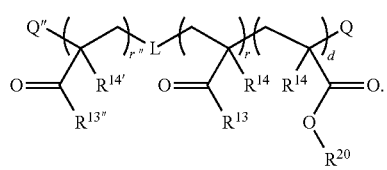

In a further aspect, the polymer network comprises at least one residue having a structure represented by a formula:

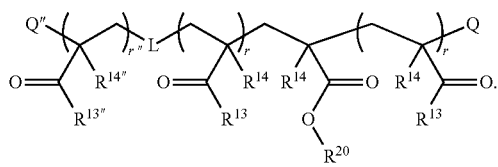

In a further aspect, the polymer network comprises at least one residue having a structure represented by a formula:

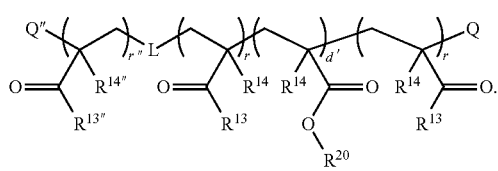

In a further aspect, the polymer network comprises at least one residue having a structure represented by a formula:

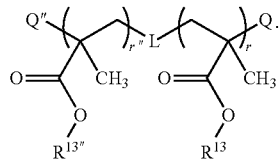

In a further aspect, the polymer network comprises at least one residue having a structure represented by a formula:

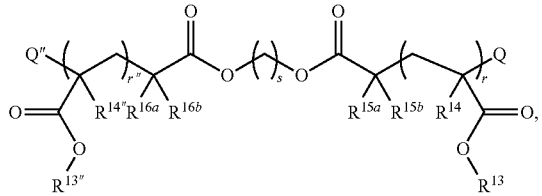

wherein s is an integer selected from 2, 3, 4, 5, 6, 7, and 8; wherein each of $R^{15a}$ and $R^{15b}$ is independently selected from hydrogen and C1-C10 alkyl; and wherein $R^{17}$ is selected from —OH, —$N_3$, —CCH, and methyl. In a still further aspect, the polymer network comprises at least one residue having a structure represented by a formula:

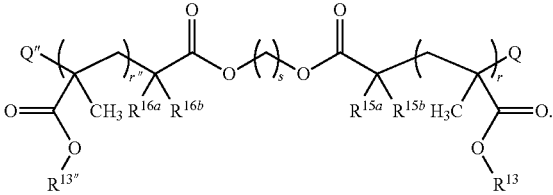

In yet a further aspect, the polymer network comprises at least one residue having a structure represented by a formula:

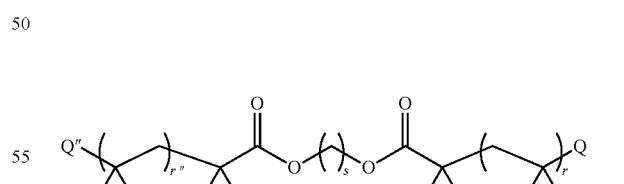

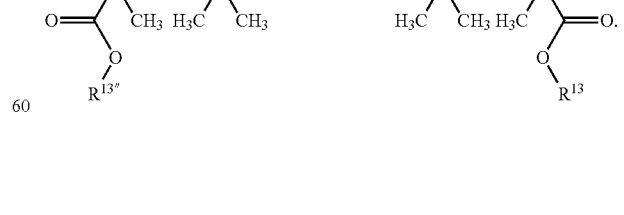

In a further aspect, the polymer network comprises at least one residue having a structure represented by a formula:

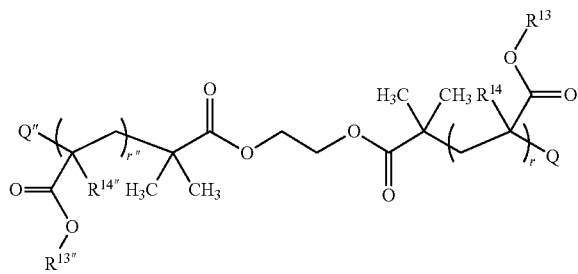

In a further aspect, the polymer network comprises at least one residue having a structure represented by a formula:

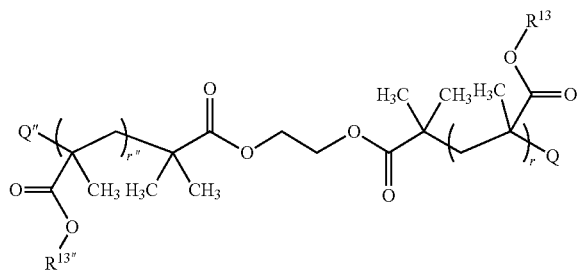

In a further aspect, the polymer network comprises at least one residue having a structure represented by a formula:

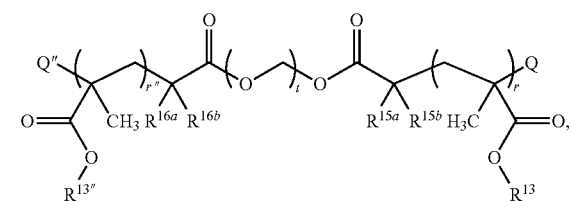

wherein t is an integer selected from 1 to 500; and wherein each of $R^{15a}$, $R^{15b}$, $R^{16a}$, and $R^{16b}$ is independently selected from hydrogen and C1-C10 alkyl. In a still further aspect, the polymer network comprises at least one residue having a structure represented by a formula:

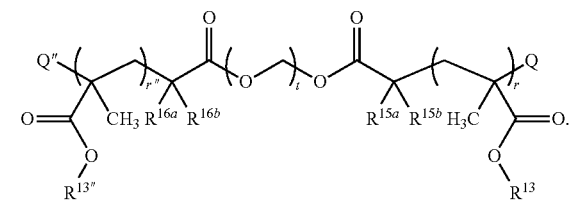

In yet a further aspect, the polymer network comprises at least one residue having a structure represented by a formula:

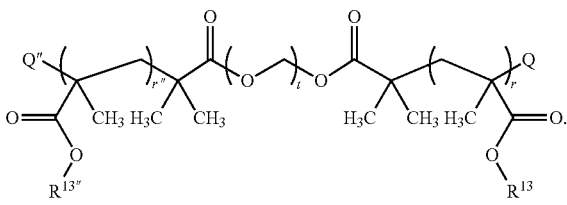

In various aspects, the polymer comprises at least one residue having a structure represented by a formula:

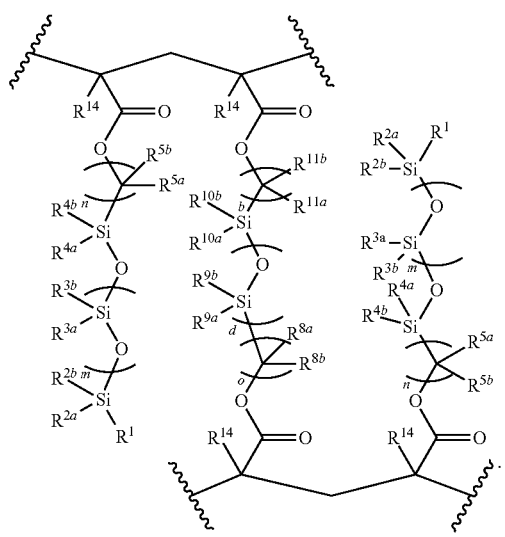

In various aspects, the polymer comprises at least one residue having a structure represented by a formula:

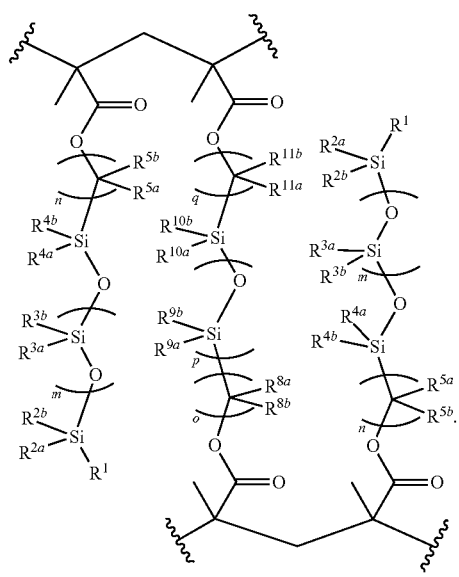

In various aspects, the polymer comprises at least one residue having a structure represented by a formula:

In various aspects, tne polymer comprises at least one residue having a structure represented by a formula:

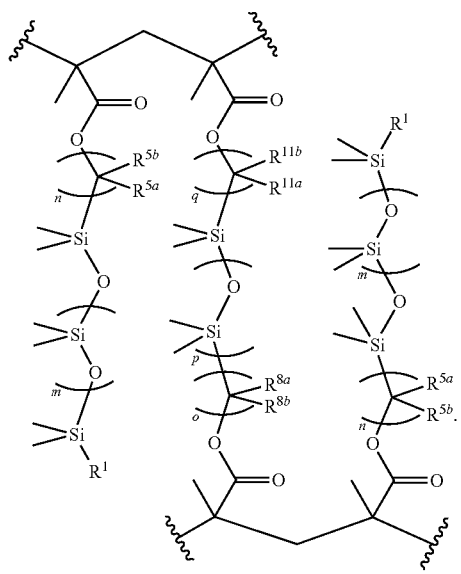

In various aspects, the polymer comprises at least one residue having a structure represented by a formula:

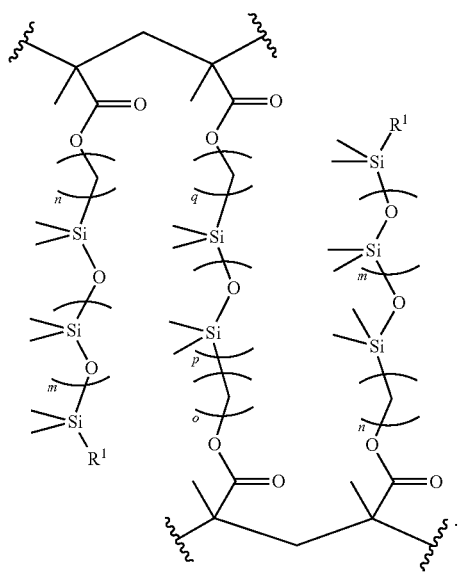

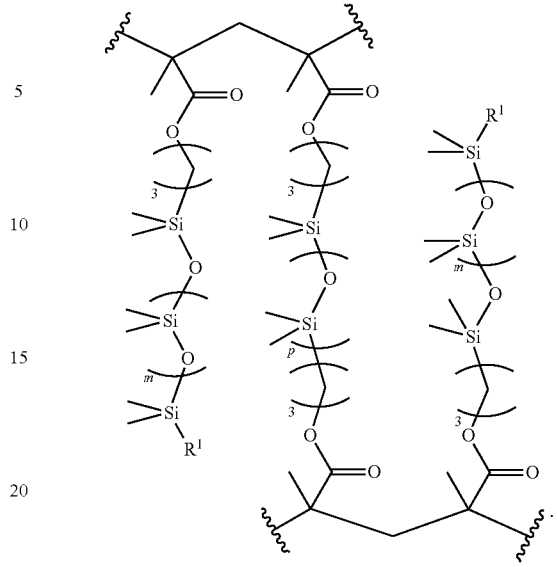

In one aspect, each occurrence of m is an integer independently selected from 5 to 300. In a further aspect, each occurrence of m is an integer independently selected from 5 to 275. In a still further aspect, each occurrence of m is an integer independently selected from 5 to 250. In yet a further aspect, each occurrence of m is an integer independently selected from 5 to 225. In an even further aspect, each occurrence of m is an integer independently selected from 5 to 200. In a still further aspect, each occurrence of m is an integer independently selected from 5 to 175. In yet a further aspect, each occurrence of m is an integer independently selected from 5 to 150. In an even further aspect, each occurrence of m is an integer independently selected from 5 to 125. In a still further aspect, each occurrence of m is an integer independently selected from 5 to 100. In yet a further aspect, each occurrence of m is an integer independently selected from 5 to 75. In an even further aspect, each occurrence of m is an integer independently selected from 5 to 50. In a still further aspect, each occurrence of m is an integer independently selected from 5 to 25.

In one aspect, m is an integer selected from 5 to 300 and p is an integer selected from 2 to 800. In a further aspect, m is an integer selected from 5 to 200 and p is an integer selected from 2 to 200.

In one aspect, each occurrence of n is an integer independently selected from 0, 1, 2, 3, 4, and 5. In a further aspect, each occurrence of n is an integer independently selected from 0, 1, 2, 3, and 4. In a still further aspect, each occurrence of n is an integer independently selected from 0, 1, 2, and 3. In yet a further aspect, each occurrence of n is an integer independently selected from 0, 1, and 2. In an even further aspect, each occurrence of n is an integer independently selected from 0 and 1. In a still further aspect, each occurrence of n is 5. In yet a further aspect, each occurrence of n is 4. In an even further aspect, each occurrence of n is 3. In a still further aspect, each occurrence of n is 2. In yet a further aspect, each occurrence of n is 1. In an even further aspect, each occurrence of n is 0.

In one aspect, each occurrence of o and q is independently an integer selected from 0, 1, 2, 3, 4, and 5. In a further aspect, each occurrence of o and q is independently an integer selected from 0, 1, 2, 3, and 4. In a still further aspect, each occurrence of o and q is independently an integer selected from 0, 1, 2, and 3. In yet a further aspect, each occurrence of o and q is independently an integer selected from 0, 1, and 2. In an even further aspect, each occurrence of o and q is independently an integer selected from 0 and 1. In a still further aspect, each occurrence of o and q is 5. In yet a further aspect, each occurrence of o and q is 4. In an even further aspect, each occurrence of o and q is 3. In a still further aspect, each occurrence of o and q is 2. In yet a further aspect, each occurrence of o and q is 1. In an even further aspect, each occurrence of o and q is 0.

In one aspect, each occurrence of p is an integer independently selected from 2 to 800. In a further aspect, each occurrence of p is an integer independently selected from 2 to 700. In a still further aspect, each occurrence of p is an integer independently selected from 2 to 600. In yet a further aspect, each occurrence of p is an integer independently selected from 2 to 500. In an even further aspect, each occurrence of p is an integer independently selected from 2 to 400. In a still further aspect, each occurrence of p is an integer independently selected from 2 to 300. In yet a further aspect, each occurrence of p is an integer independently selected from 2 to 200. In an even further aspect, each occurrence of p is an integer independently selected from 2 to 100.

In one aspect, each occurrence of r and r' is an integer independently selected from 2 to 800. In a further aspect, each occurrence of r and r' is an integer independently selected from 2 to 700. In a still further aspect, each occurrence of r and r' is an integer independently selected from 2 to 600. In yet a further aspect, each occurrence of r and r' is an integer independently selected from 2 to 500. In an even further aspect, each occurrence of r and r' is an integer independently selected from 2 to 400. In a still further aspect, each occurrence of r and r' is an integer independently selected from 2 to 300. In yet a further aspect, each occurrence of r and r' is an integer independently selected from 2 to 200. In an even further aspect, each occurrence of r and r' is an integer independently selected from 2 to 100. In a still further aspect, each occurrence of r and r' is an integer independently selected from 4 to 200.

In one aspect, each occurrence of r and r' is an integer independently selected from 4 to 800. In a further aspect, each occurrence of r and r' is an integer independently selected from 4 to 700. In a still further aspect, each occurrence of r and r' is an integer independently selected from 4 to 600. In yet a further aspect, each occurrence of r and r' is an integer independently selected from 4 to 500. In an even further aspect, each occurrence of r and r' is an integer independently selected from 4 to 400. In a still further aspect, each occurrence of r and r' is an integer independently selected from 4 to 300. In yet a further aspect, each occurrence of r and r' is an integer independently selected from 4 to 200. In an even further aspect, each occurrence of r and r' is an integer independently selected from 4 to 100.

In a further aspect, each occurrence of r" is an integer independently selected from 2 to 800. In a still further aspect, each occurrence of r" is an integer independently selected from 2 to 700. In yet a further aspect, each occurrence of r" is an integer independently selected from 2 to 600. In an even further aspect, each occurrence of r" is an integer independently selected from 2 to 500. In a still further aspect, each occurrence of r" is an integer independently selected from 2 to 400. In yet a further aspect, each occurrence of r" is an integer independently selected from 2 to 300. In an even further aspect, each occurrence of r" is an integer independently selected from 2 to 200. In a still further aspect, each occurrence of r" is an integer independently selected from 2 to 100.

In a further aspect, each occurrence of r" is an integer independently selected from 4 to 800. In a still further aspect, each occurrence of r" is an integer independently selected from 4 to 700. In yet a further aspect, each occurrence of r" is an integer independently selected from 4 to 600. In an even further aspect, each occurrence of r" is an integer independently selected from 4 to 500. In a still further aspect, each occurrence of r" is an integer independently selected from 4 to 400. In yet a further aspect, each occurrence of r" is an integer independently selected from 4 to 300. In an even further aspect, each occurrence of r" is an integer independently selected from 4 to 200. In a still further aspect, each occurrence of r" is an integer independently selected from 4 to 100.

In one aspect, s is an integer selected from 2, 3, 4, 5, 6, 7, and 8. In a further aspect, s is an integer selected from 2, 3, 4, 5, 6, and 7. In a still further aspect, s is an integer selected from 2, 3, 4, 5, and 6. In yet a further aspect, s is an integer selected from 2, 3, 4, and 5. In an even further aspect, s is an integer selected from 2, 3, and 4. In a still further aspect, s is an integer selected from 2 and 3. In yet a further aspect, s is 8. In an even further aspect, s is 7. In a still further aspect, s is 6. In yet a further aspect, s is 5. In an even further aspect, s is 4. In a still further aspect, s is 3. In yet a further aspect, s is 2.

In one aspect, t is an integer selected from 1 to 500. In a further aspect, t is an integer selected from 1 to 400. In a still further aspect, t is an integer selected from 1 to 300. In yet a further aspect, t is an integer selected from 1 to 200. In an even further aspect, t is an integer selected from 1 to 100. In a still further aspect, t is an integer selected from 100 to 500. In yet a further aspect, t is an integer selected from 200 to 500. In an even further aspect, t is an integer selected from 300 to 500. In a still further aspect, t is an integer selected from 400 to 500.

In one aspect, each occurrence of m is an integer independently selected from 5 to 300 and each occurrence of p is an integer independently selected from 2 to 800. In a further aspect, each occurrence of m is an integer independently selected from 5 to 275 and each occurrence of p is an integer independently selected from 2 to 700. In a still further aspect, each occurrence of m is an integer independently selected from 5 to 250 and each occurrence of p is an integer independently selected from 2 to 600. In yet a further aspect, each occurrence of m is an integer independently selected from 5 to 225 and each occurrence of p is an integer independently selected from 2 to 500. In an even further aspect, each occurrence of m is an integer independently selected from 5 to 200 and each occurrence of p is an integer independently selected from 2 to 400. In a still further aspect, each occurrence of m is an integer independently selected from 5 to 175 and each occurrence of p is an integer independently selected from 2 to 50. In yet a further aspect, each occurrence of m is an integer independently selected from 5 to 150 and each occurrence of p is an integer independently selected from 2 to 100. In an even further aspect, each occurrence of m is an integer independently selected from 5 to 200 and each occurrence of p is an integer independently selected from 2 to 200.

In one aspect, each occurrence of m is an integer independently selected from 5 to 300, each occurrence of p is an integer independently selected from 2 to 800, and each occurrence of r and r' is an integer independently selected from 2 to 800. In a further aspect, each occurrence of m is an integer independently selected from 5 to 275, each occurrence of p is an integer independently selected from 2 to 700, and each occurrence of r and r' is an integer independently selected from 2 to 700. In a still further aspect, each occurrence of m is an integer independently selected from 5 to 250, each occurrence of p is an integer independently selected from 2 to 600, and each occurrence of r and r' is an integer independently selected from 2 to 600. In yet a further aspect, each occurrence of m is an integer independently selected from 5 to 225, each occurrence of p is an integer independently selected from 2 to 500, and each occurrence of r and r' is an integer independently selected from 2 to 500. In an even further aspect, each occurrence of m is an integer independently selected from 5 to 200, each occurrence of p is an integer independently selected from 2 to 400, and each occurrence of r and r' is an integer independently selected from 2 to 400. In a still further aspect, each occurrence of m is an integer independently selected from 5 to 175, each occurrence of p is an integer independently selected from 2 to 200, and each occurrence of r and r' is an integer independently selected from 2 to 200. In yet a further aspect, each occurrence of m is an integer independently selected from 5 to 150, each occurrence of p is an integer independently selected from 2 to 200, and each occurrence of r and r' is an integer independently selected from 4 to 200. In an even further aspect, each occurrence of m is an integer independently selected from 5 to 125, each occurrence of p is an integer independently selected from 2 to 100, and each occurrence of r and r' is an integer independently selected from 2 to 100. In a still further aspect, each occurrence of m is an integer independently selected from 5 to 200, each occurrence of p is an integer independently selected from 2 to 200, and each occurrence of r and r' is an integer independently selected from 2 to 200. In yet a further aspect, each occurrence of m is an integer independently selected from 5 to 200, each occurrence of p is an integer independently selected from 2 to 200, and each occurrence of r and r' is an integer independently selected from 4 to 200.

a. $A^1$, $A^2$, and $A^3$ Groups

In one aspect, $A^1$ is selected from O and NH. In a further aspect, $A^1$ is O. In a still further aspect, $A^1$ is NH.

In one aspect, each of $A^2$ and $A^3$ is selected from O and NH. In a further aspect, each of $A^2$ and $A^3$ is O. In a still further aspect, each of $A^2$ and $A^3$ is NH.

In one aspect, each occurrence of $A^1$, $A^2$, and $A^3$ is independently selected from O and NH. In a further aspect, each occurrence of $A^1$ is O and each occurrence of $A^2$ and $A^3$ is independently selected from O and NH. In a still further aspect, each occurrence of $A^1$ is NH and each occurrence of $A^2$ and $A^3$ is independently selected from O and NH. In yet a further aspect, each occurrence of $A^1$, $A^2$, and $A^3$ is O. In an even further aspect, each occurrence of $A^1$, $A^2$, and $A^3$ is NH.

b. L and L' Groups

In one aspect, each occurrence of L and L' is independently a residue of a radical initiator.

In a further aspect, the residue of a radical initiator is a structure represented by a formula:

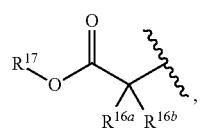

wherein each of $R^{16a}$ and $R^{16b}$ is independently selected from hydrogen and C1-C10 alkyl; wherein $R^{17}$ is selected from C1-C8 alkyl, —(C1-C8 alkyl)-O—(C=O)(C1-C8 alkyl), and $Cy^3$ and substituted with 0 or 1 group selected from —OH, —CN, —NO$_2$, and —N$_3$; and wherein $Cy^3$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl.

In a further aspect, the residue of a radical initiator is a structure represented by a formula:

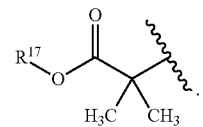

In a further aspect, the residue of a radical initiator is a structure represented by a formula:

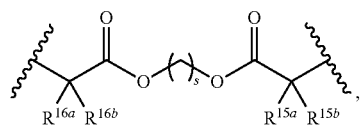

wherein s is an integer selected from 2, 3, 4, 5, 6, 7, and 8; wherein each of $R^{15a}$ and $R^{15b}$ is independently selected from hydrogen and C1-C10 alkyl; and wherein $R^{17}$ is selected from —OH, —N$_3$, —CCH, and methyl.

In a further aspect, the residue of a radical initiator is a structure represented by a formula:

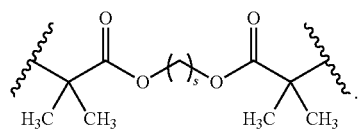

In a further aspect, the residue of a radical initiator is a structure represented by a formula:

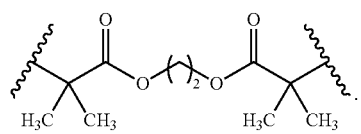

In a further aspect, the residue of a radical initiator is a structure represented by a formula:

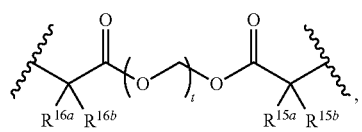

wherein t is an integer selected from 1 to 500; and wherein each of $R^{15a}$, $R^{15b}$, $R^{16a}$, and $R^{16b}$ is independently selected from hydrogen and C1-C10 alkyl.

In a further aspect, the residue of a radical initiator is a structure represented by a formula:

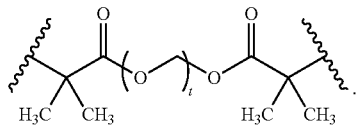

c. Q, Q', and Q" Groups

In one aspect, each occurrence of Q and Q' is independently a residue of a quenching agent.

In one aspect, each occurrence of Q" is independently a residue of a quenching agent.

In a further aspect, the residue of a quenching agent is selected from hydrogen, halogen, —OH, —$N_3$, and C2-C10 alkenyl. In a further aspect, the residue of a quenching agent is selected from hydrogen, bromine, chlorine, —OH, —$N_3$, and C2-C8 alkenyl. In a still further aspect, the residue of a quenching agent is selected from hydrogen, bromine, chlorine, —OH, —$N_3$, and C2-C4 alkenyl.

In a further aspect, the residue of a quenching agent is selected from hydrogen, —OH, and —$N_3$. In a still further aspect, the residue of a quenching agent is selected from hydrogen and —OH. In yet a further aspect, the residue of a quenching agent is selected from hydrogen and —$N_3$. In an even further aspect, the residue of a quenching agent is —OH. In a still further aspect, the residue of a quenching agent is —$N_3$.

In a further aspect, the residue of a quenching agent is selected from hydrogen and C2-C10 alkenyl. In a still further aspect, the residue of a quenching agent is selected from hydrogen and C2-C8 alkenyl. In yet a further aspect, the residue of a quenching agent is selected from hydrogen and C2-C4 alkenyl. In an even further aspect, the residue of a quenching agent is selected from hydrogen, ethenyl, 1-propenyl, and 2-propenyl. In a still further aspect, the residue of a quenching agent is selected from hydrogen and ethenyl.

In a further aspect, the residue of a quenching agent is selected from hydrogen and halogen. In a still further aspect, the residue of a quenching agent is selected from hydrogen, bromine, and chlorine. In yet a further aspect, the residue of a quenching agent is selected from hydrogen and bromine. In an even further aspect, the residue of a quenching agent is selected from hydrogen and chlorine. In a still further aspect, the residue of a quenching agent is bromine. In yet a further aspect, the residue of a quenching agent is chlorine. In an even further aspect, the residue of a quenching agent is hydrogen.

d. $R^1$, $R^{2A}$, $R^{2B}$, $R^{3A}$, $R^{3B}$, $R^{4A}$, and $R^{4B}$ Groups

In one aspect, each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$. In a further aspect, each occurrence of $R^1$, $R^{2a}$, $R^{2b}$, $R^{3a}$, $R^{3b}$, $R^{4a}$, and $R^{4b}$ is independently selected from C1-C8 alkyl, $Cy^1$, and $Ar^1$. In a still further aspect, each occurrence of $R^1$, $R^{2a}$, $R^{2b}$, $R^{3a}$, $R^{3b}$, $R^{4a}$, and $R^{4b}$ is independently selected from C1-C4 alkyl, $Cy^1$, and $Ar^1$. In yet a further aspect, each occurrence of $R^1$, $R^{2a}$, $R^{2b}$, $R^{3a}$, $R^{3b}$, $R^{4a}$, and $R^{4b}$ is independently selected from methyl, ethyl, n-propyl, i-propyl, $Cy^1$, and $Ar^1$. In a still further aspect, each occurrence of $R^1$, $R^{2a}$, $R^{2b}$, $R^{3a}$, $R^{3b}$, $R^{4a}$, and $R^{4b}$ is independently selected from methyl, ethyl, $Cy^1$, and $Ar^1$. In yet a further aspect, each occurrence of $R^1$, $R^{2a}$, $R^{2b}$, $R^{3a}$, $R^{3b}$, $R^{4a}$, and $R^{4b}$ is independently selected from methyl, $Cy^1$, and $Ar^1$.

In a further aspect, each occurrence of $R^1$, $R^{2a}$, $R^{2b}$, $R^{3a}$, $R^{3b}$, $R^{4a}$, and $R^{4b}$ is independently selected from $Cy^1$ and $Ar^1$. In a still further aspect, each occurrence of $R^1$, $R^{2a}$, $R^{2b}$, $R^{3a}$, $R^{3b}$, $R^{4a}$, and $R^{4b}$ is $Cy^1$. In yet a further aspect, each occurrence of $R^1$, $R^{2a}$, $R^{2b}$, $R^{3a}$, $R^{3b}$, $R^{4a}$, and $R^{4b}$ is $Ar^1$.

In a further aspect, each occurrence of $R^1$, $R^{2a}$, $R^{2b}$, $R^{3a}$, $R^{3b}$, $R^{4a}$, and $R^{4b}$ is independently selected from C1-C10 alkyl. In a still further aspect, each occurrence of $R^1$, $R^{2a}$, $R^{2b}$, $R^{3a}$, $R^{3b}$, $R^{4a}$, and $R^{4b}$ is independently selected from C1-C8 alkyl. In yet a further aspect, each occurrence of $R^1$, $R^{2a}$, $R^{2b}$, $R^{3a}$, $R^{3b}$, $R^{4a}$, and $R^{4b}$ is independently selected from C1-C4 alkyl. In an even further aspect, each occurrence of $R^1$, $R^{2a}$, $R^{2b}$, $R^{3a}$, $R^{3b}$, $R^{4a}$, and $R^{4b}$ is independently selected from methyl, ethyl, n-propyl, and i-propyl. In a still further aspect, each occurrence of $R^1$, $R^{2a}$, $R^{2b}$, $R^{3a}$, $R^{3b}$, $R^{4a}$, and $R^{4b}$ is independently selected from methyl and ethyl. In yet a further aspect, each occurrence of $R^1$, $R^{2a}$, $R^{2b}$, $R^{3a}$, $R^{3b}$, $R^{4a}$, and $R^{4b}$ is ethyl. In an even further aspect, each occurrence of $R^1$, $R^{2a}$, $R^{2b}$, $R^{3a}$, $R^{3b}$, $R^{4a}$, and $R^{4b}$ is methyl.

e. $R^{5A}$ and $R^{5B}$ Groups

In one aspect, each occurrence of $R^{5a}$ and $R^{5b}$ is independently selected from hydrogen and C1-C10 alkyl. In a further aspect, each occurrence of $R^{5a}$ and $R^{5b}$ is hydrogen.

In a further aspect, each occurrence of $R^{5a}$ and $R^{5b}$ is independently selected from hydrogen and C1-C8 alkyl. In a still further aspect, each occurrence of $R^{5a}$ and $R^{5b}$ is independently selected from hydrogen and C1-C4 alkyl. In yet a further aspect, each occurrence of $R^{5a}$ and $R^{5b}$ is independently selected from hydrogen, methyl, ethyl, n-propyl, and i-propyl. In an even further aspect, each occurrence of $R^{5a}$ and $R^{5b}$ is independently selected from hydrogen, methyl, and ethyl. In a still further aspect, each occurrence of $R^{5a}$ and $R^{5b}$ is independently selected from hydrogen and ethyl. In yet a further aspect, each occurrence of $R^{5a}$ and $R^{5b}$ is independently selected from hydrogen and methyl.

In a further aspect, each occurrence of $R^{5a}$ and $R^{5b}$ is independently C1-C10 alkyl. In a still further aspect, each occurrence of $R^{5a}$ and $R^{5b}$ is independently C1-C8 alkyl. In yet a further aspect, each occurrence of $R^{5a}$ and $R^{5b}$ is independently C1-C4 alkyl. In an even further aspect, each occurrence of $R^{5a}$ and $R^{5b}$ is independently selected from methyl, ethyl, n-propyl, and i-propyl. In a still further aspect, each occurrence of $R^{5a}$ and $R^{5b}$ is independently selected from methyl and ethyl. In yet a further aspect, each occurrence of $R^{5a}$ and $R^{5b}$ is ethyl. In an even further aspect, each occurrence of $R^{5a}$ and $R^{5b}$ is methyl.

f. $R^6$ Groups

In one aspect, $R^6$ is C2-C10 alkenyl, wherein the unsaturated bond is alpha to the carbonyl. In a further aspect, $R^6$ is C2-05 alkenyl. In a still further aspect, $R^6$ is selected from ethenyl, 1-propenyl, and 2-propenyl. In yet a further aspect, $R^6$ is 1-propenyl. In an even further aspect, $R^6$ is 2-propenyl. In a still further aspect, $R^6$ is ethenyl.

In a further aspect, $R^6$ has a structure represented by a formula selected from:

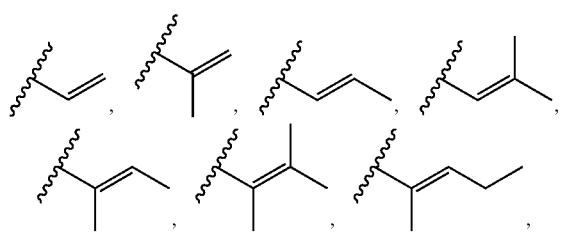

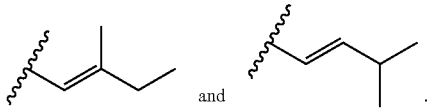
and .

g. $R^7$ and $R^{12}$ Groups

In one aspect, each of $R^7$ and $R^{12}$ is independently C2-C10 alkenyl, wherein the unsaturated bond is alpha to the carbonyl. In a further aspect, each of $R^7$ and $R^{12}$ is independently C2-C5 alkenyl. In a still further aspect, each of $R^7$ and $R^{12}$ is independently selected from ethenyl, 1-propenyl, and 2-propenyl. In yet a further aspect, each of $R^7$ and $R^{12}$ is 1-propenyl. In an even further aspect, each of $R^7$ and $R^{12}$ is 2-propenyl. In a still further aspect, each of $R^7$ and $R^{12}$ is ethenyl.

In a further aspect, each of $R^7$ and $R^{12}$ has a structure represented by a formula independently selected from:

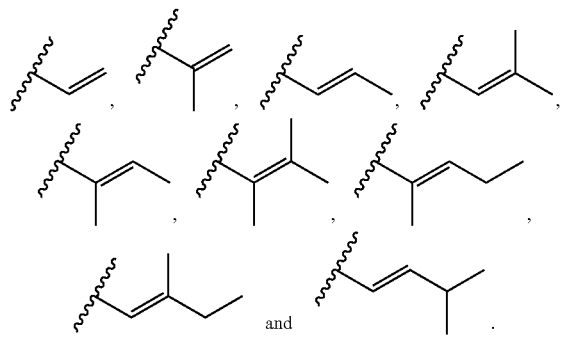
and .

h. $R^{8A}$, $R^{8B}$, $R^{11A}$, and $R^{11B}$ Groups

In one aspect, each occurrence of $R^{8a}$, $R^{8b}$, $R^{11a}$, and $R^{11b}$ is independently selected from hydrogen and C1-C10 alkyl. In a further aspect, each occurrence of $R^{8a}$, $R^{8b}$, $R^{11a}$, and $R^{11b}$ is hydrogen.

In a further aspect, each occurrence of $R^{8a}$, $R^{8b}$, $R^{11a}$, and $R^{11b}$ is independently selected from hydrogen and C1-C8 alkyl. In a still further aspect, each occurrence of $R^{8a}$, $R^{8b}$, $R^{11a}$, and $R^{11b}$ is independently selected from hydrogen and C1-C4 alkyl. In yet a further aspect, each occurrence of $R^{8a}$, $R^{8b}$, $R^{11a}$, and $R^{11b}$ is independently selected from hydrogen, methyl, ethyl, n-propyl, and i-propyl. In an even further aspect, each occurrence of $R^{8a}$, $R^{8b}$, $R^{11a}$, and $R^{11b}$ is independently selected from hydrogen, methyl, and ethyl. In a still further aspect, each occurrence of $R^{8a}$, $R^{8b}$, $R^{11a}$, and $R^{11b}$ is independently selected from hydrogen and methyl. In yet a further aspect, each occurrence of $R^{8a}$, $R^{8b}$, $R^{11a}$, and $R^{11b}$ is independently selected from hydrogen and ethyl.

In a further aspect, each occurrence of $R^{8a}$, $R^{8b}$, $R^{11a}$, and $R^{11b}$ is independently C1-C10 alkyl. In a still further aspect, each occurrence of $R^{8a}$, $R^{8b}$, $R^{11a}$, and $R^{11b}$ is independently C1-C8 alkyl. In yet a further aspect, each occurrence of $R^{8a}$, $R^{8b}$, $R^{11a}$, and $R^{11b}$ is independently C1-C4 alkyl. In an even further aspect, each occurrence of $R^{8a}$, $R^{8b}$, $R^{11a}$, and $R^{11b}$ is independently selected from methyl, ethyl, n-propyl, and i-propyl. In a still further aspect, each occurrence of $R^{8a}$, $R^{8b}$, $R^{11a}$, and $R^{11b}$ is independently selected from methyl and ethyl. In yet a further aspect, each occurrence of $R^{8a}$, $R^{8b}$, $R^{11a}$, and $R^{11b}$ is ethyl.

In an even further aspect, each occurrence of $R^{8a}$, $R^{8b}$, $R^{11a}$, and $R^{11b}$ is methyl.

i. $R^{9A}$, $R^{9B}$, $R^{10A}$, and $R^{10B}$ Groups

In one aspect, each occurrence of $R^{9a}$, $R^{9b}$, $R^{10a}$, and $R^{10b}$ is independently selected from C1-C10 alkyl, $Cy^2$, and $Ar^2$. In a further aspect, each occurrence of $R^{9a}$, $R^{9b}$, $R^{10a}$, and $R^{10b}$ is independently selected from C1-C8 alkyl, $Cy^2$, and $Ar^2$. In a still further aspect, each occurrence of $R^{9a}$, $R^{9b}$, $R^{10a}$, and $R^{10b}$ is independently selected from C1-C4 alkyl, $Cy^2$, and $Ar^2$. In yet a further aspect, each occurrence of $R^{9a}$, $R^{9b}$, $R^{10a}$, and $R^{10b}$ is independently selected from methyl, ethyl, n-propyl, i-propyl, $Cy^2$, and $Ar^2$. In an even further aspect, each occurrence of $R^{9a}$, $R^{9b}$, $R^{10a}$, and $R^{10b}$ is independently selected from methyl, ethyl, $Cy^2$, and $Ar^2$. In a still further aspect, each occurrence of $R^{9a}$, $R^{9b}$, $R^{10a}$, and $R^{10b}$ is independently selected from methyl, $Cy^2$, and $Ar^2$.

In a further aspect, each occurrence of $R^{9a}$, $R^{9b}$, $R^{10a}$, and $R^{10b}$ is independently selected from $Cy^2$ and $Ar^2$. In a still further aspect, each occurrence of $R^{9a}$, $R^{9b}$, $R^{10a}$, and, $R^{10b}$ is $Cy^2$. In yet a further aspect, each occurrence of $R^{9a}$, $R^{9b}$, $R^{10a}$, and $R^{10b}$ is $Ar^2$.

In a further aspect, each occurrence of $R^{9a}$, $R^{9b}$, $R^{10a}$, and $R^{10b}$ is independently selected from C1-C10 alkyl. In a still further aspect, each occurrence of $R^{9a}$, $R^{9b}$, $R^{10a}$, and $R^{10b}$ is independently selected from C1-C8 alkyl. In yet a further aspect, each occurrence of $R^{9a}$, $R^{9b}$, $R^{10a}$, and $R^{10b}$ is independently selected from C1-C4 alkyl. In an even further aspect, each occurrence of $R^{9a}$, $R^{9b}$, $R^{10a}$, and $R^{10b}$ is independently selected from methyl, ethyl, n-propyl, and i-propyl. In a still further aspect, each occurrence of $R^{9a}$, $R^{9b}$, $R^{10a}$, and $R^{10b}$ is independently selected from methyl and ethyl. In yet a further aspect, each occurrence of $R^{9a}$, $R^{9b}$, $R^{10a}$, $R^{10b}$ is ethyl. In an even further aspect, each occurrence of $R^{9a}$, $R^{9b}$, $R^{10a}$, and $R^{10b}$ is methyl.

j. $R^{13}$ and $R^{13''}$ Groups

In one aspect, each occurrence of $R^{13}$ is a structure represented by a formula selected from:

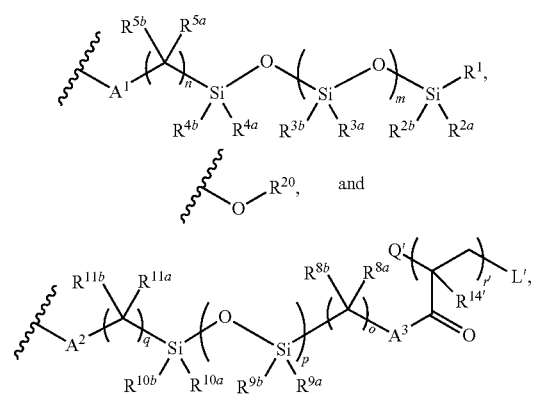

provided that at least one occurrence of $R^{13}$ is a structure represented by a formula selected from:

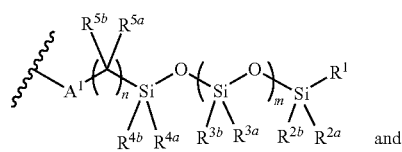
and

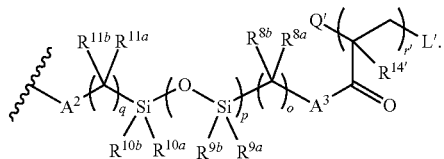

In one aspect, each occurrence of $R^{13''}$ is a structure represented by a formula selected from:

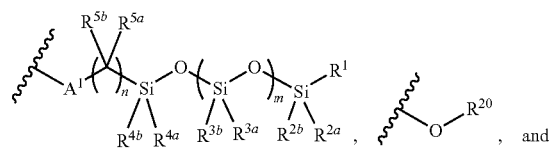

In one aspect, each occurrence of $R^{13''}$ is a structure represented by a formula selected from:

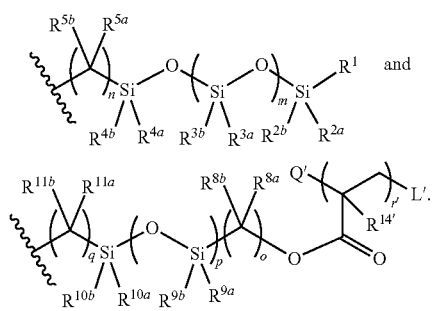

In one aspect, each occurrence of $R^{13}$ is a structure represented by a formula selected from:

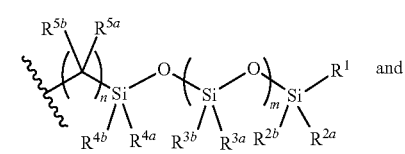

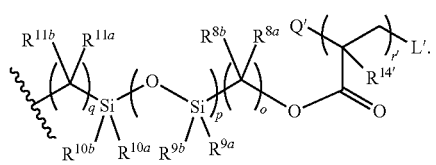

In one aspect, each occurrence of $R^{13''}$ is a structure represented by a formula selected from:

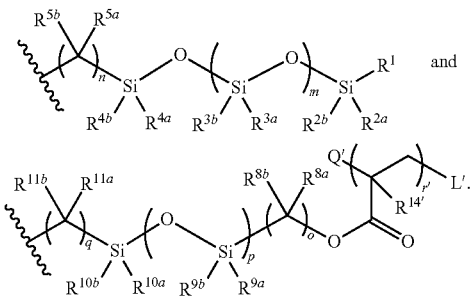

In a further aspect, each occurrence of $R^{13}$ is a structure represented by a formula selected from:

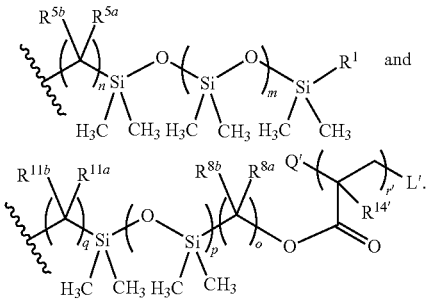

In a further aspect, each occurrence of $R^{13}$ is a structure represented by a formula selected from:

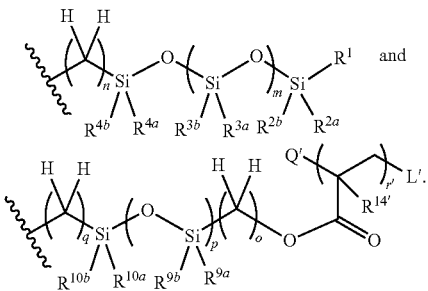

In a further aspect, each occurrence of $R^{13}$ is a structure represented by a formula selected from:

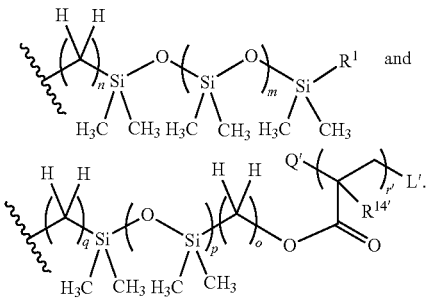

In a further aspect, at least one occurrence of $R^{13}$ is a structure having a formula:

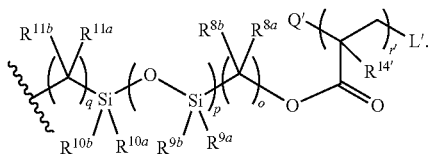

In a further aspect, at least one occurrence of $R^{13}$ is a structure having a formula:

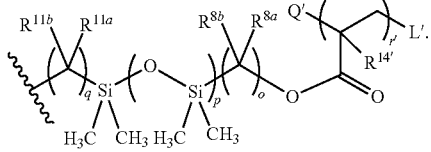

In a further aspect, at least one occurrence of $R^{13}$ is a structure having a formula:

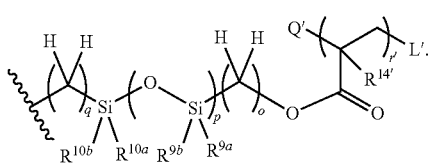

In a further aspect, at least one occurrence of $R^{13}$ is a structure having a formula:

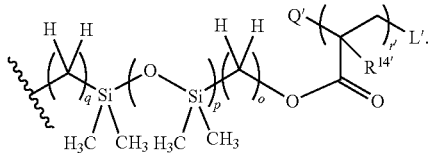

In a further aspect, each occurrence of $R^{13}$ is a structure represented by a formula selected from:

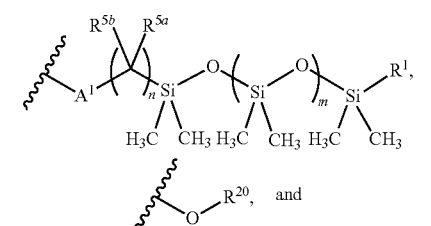

In a further aspect, each occurrence of $R^{13}$ is a structure represented by a formula selected from:

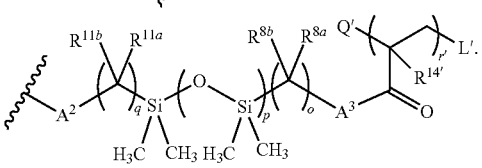

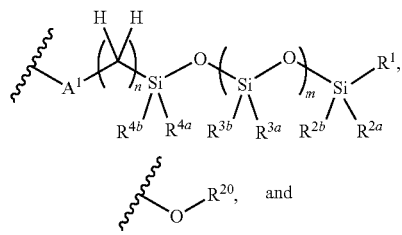

In a further aspect, each occurrence of $R^{13}$ is a structure represented by a formula selected from:

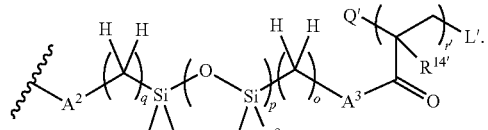

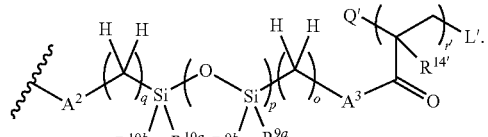

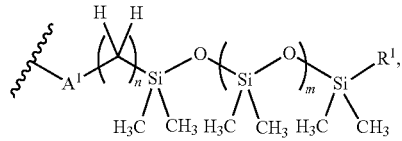
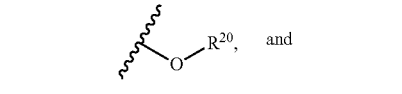

In a further aspect, at least one occurrence of $R^{13}$ is a structure having a formula:

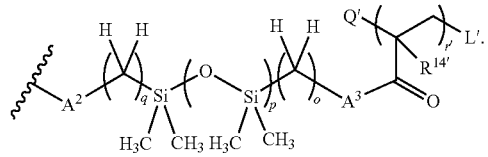

In a further aspect, at least one occurrence of $R^{13}$ is a structure having a formula:

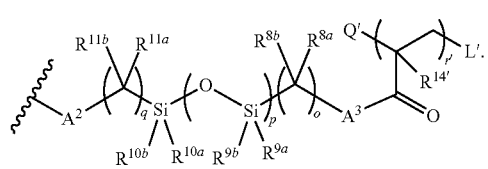

In a further aspect, at least one occurrence of $R^{13}$ is a structure having a formula:

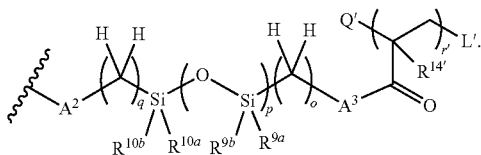

In a further aspect, at least one occurrence of $R^{13}$ is a structure having a formula:

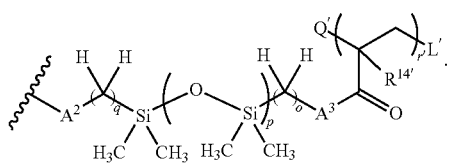

In a further aspect, each occurrence of $R^{13''}$ is a structure represented by a formula selected from:

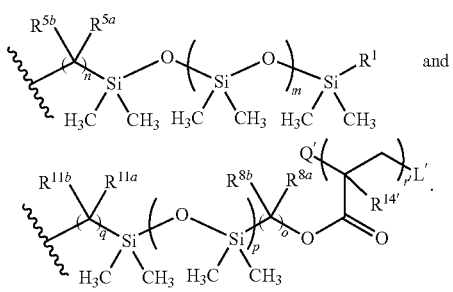

In a further aspect, each occurrence of $R^{13''}$ is a structure represented by a formula selected from:

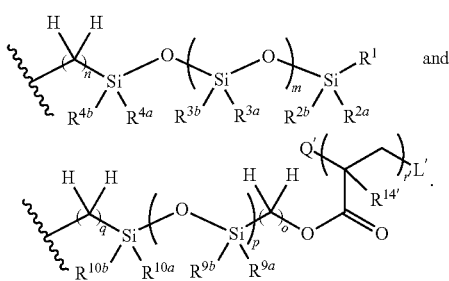

In a further aspect, each occurrence of $R^{13''}$ is a structure represented by a formula selected from:

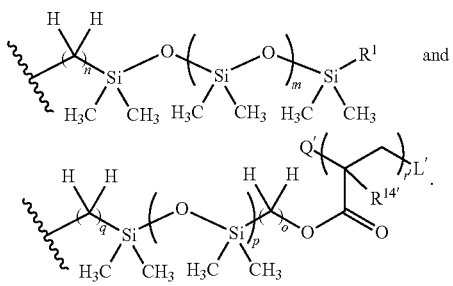

In a further aspect, at least one occurrence of $R^{13''}$ is a structure having a formula:

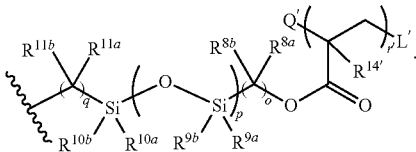

In a further aspect, at least one occurrence of $R^{13''}$ is a structure having a formula:

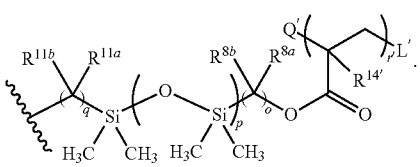

In a further aspect, at least one occurrence of $R^{13''}$ is a structure having a formula:

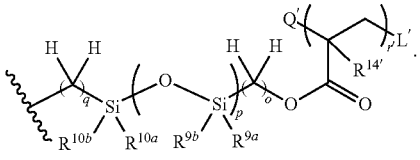

In a further aspect, at least one occurrence of $R^{13''}$ is a structure having a formula:

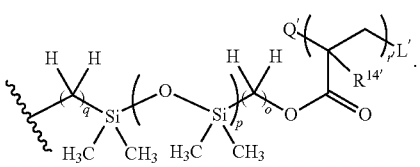

In a further aspect, each occurrence of $R^{13}$ is a structure represented by a formula selected from:

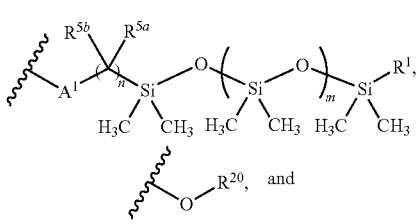

In a further aspect, each occurrence of $R^{13}$ is a structure represented by a formula selected from:

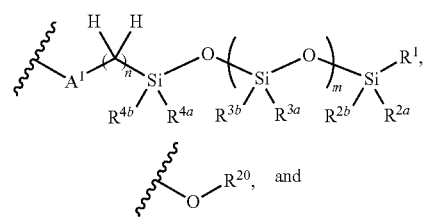

In a further aspect, each occurrence of $R^{13}$ is a structure represented by a formula selected from:

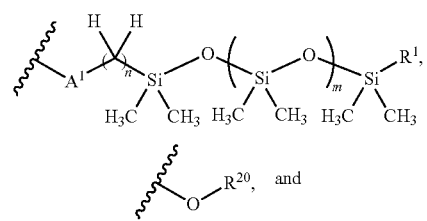

In a further aspect, at least one occurrence of $R^{13}$ is a structure having a formula:

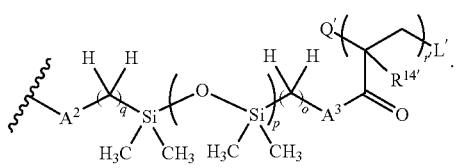

In a further aspect, at least one occurrence of $R^{13}$ is a structure having a formula:

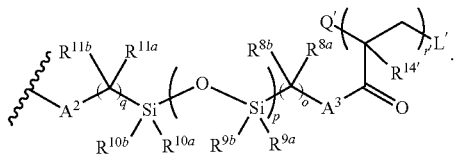

In a further aspect, at least one occurrence of $R^{13}$ is a structure having a formula:

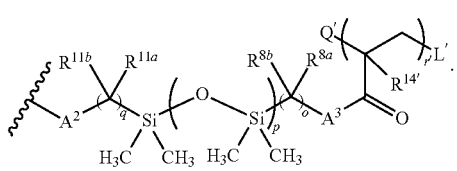

In a further aspect, at least one occurrence of $R^{13}$ is a structure having a formula:

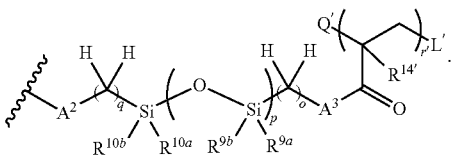

In a further aspect, at least one occurrence of $R^{13''}$ is a structure having a formula:

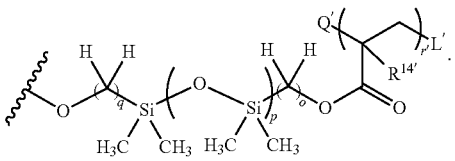

In a further aspect, each occurrence of $R^{13''}$ is a structure represented by a formula selected from:

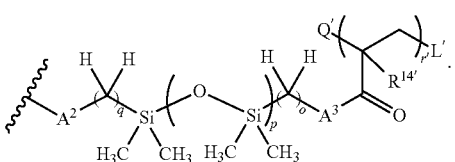

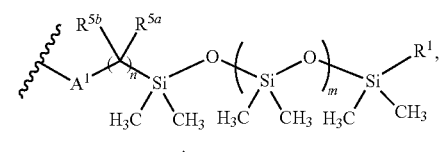

In a further aspect, each occurrence of $R^{13'''}$ is a structure represented by a formula selected from:

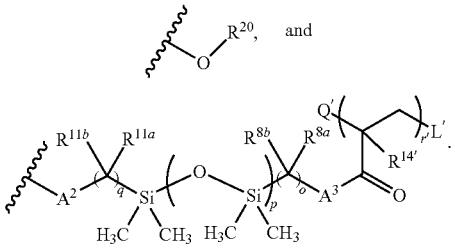

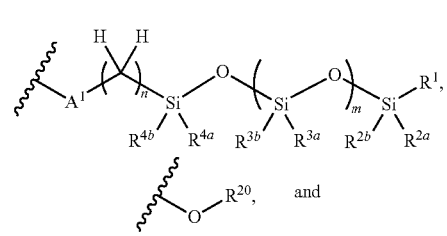

In a further aspect, each occurrence of $R^{13"}$ is a structure represented by a formula selected from:

[Chemical structure diagrams]

In a further aspect, at least one occurrence of $R^{13"}$ is a structure having a formula:

[Chemical structure diagram]

In a further aspect, at least one occurrence of $R^{13"}$ is a structure having a formula:

[Chemical structure diagram]

In a further aspect, at least one occurrence of $R^{13"}$ is a structure having a formula:

[Chemical structure diagram]

In a further aspect, at least one occurrence of $R^{13"}$ is a structure having a formula:

[Chemical structure diagram]

k. $R^{14}$, $R^{14'}$, and $R^{14"}$ Groups

In one aspect, each occurrence of $R^{14}$ and $R^{14'}$ is independently selected from hydrogen and C1-C10 alkyl. In a further aspect, each occurrence of $R^{14}$ and $R^{14'}$ is hydrogen.

In one aspect, each occurrence of $R^{14"}$ is independently selected from hydrogen and C1-C10 alkyl. In a further aspect, each occurrence of $R^{14"}$ is hydrogen.

In a further aspect, $R^{14}$ is selected from hydrogen and C1-C4 alkyl. In a still further aspect, $R^{14}$ is C1-C4 alkyl.

In a further aspect, each occurrence of $R^{14}$ and $R^{14'}$ is independently selected from hydrogen and C1-C8 alkyl. In a still further aspect, each occurrence of $R^{14}$ and $R^{14'}$ is independently selected from hydrogen and C1-C4 alkyl. In yet a further aspect, each occurrence of $R^{14}$ and $R^{14'}$ is independently selected from hydrogen, methyl, ethyl, n-propyl, and i-propyl. In an even further aspect, each occurrence of $R^{14}$ and $R^{14'}$ is independently selected from hydrogen, methyl, and ethyl. In a still further aspect, each occurrence of $R^{14}$ and $R^{14'}$ is independently selected from hydrogen and methyl. In yet a further aspect, each occurrence of $R^{14}$ and $R^{14'}$ is independently selected from hydrogen and ethyl.

In a further aspect, each occurrence of $R^{14}$ and $R^{14'}$ is independently C1-C10 alkyl. In a still further aspect, each occurrence of $R^{14}$ and $R^{14'}$ is independently C1-C8 alkyl. In yet a further aspect, each occurrence of $R^{14}$ and $R^{14'}$ is independently C1-C4 alkyl. In an even further aspect, each occurrence of $R^{14}$ and $R^{14'}$ is independently selected from methyl, ethyl, n-propyl, and i-propyl. In a still further aspect, each occurrence of $R^{14}$ and $R^{14'}$ is independently selected from methyl and ethyl. In yet a further aspect, each occurrence of $R^{14}$ and $R^{14'}$ is ethyl. In an even further aspect, each occurrence of $R^{14}$ and $R^{14'}$ is methyl.

In a further aspect, each occurrence of $R^{14"}$ is independently selected from hydrogen and C1-C8 alkyl. In a still further aspect, each occurrence of $R^{14"}$ is independently selected from hydrogen and C1-C4 alkyl. In yet a further aspect, each occurrence of $R^{14"}$ is independently selected from hydrogen, methyl, ethyl, n-propyl, and i-propyl. In an even further aspect, each occurrence of $R^{14"}$ is independently selected from hydrogen, methyl, and ethyl. In a still further aspect, each occurrence of $R^{14"}$ is independently selected from hydrogen and methyl. In yet a further aspect, each occurrence of $R^{14"}$ is independently selected from hydrogen and ethyl.

In a further aspect, each occurrence of $R^{14"}$ is independently C1-C10 alkyl. In a still further aspect, each occurrence of $R^{14"}$ is independently C1-C8 alkyl. In yet a further aspect, each occurrence of $R^{14'''}$ is independently C1-C4 alkyl. In an even further aspect, each occurrence of $R^{14"}$ is independently selected from methyl, ethyl, n-propyl, and i-propyl. In a still further aspect, each occurrence of $R^{14"}$ is independently selected from methyl and ethyl. In yet a further aspect, each occurrence of $R^{14"}$ is ethyl. In an even further aspect, each occurrence of $R^{14"}$ is methyl.

l. $R^{15A}$, $R^{15B}$, $R^{16A}$, and $R^{16B}$ Groups

In one aspect, each of $R^{15a}$, $R^{15b}$, $R^{16a}$, and $R^{16b}$, is independently selected from hydrogen and C1-C10 alkyl. In a further aspect, each of $R^{15a}$, $R^{15b}$, $R^{16a}$, and $R^{16b}$ is hydrogen.

In a further aspect, each of $R^{15a}$, $R^{15b}$, $R^{16a}$, and $R^{16b}$, is independently selected from hydrogen and C1-C8 alkyl. In a still further aspect, each of $R^{15a}$, $R^{15b}$, $R^{16a}$, and $R^{16b}$ is independently selected from hydrogen and C1-C4 alkyl. In yet a further aspect, each of $R^{15a}$, $R^{15b}$, $R^{16a}$, and $R^{16b}$ is independently selected from hydrogen, methyl, ethyl, n-propyl, and i-propyl. In even further aspect, each of $R^{15a}$, $R^{15b}$, $R^{16a}$, and $R^{16b}$ is independently selected from hydrogen, methyl, and ethyl. In a still further aspect, each of $R^{15a}$, $R^{15b}$, $R^{16a}$, and $R^{16b}$ is independently selected from hydrogen and methyl. In yet a further aspect, each of $R^{15a}$, $R^{15b}$, $R^{16a}$, and $R^{16b}$ is independently selected from hydrogen and ethyl.

In a further aspect, each of $R^{15a}$, $R^{15b}$, $R^{16a}$, and $R^{16b}$ is independently C1-C10 alkyl. In a still further aspect, each of $R^{15a}$, $R^{15b}$, $R^{16a}$, and $R^{16b}$ is independently C1-C8 alkyl. In yet a further aspect, each of $R^{15a}$, $R^{15b}$, $R^{16a}$, and $R^{16b}$ is independently C1-C4 alkyl. In an even further aspect, each of $R^{15a}$, $R^{15b}$, $R^{16a}$, and $R^{16b}$ is independently selected from methyl, ethyl, n-propyl, and i-propyl. In a still further aspect, each of $R^{15a}$, $R^{15b}$, $R^{16a}$, and $R^{16b}$ is independently selected from methyl and ethyl. In yet a further aspect, each of $R^{15a}$, $R^{15b}$, $R^{16a}$, and $R^{16b}$ is ethyl. In an even further aspect, each of $R^{15a}$, $R^{15b}$, $R^{16a}$, and $R^{16b}$ is methyl.

m. $R^{17}$ Groups

In one aspect, $R^{17}$ is selected from —OH, —CN, —NO$_2$, —N$_3$, C1-C8 alkyl, —(C1-C8 alkyl)-O—(C=O)(C1-C8 alkyl), and Cy$^3$ and substituted with 0 or 1 group selected from —OH, —CN, —NO$_2$, and —N$_3$. In a further aspect, $R^{17}$ is selected from —OH, —CN, —NO$_2$, —N$_3$, C1-C4 alkyl, —(C1-C4 alkyl)-O—(C=O)(C1-C4 alkyl), and Cy$^3$ and substituted with 0 or 1 group selected from —OH, —CN, —NO$_2$, and —N$_3$.

In a further aspect, $R^{17}$ is selected from —OH, —CN, —NO$_2$, —N$_3$, C1-C8 alkyl, —(C1-C8 alkyl)-O—(C=O)(C1-C8 alkyl), and Cy$^3$ and monosubstituted with a group selected from —OH, —CN, —NO$_2$, and —N$_3$. In a still further aspect, $R^{17}$ is selected from —OH, —CN, —NO$_2$, —N$_3$, C1-C8 alkyl, —(C1-C8 alkyl)-O—(C=O)(C1-C8 alkyl), and Cy$^3$ and unsubstituted.

In a further aspect, $R^{17}$ is selected from —OH, —CN, —NO$_2$, and —N$_3$. In a still further aspect, $R^{17}$ is selected from —OH, —CN, and —NO$_2$. In yet a further aspect, $R^{17}$ is selected from —OH and —CN. In an even further aspect, $R^{17}$ is —N$_3$. In a still further aspect, $R^{17}$ is —NO$_2$. In yet a further aspect, $R^{17}$ is —CN. In an even further aspect, $R^{17}$ is —OH.

In a further aspect, $R^{17}$ is selected from C1-C8 alkyl and —(C1-C8 alkyl)-O—(C=O)(C1-C8 alkyl) and substituted with 0 or 1 group selected from —OH, —CN, —NO$_2$, and —N$_3$. In a still further aspect, $R^{17}$ is selected from C1-C4 alkyl and —(C1-C4 alkyl)-O—(C=O)(C1-C4 alkyl) and substituted with 0 or 1 group selected from —OH, —CN, —NO$_2$, and —N$_3$. In yet a further aspect, $R^{17}$ is selected from methyl, ethyl, n-propyl, propyl, —CH$_2$CO$_2$CH$_3$, —CH$_2$CH$_2$CO$_2$CH$_3$, —CH$_2$CO$_2$CH$_2$CH$_3$, —CH$_2$CH$_2$CO$_2$CH$_2$CH$_3$, —CH$_2$CH$_2$CH$_2$CO$_2$CH$_3$, —CH$_2$CH(CH$_3$)CO$_2$CH$_3$, —CH(CH$_3$)CH$_2$CO$_2$CH$_3$, —CH$_2$CH$_2$CH$_2$CO$_2$CH$_2$CH$_3$, —CH$_2$CH(CH$_3$)CO$_2$CH$_2$CH$_3$, —CH$_2$CO$_2$CH$_2$CH$_2$CH$_3$, —CH$_2$CO$_2$CH(CH$_3$)$_2$, —CH$_2$CH$_2$CO$_2$CH$_2$CH$_2$CH$_3$, —CH$_2$CH$_2$CO$_2$CH(CH$_3$)$_2$, —CH$_2$CH$_2$CH$_2$CO$_2$CH$_2$CH$_2$CH$_3$, —CH$_2$CH(CH$_3$)CO$_2$CH$_2$CH$_2$CH$_3$, —CH$_2$CH$_2$CH$_2$CO$_2$CH(CH$_3$)$_2$, —CH$_2$CH(CH$_3$)CO$_2$CH(CH$_3$)$_2$, and —CH(CH$_3$)CH$_2$CO$_2$CH(CH$_3$)$_2$ and substituted with 0 or 1 group selected from —OH, —CN, —NO$_2$, and —N$_3$. In an even further aspect, $R^{17}$ is selected from methyl, ethyl, —CH$_2$CO$_2$CH$_3$, —CH$_2$CH$_2$CO$_2$CH$_3$, —CH$_2$CO$_2$CH$_2$CH$_3$, —CH$_2$CH$_2$CO$_2$CH$_2$CH$_3$, —CH$_2$CH$_2$CH$_2$CO$_2$CH$_3$, and substituted with 0 or 1 group selected from —OH, —CN, —NO$_2$, and —N$_3$. In a still further aspect, $R^{17}$ is selected from methyl, —CH$_2$CO$_2$CH$_3$ and substituted with 0 or 1 group selected from —OH, —CN, —NO$_2$, and —N$_3$.

In a further aspect, $R^{17}$ is selected from C1-C8 alkyl and —(C1-C8 alkyl)-O—(C=O)(C1-C8 alkyl) and monosubstituted with a group selected from —OH, —CN, —NO$_2$, and —N$_3$. In a still further aspect, $R^{17}$ is selected from C1-C8 alkyl and —(C1-C8 alkyl)-O—(C=O)(C1-C8 alkyl) and unsubstituted.

In a further aspect, $R^{17}$ is —(C1-C8 alkyl)-O—(C=O)(C1-C8 alkyl) substituted with 0 or 1 group selected from —OH, —CN, —NO$_2$, and —N$_3$. In a still further aspect, $R^{17}$ is —(C1-C4 alkyl)-O—(C=O)(C1-C4 alkyl) substituted with 0 or 1 group selected from —OH, —CN, —NO$_2$, and —N$_3$. In yet a further aspect, $R^{17}$ is selected from —CH$_2$CO$_2$CH$_3$, —CH$_2$CH$_2$CO$_2$CH$_3$, —CH$_2$CO$_2$CH$_2$CH$_3$, —CH$_2$CH$_2$CO$_2$CH$_2$CH$_3$, —CH$_2$CH$_2$CH$_2$CO$_2$CH$_3$, —CH$_2$CH(CH$_3$)CO$_2$CH$_3$, —CH(CH$_3$)CH$_2$CO$_2$CH$_3$, —CH$_2$CH$_2$CH$_2$CO$_2$CH$_2$CH$_3$, —CH$_2$CH(CH$_3$)CO$_2$CH$_2$CH$_3$, —CH$_2$CO$_2$CH$_2$CH$_2$CH$_3$, —CH$_2$CO$_2$CH(CH$_3$)$_2$, —CH$_2$CH$_2$CO$_2$CH$_2$CH$_2$CH$_3$, —CH$_2$CH$_2$CO$_2$CH(CH$_3$)$_2$, —CH$_2$CH$_2$CH$_2$CO$_2$CH$_2$CH$_2$CH$_3$, —CH$_2$CH(CH$_3$)CO$_2$CH$_2$CH$_2$CH$_3$, —CH$_2$CH$_2$CH$_2$CO$_2$CH(CH$_3$)$_2$, —CH$_2$CH(CH$_3$)CO$_2$CH(CH$_3$)$_2$, and —CH(CH$_3$)CH$_2$CO$_2$CH(CH$_3$)$_2$ and substituted with 0 or 1 group selected from —OH, —CN, —NO$_2$, and —N$_3$. In an even further aspect, $R^{17}$ is selected from —CH$_2$CO$_2$CH$_3$, —CH$_2$CH$_2$CO$_2$CH$_3$, —CH$_2$CO$_2$CH$_2$CH$_3$, —CH$_2$CH$_2$CO$_2$CH$_2$CH$_3$, —CH$_2$CH$_2$CH$_2$CO$_2$CH$_3$, and substituted with 0 or 1 group selected from —OH, —CN, —NO$_2$, and —N$_3$. In a still further aspect, $R^{17}$ is —CH$_2$CO$_2$CH$_3$ substituted with 0 or 1 group selected from —OH, —CN, —NO$_2$, and —N$_3$.

In a further aspect, $R^{17}$ is —(C1-C8 alkyl)-O—(C=O)(C1-C8 alkyl) monosubstituted with a group selected from —OH, —CN, —NO$_2$, and —N$_3$. In a still further aspect, $R^{17}$ is unsubstituted —(C1-C8 alkyl)-O—(C=O)(C1-C8 alkyl).

In a further aspect, $R^{17}$ is C1-C8 alkyl substituted with 0 or 1 group selected from —OH, —CN, —NO$_2$, and —N$_3$. In a still further aspect, $R^{17}$ is C1-C4 alkyl substituted with 0 or 1 group selected from —OH, —CN, —NO$_2$, and —N$_3$. In yet a further aspect, $R^{17}$ is selected from methyl, ethyl, n-propyl, and i-propyl and substituted with 0 or 1 group selected from —OH, —CN, —NO$_2$, and —N$_3$. In an even further aspect, $R^{17}$ is selected from methyl and ethyl and substituted with 0 or 1 group selected from —OH, —CN, —NO$_2$, and —N$_3$. In a still further aspect, $R^{17}$ is methyl substituted with 0 or 1 group selected from —OH, —CN, —NO$_2$, and —N$_3$.

In a further aspect, $R^{17}$ is C1-C8 alkyl monosubstituted with a group selected from —OH, —CN, —NO$_2$, and —N$_3$. In a still further aspect, $R^{17}$ is unsubstituted C1-C8 alkyl.

In a further aspect, $R^{17}$ is Cy$^3$ and substituted with 0 or 1 group selected from —OH, —CN, —NO$_2$, and —N$_3$. In a still further aspect, $R^{17}$ is Cy$^3$ and monosubstituted with a group selected from —OH, —CN, —NO$_2$, and —N$_3$. In yet a further aspect, $R^{17}$ is unsubstituted Cy$^3$.

n. $R^{20}$ Groups

In one aspect, $R^{20}$ is selected from C1-C10 alkyl, Cy$^1$, and Ar$^1$. In a further aspect, $R^{20}$ is selected from C1-C8 alkyl, Cy$^1$, and Ar$^1$. In a still further aspect, $R^{20}$ is selected from C1-C4 alkyl, Cy$^1$, and Ar$^1$. In yet a further aspect, $R^{20}$ is selected from methyl, ethyl, n-propyl, i-propyl, $Cy^1$, and $Ar^1$. In a still further aspect, $R^{20}$ is selected from methyl, ethyl, $Cy^1$, and $Ar^1$. In yet a further aspect, $R^{20}$ is selected from methyl, $Cy^1$, and $Ar^1$.

In a further aspect, $R^{20}$ is selected from $Cy^1$ and $Ar^1$. In a still further aspect, $R^{20}$ is $Cy^1$. In yet a further aspect, $R^{20}$ is $Ar^1$.

In a further aspect, $R^{20}$ is selected from C1-C10 alkyl. In a still further aspect, $R^{20}$ is selected from C1-C8 alkyl. In yet a further aspect, $R^{20}$ is selected from C1-C4 alkyl. In an even further aspect, $R^{20}$ is selected from methyl, ethyl, n-propyl, and i-propyl. In a still further aspect, $R^{20}$ is selected from methyl and ethyl. In yet a further aspect, $R^{20}$ is ethyl. In an even further aspect, $R^{20}$ is methyl.

o. $R^{21}$ Groups

In one aspect, $R^{21}$ is C2-C10 alkenyl, wherein the unsaturated bond is alpha to the carbonyl. In a further aspect, $R^{21}$ is C2-C5 alkenyl. In a still further aspect, $R^{21}$ is selected from ethenyl, 1-propenyl, and 2-propenyl. In yet a further aspect, $R^{21}$ is 1-propenyl. In an even further aspect, $R^{21}$ is 2-propenyl. In a still further aspect, $R^{21}$ is ethenyl.

In a further aspect, $R^{21}$ has a structure represented by a formula selected from:

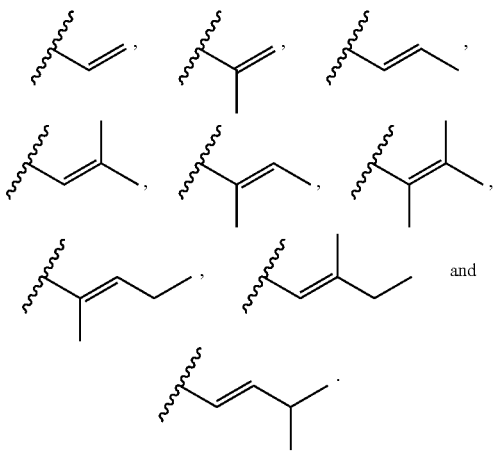

p. $Cy^1$ Groups

In one aspect, each occurrence of $Cy^1$, when present, is independently selected from cycle and heterocycle and substituted with 0, 1, or 2 groups independently selected from —OH, —CN, —$NO_2$, C1-C4 alkyl, C1-C4 alkoxy, and C1-C4 dialkylaminomethyl. In a further aspect, each occurrence of $Cy^1$, when present, is independently selected from cycle and heterocycle and substituted with 0 or 1 group selected from —OH, —CN, —$NO_2$, C1-C4 alkyl, C1-C4 alkoxy, and C1-C4 dialkylaminomethyl. In a still further aspect, each occurrence of $Cy^1$, when present, is independently selected from cycle and heterocycle and monosubstituted with a group selected from —OH, —CN, —$NO_2$, C1-C4 alkyl, C1-C4 alkoxy, and C1-C4 dialkylaminomethyl. In yet a further aspect, each occurrence of $Cy^1$, when present, is independently selected from cycle and heterocycle and unsubstituted.

In a further aspect, each occurrence of $Cy^1$, when present, is independently selected from cycle and heterocycle and substituted with 0, 1, or 2 groups independently selected from —OH, —CN, —$NO_2$, methyl, ethyl, n-propyl, i-propyl, —$OCH_3$, —$OCH_2CH_3$, —$OCH_2CH_2CH_3$, —$OCH(CH_3)_2$, —$N(CH_3)_2$, —$N(CH_3)(CH_2CH_3)$, —$N(CH_3)(CH_2CH_2CH_3)$, —$N(CH_3)(CH(CH_3)_2)$, —$N(CH_2CH_3)_2$, —$N(CH_2CH_3)(CH_2CH_2CH_3)$, —$N(CH_2CH_3)(CH(CH_3)_2)$, —$N(CH_2CH_2CH_3)_2$, and —$N(CH(CH_3)_2)_2$. In a still further aspect, each occurrence of $Cy^1$, when present, is independently selected from cycle and heterocycle and substituted with 0, 1, or 2 groups independently selected from —OH, —CN, —$NO_2$, methyl, ethyl, —$OCH_3$, —$OCH_2CH_3$, —$N(CH_3)_2$, —$N(CH_3)(CH_2CH_3)$, and —$N(CH_2CH_3)_2$. In yet a further aspect, each occurrence of $Cy^1$, when present, is independently selected from cycle and heterocycle and substituted with 0, 1, or 2 groups independently selected from —OH, —CN, —$NO_2$, methyl, —$OCH_3$, and —$N(CH_3)_2$.

In a further aspect, each occurrence of $Cy^1$, when present, is cycle substituted with 0, 1, or 2 groups independently selected from —OH, —CN, —$NO_2$, C1-C4 alkyl, C1-C4 alkoxy, and C1-C4 dialkylaminomethyl. In a still further aspect, each occurrence of $Cy^1$, when present, is cycle substituted with 0 or 1 group selected from —OH, —CN, —$NO_2$, C1-C4 alkyl, C1-C4 alkoxy, and C1-C4 dialkylaminomethyl. In yet a further aspect, each occurrence of $Cy^1$, when present, is cycle monosubstituted with a group selected from —OH, —CN, —$NO_2$, C1-C4 alkyl, C1-C4 alkoxy, and C1-C4 dialkylaminomethyl. In an even further aspect, each occurrence of $Cy^1$, when present, is unsubstituted cycle.

In a further aspect, each occurrence of $Cy^1$, when present, is cycle substituted with 0, 1, or 2 groups independently selected from —OH, —CN, —$NO_2$, methyl, ethyl, n-propyl, i-propyl, —$OCH_3$, —$OCH_2CH_3$, —$OCH_2CH_2CH_3$, —$OCH(CH_3)_2$, —$N(CH_3)_2$, —$N(CH_3)(CH_2CH_3)$, —$N(CH_3)(CH_2CH_2CH_3)$, —$N(CH_3)(CH(CH_3)_2)$, —$N(CH_2CH_3)_2$, —$N(CH_2CH_3)(CH_2CH_2CH_3)$, —$N(CH_2CH_3)(CH(CH_3)_2)$, —$N(CH_2CH_2CH_3)_2$, and —$N(CH(CH_3)_2)_2$. In a still further aspect, each occurrence of $Cy^1$, when present, is cycle substituted with 0, 1, or 2 groups independently selected from —OH, —CN, —$NO_2$, methyl, ethyl, —$OCH_3$, —$OCH_2CH_3$, —$N(CH_3)_2$, —$N(CH_3)(CH_2CH_3)$, and —$N(CH_2CH_3)_2$. In yet a further aspect, each occurrence of $Cy^1$, when present, is cycle substituted with 0, 1, or 2 groups independently selected from —OH, —CN, —$NO_2$, methyl, —$OCH_3$, and —$N(CH_3)_2$.

In a further aspect, each occurrence of $Cy^1$, when present, is heterocycle substituted with 0, 1, or 2 groups independently selected from —OH, —CN, —$NO_2$, C1-C4 alkyl, C1-C4 alkoxy, and C1-C4 dialkylaminomethyl. In a still further aspect, each occurrence of $Cy^1$, when present, is heterocycle substituted with 0 or 1 group selected from —OH, —CN, —$NO_2$, C1-C4 alkyl, C1-C4 alkoxy, and C1-C4 dialkylaminomethyl. In yet a further aspect, each occurrence of $Cy^1$, when present, is heterocycle monosubstituted with a group selected from —OH, —CN, —$NO_2$, C1-C4 alkyl, C1-C4 alkoxy, and C1-C4 dialkylaminomethyl. In an even further aspect, each occurrence of $Cy^1$, when present, is unsubstituted heterocycle.

In a further aspect, each occurrence of $Cy^1$, when present, is heterocycle substituted with 0, 1, or 2 groups independently selected from —OH, —CN, —$NO_2$, methyl, ethyl, n-propyl, i-propyl, —$OCH_3$, —$OCH_2CH_3$, —$OCH_2CH_2CH_3$, —$OCH(CH_3)_2$, —$N(CH_3)_2$, —$N(CH_3)(CH_2CH_3)$, —$N(CH_3)(CH_2CH_2CH_3)$, —$N(CH_3)(CH(CH_3)_2)$, —$N(CH_2CH_3)_2$, —$N(CH_2CH_3)(CH_2CH_2CH_3)$, —$N(CH_2CH_3)(CH(CH_3)_2)$, —$N(CH_2CH_2CH_3)_2$, and —$N(CH(CH_3)_2)_2$. In a still further aspect, each occurrence of $Cy^1$, when present, is heterocycle substituted with 0, 1, or 2 groups independently selected from —OH, —CN, —$NO_2$, methyl, ethyl, —$OCH_3$, —$OCH_2CH_3$, —$N(CH_3)_2$, —N(CH$_3$)(CH$_2$CH$_3$)$_2$, and —N(CH$_2$CH$_3$)$_2$. In yet a further aspect, each occurrence of Cy$^1$, when present, is heterocycle substituted with 0, 1, or 2 groups independently selected from —OH, —CN, —NO$_2$, methyl, —OCH$_3$, and —N(CH$_3$)$_2$.

In a further aspect, each occurrence of Cy$^1$, when present, is maleimide substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Cy$^1$, when present, is maleimide substituted with 0 or 1 group selected from —OH, —CN, —NO$_2$, C1-C4 alkyl, C1-C4 alkoxy, and C1-C4 dialkylaminomethyl. In yet a further aspect, each occurrence of Cy$^1$, when present, is maleimide monosubstituted with a group selected from —OH, —CN, —NO$_2$, C1-C4 alkyl, C1-C4 alkoxy, and C1-C4 dialkylaminomethyl. In an even further aspect, each occurrence of Cy$^1$, when present, is unsubstituted maleimide.

In a further aspect, each occurrence of Cy$^1$, when present, is maleimide substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Cy$^1$, when present, is maleimide substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Cy$^1$, when present, is maleimide substituted with 0, 1, or 2 groups independently selected from —OH, —CN, —NO$_2$, methyl, —OCH$_3$, and —N(CH$_3$)$_2$.

q. Cy$^2$ Groups

In one aspect, each occurrence of Cy$^2$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl. In a further aspect, each occurrence of Cy$^2$, when present, is independently selected from cycle and heterocycle and substituted with 0 or 1 group selected from —OH, —CN, —NO$_2$, C1-C4 alkyl, C1-C4 alkoxy, and C1-C4 dialkylaminomethyl. In a still further aspect, each occurrence of Cy$^2$, when present, is independently selected from cycle and heterocycle and monosubstituted with a group selected from —OH, —CN, —NO$_2$, C1-C4 alkyl, C1-C4 alkoxy, and C1-C4 dialkylaminomethyl. In yet a further aspect, each occurrence of Cy$^2$, when present, is independently selected from cycle and heterocycle and unsubstituted.

In a further aspect, each occurrence of Cy$^2$, when present, is independently selected from cycle and heterocycle and substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Cy$^2$, when present, is independently selected from cycle and heterocycle and substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Cy$^2$, when present, is independently selected from cycle and heterocycle and substituted with 0, 1, or 2 groups independently selected from —OH, —CN, —NO$_2$, methyl, —OCH$_3$, and —N(CH$_3$)$_2$.

In a further aspect, each occurrence of Cy$^2$, when present, is cycle substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Cy$^2$, when present, is cycle substituted with 0 or 1 group selected from —OH, —CN, —NO$_2$, C1-C4 alkyl, C1-C4 alkoxy, and C1-C4 dialkylaminomethyl. In yet a further aspect, each occurrence of Cy$^2$, when present, is cycle monosubstituted with a group selected from —OH, —CN, —NO$_2$, C1-C4 alkyl, C1-C4 alkoxy, and C1-C4 dialkylaminomethyl. In an even further aspect, each occurrence of Cy$^2$, when present, is unsubstituted cycle.

In a further aspect, each occurrence of Cy$^2$, when present, is cycle substituted with 0, 1, or 2 groups independently selected from —OH, —CN, —NO$_2$, methyl, ethyl, n-propyl, propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Cy$^2$, when present, is cycle substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Cy$^2$, when present, is cycle substituted with 0, 1, or 2 groups independently selected from —OH, —CN, —NO$_2$, methyl, —OCH$_3$, and —N(CH$_3$)$_2$.

In a further aspect, each occurrence of Cy$^2$, when present, is heterocycle substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Cy$^2$, when present, is heterocycle substituted with 0 or 1 group selected from —OH, —CN, —NO$_2$, C1-C4 alkyl, C1-C4 alkoxy, and C1-C4 dialkylaminomethyl. In yet a further aspect, each occurrence of Cy$^2$, when present, is heterocycle monosubstituted with a group selected from —OH, —CN, —NO$_2$, C1-C4 alkyl, C1-C4 alkoxy, and C1-C4 dialkylaminomethyl. In an even further aspect, each occurrence of Cy$^2$, when present, is unsubstituted heterocycle.

In a further aspect, each occurrence of Cy$^2$, when present, is heterocycle substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Cy$^2$, when present, is heterocycle substituted with 0, 1, or 2 groups independently selected from —OH, —CN, —NO$_2$, methyl, ethyl, —OCH$_3$, —OCH$_2$CH$_3$, —N(CH$_3$)$_2$, N(CH$_3$)(CH$_2$CH$_3$), and —N(CH$_2$CH$_3$)$_2$. In yet a further aspect, each occurrence of Cy$^2$, when present, is heterocycle substituted with 0, 1, or 2 groups independently selected from —OH, —CN, —NO$_2$, methyl, —OCH$_3$, and —N(CH$_3$)$_2$.

In a further aspect, each occurrence of Cy$^2$, when present, is maleimide substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Cy$^2$, when present, is maleimide substituted with 0 or 1 group selected from —OH, —CN, —NO$_2$, C1-C4 alkyl, C1-C4 alkoxy, and C1-C4 dialkylaminomethyl. In yet a further aspect, each occurrence of Cy$^2$, when present, is maleimide monosubstituted with a group selected from —OH, —CN, —NO$_2$, C1-C4 alkyl, C1-C4 alkoxy, and C1-C4 dialkylaminomethyl. In an even further aspect, each occurrence of Cy$^2$, when present, is unsubstituted maleimide.

In a further aspect, each occurrence of Cy$^2$, when present, is maleimide substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Cy$^2$, when present, is maleimide substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Cy$^2$, when present, is maleimide substituted with 0, 1, or 2 groups independently selected from —OH, —CN, —NO$_2$, methyl, —OCH$_3$, and —N(CH$_3$)$_2$.

r. Cy$^3$ Groups

In one aspect, Cy$^3$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl. In a further aspect, Cy$^3$, when present, is independently selected from cycle and heterocycle and substituted with 0 or 1 group selected from —OH, —CN, —NO$_2$, C1-C4 alkyl, C1-C4 alkoxy, and C1-C4 dialkylaminomethyl. In a still further aspect, Cy$^3$, when present, is independently selected from cycle and heterocycle and monosubstituted with a group selected from —OH, —CN, —NO$_2$, C1-C4 alkyl, C1-C4 alkoxy, and C1-C4 dialkylaminomethyl. In yet a further aspect, Cy$^3$, when present, is independently selected from cycle and heterocycle and unsubstituted.

In a further aspect, Cy$^3$, when present, is independently selected from cycle and heterocycle and substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, Cy$^3$, when present, is independently selected from cycle and heterocycle and substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, Cy$^3$, when present, is independently selected from cycle and heterocycle and substituted with 0, 1, or 2 groups independently selected from —OH, —CN, —NO$_2$, methyl, —OCH$_3$, and —N(CH$_3$)$_2$.

In a further aspect, Cy$^3$, when present, is cycle substituted with 0, 1, or 2 groups independently selected from —OH, —CN, —NO$_2$, C1-C4 alkyl, C1-C4 alkoxy, and C1-C4 dialkylaminomethyl. In a still further aspect, Cy$^3$, when present, is cycle substituted with 0 or 1 group selected from —OH, —CN, —NO$_2$, C1-C4 alkyl, C1-C4 alkoxy, and C1-C4 dialkylaminomethyl. In yet a further aspect, Cy$^3$, when present, is cycle monosubstituted with a group selected from —OH, —CN, —NO$_2$, C1-C4 alkyl, C1-C4 alkoxy, and C1-C4 dialkylaminomethyl. In an even further aspect, Cy$^3$, when present, is unsubstituted cycle.

In a further aspect, Cy$^3$, when present, is cycle substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, Cy$^3$, when present, is cycle substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, Cy$^3$, when present, is cycle substituted with 0, 1, or 2 groups independently selected from —OH, —CN, —NO$_2$, methyl, —OCH$_3$, and —N(CH$_3$)$_2$.

In a further aspect, Cy$^3$, when present, is heterocycle substituted with 0, 1, or 2 groups independently selected from —OH, —CN, —NO$_2$, C1-C4 alkyl, C1-C4 alkoxy, and C1-C4 dialkylaminomethyl. In a still further aspect, Cy$^3$, when present, is heterocycle substituted with 0 or 1 group selected from —OH, —CN, —NO$_2$, C1-C4 alkyl, C1-C4 alkoxy, and C1-C4 dialkylaminomethyl. In yet a further aspect, Cy$^3$, when present, is heterocycle monosubstituted with a group selected from —OH, —CN, —NO$_2$, C1-C4 alkyl, C1-C4 alkoxy, and C1-C4 dialkylaminomethyl. In an even further aspect, Cy$^3$, when present, is unsubstituted heterocycle.

In a further aspect, Cy$^3$, when present, is heterocycle substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, Cy$^3$, when present, is heterocycle substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, Cy$^3$, when present, is heterocycle substituted with 0, 1, or 2 groups independently selected from —OH, —CN, —NO$_2$, methyl, —OCH$_3$, and —N(CH$_3$)$_2$.

In a further aspect, Cy$^3$, when present, is maleimide substituted with 0, 1, or 2 groups independently selected from —OH, —CN, —NO$_2$, C1-C4 alkyl, C1-C4 alkoxy, and C1-C4 dialkylaminomethyl. In a still further aspect, Cy$^3$, when present, is maleimide substituted with 0 or 1 group selected from —OH, —CN, —NO$_2$, C1-C4 alkyl, C1-C4 alkoxy, and C1-C4 dialkylaminomethyl. In yet a further aspect, Cy$^3$, is maleimide monosubstituted with a group selected from —OH, —CN, —NO$_2$, C1-C4 alkyl, C1-C4 alkoxy, and C1-C4 dialkylaminomethyl. In an even further aspect, Cy$^3$, is unsubstituted maleimide.

In a further aspect, Cy$^3$, is maleimide substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, Cy$^3$, is maleimide substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, Cy$^3$, is maleimide substituted with 0, 1, or 2 groups independently selected from —OH, —CN, —NO$_2$, methyl, —OCH$_3$, and —N(CH$_3$)$_2$.

s. Ar$^1$ Groups

In one aspect, each occurrence of Ar$^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl. In a further aspect, each occurrence of Ar$^1$, when present, is independently selected from aryl and heteroaryl and substituted with 0 or 1 group selected from —OH, —CN, —NO$_2$, C1-C4 alkyl, C1-C4 alkoxy, and C1-C4 dialkylaminomethyl. In a still further aspect, each occurrence of Ar$^1$, when present, is independently selected from aryl and heteroaryl and monosubstituted with a group selected from —OH, —CN, —NO$_2$, C1-C4 alkyl, C1-C4 alkoxy, and C1-C4 dialkylaminomethyl. In yet a further aspect, each occurrence of Ar$^1$, when present, is independently selected from aryl and heteroaryl and unsubstituted.

In a further aspect, each occurrence of Ar$^1$, when present, is independently selected from aryl and heteroaryl and substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is independently selected from aryl and heteroaryl and substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is independently selected from aryl and heteroaryl and substituted with 0, 1, or 2 groups independently selected from —OH, —CN, —NO$_2$, methyl, —OCH$_3$, and —N(CH$_3$)$_2$.

In a further aspect, each occurrence of Ar$^1$, when present, is aryl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^1$, when present, is aryl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^1$, when present, is unsubstituted aryl.

In a further aspect, each occurrence of Ar$^1$, when present, is aryl substituted with 0, 1, or 2 groups independently selected from —OH, —CN, —NO$_2$, methyl, ethyl, n-propyl, propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is aryl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is aryl substituted with 0, 1, or 2 groups independently selected from —OH, —CN, —NO$_2$, methyl, —OCH$_3$, and —N(CH$_3$)$_2$.

In a further aspect, each occurrence of Ar$^1$, when present, is phenyl substituted with 0, 1, or 2 groups independently selected from —OH, —CN, —NO$_2$, C1-C4 alkyl, C1-C4 alkoxy, and C1-C4 dialkylaminomethyl. In a further aspect, each occurrence of Ar$^1$, when present, is phenyl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^1$, when present, is unsubstituted phenyl.

In a further aspect, each occurrence of Ar$^1$, when present, is phenyl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is phenyl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is phenyl substituted with 0, 1, or 2 groups independently selected from —OH, —CN, —NO$_2$, methyl, —OCH$_3$, and —N(CH$_3$)$_2$.

In a further aspect, each occurrence of Ar$^1$, when present, is heteroaryl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^1$, when present, is heteroaryl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^1$, when present, is unsubstituted heteroaryl.

In a further aspect, each occurrence of Ar$^1$, when present, is heteroaryl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is heteroaryl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is heteroaryl substituted with 0, 1, or 2 groups independently selected from —OH, —CN, —NO$_2$, methyl, —OCH$_3$, and —N(CH$_3$)$_2$.

In a further aspect, each occurrence of Ar$^1$, when present, is pyridinyl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^1$, when present, is pyridinyl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^1$, when present, is unsubstituted pyridinyl.

In a further aspect, each occurrence of Ar$^1$, when present, is pyridinyl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is pyridinyl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is pyridinyl substituted with 0, 1, or 2 groups independently selected from —OH, —CN, —NO$_2$, methyl, —OCH$_3$, and —N(CH$_3$)$_2$.

In a further aspect, each occurrence of Ar$^1$, when present, is furan substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^1$, when present, is furan substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^1$, when present, is unsubstituted furan.

In a further aspect, each occurrence of Ar$^1$, when present, is furan substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^1$, when present, is furan substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^1$, when present, is furan substituted with 0, 1, or 2 groups independently selected from —OH, —CN, —NO$_2$, methyl, —OCH$_3$, and —N(CH$_3$)$_2$.

t. Ar$^2$ Groups

In one aspect, each occurrence of Ar$^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl. In a further aspect, each occurrence of Ar$^2$, when present, is independently selected from aryl and heteroaryl and substituted with 0 or 1 group selected from —OH, —CN, —NO$_2$, C1-C4 alkyl, C1-C4 alkoxy, and C1-C4 dialkylaminomethyl. In a still further aspect, each occurrence of Ar$^2$, when present, is independently selected from aryl and heteroaryl and monosubstituted with a group selected from —OH, —CN, —NO$_2$, C1-C4 alkyl, C1-C4 alkoxy, and C1-C4 dialkylaminomethyl. In yet a further aspect, each occurrence of Ar$^2$, when present, is independently selected from aryl and heteroaryl and unsubstituted.

In a further aspect, each occurrence of Ar$^2$, when present, is independently selected from aryl and heteroaryl and substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is independently selected from aryl and heteroaryl and substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is independently selected from aryl and heteroaryl and substituted with 0, 1, or 2 groups independently selected from —OH, —CN, —NO$_2$, methyl, —OCH$_3$, and —N(CH$_3$)$_2$.

In a further aspect, each occurrence of Ar$^2$, when present, is aryl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^2$, when present, is aryl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^2$, when present, is unsubstituted aryl.

In a further aspect, each occurrence of Ar$^2$, when present, is aryl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is aryl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is aryl substituted with 0, 1, or 2 groups independently selected from —OH, —CN, —NO$_2$, methyl, —OCH$_3$, and —N(CH$_3$)$_2$.

In a further aspect, each occurrence of Ar$^2$, when present, is phenyl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^2$, when present, is phenyl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^2$, when present, is unsubstituted phenyl.

In a further aspect, each occurrence of Ar$^2$, when present, is phenyl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is phenyl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is phenyl substituted with 0, 1, or 2 groups independently selected from —OH, —CN, —NO$_2$, methyl, —OCH$_3$, and —N(CH$_3$)$_2$.

In a further aspect, each occurrence of Ar$^2$, when present, is heteroaryl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^2$, when present, is heteroaryl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^2$, when present, is unsubstituted heteroaryl.

In a further aspect, each occurrence of Ar$^2$, when present, is heteroaryl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is heteroaryl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is heteroaryl substituted with 0, 1, or 2 groups independently selected from —OH, —CN, —NO$_2$, methyl, —OCH$_3$, and —N(CH$_3$)$_2$.

In a further aspect, each occurrence of Ar$^2$, when present, is pyridinyl substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^2$, when present, is pyridinyl substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^2$, when present, is unsubstituted pyridinyl.

In a further aspect, each occurrence of Ar$^2$, when present, is pyridinyl substituted with 0, 1, or 2 groups independently selected from —OH, —CN, —NO$_2$, methyl, ethyl, n-propyl, i-propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is pyridinyl substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is pyridinyl substituted with 0, 1, or 2 groups independently selected from —OH, —CN, —NO$_2$, methyl, —OCH$_3$, and —N(CH$_3$)$_2$.

In a further aspect, each occurrence of Ar$^2$, when present, is furan substituted with 0, 1, or 2 groups independently selected from —OH, —CN, —NO$_2$, C1-C4 alkyl, C1-C4 alkoxy, and C1-C4 dialkylaminomethyl. In a still further aspect, each occurrence of Ar$^2$, when present, is furan substituted with 0 or 1 group selected from —OH, —CN, —NO$_2$, C1-C4 alkyl, C1-C4 alkoxy, and C1-C4 dialkylaminomethyl. In yet a further aspect, each occurrence of Ar$^2$, when present, is unsubstituted furan.

In a further aspect, each occurrence of Ar$^2$, when present, is furan substituted with 0, 1, or 2 groups independently selected from —OH, —CN, —NO$_2$, methyl, ethyl, n-propyl, propyl, —OCH$_3$, —OCH$_2$CH$_3$, —OCH$_2$CH$_2$CH$_3$, —OCH(CH$_3$)$_2$, —N(CH$_3$)$_2$, —N(CH$_3$)(CH$_2$CH$_3$), —N(CH$_3$)(CH$_2$CH$_2$CH$_3$), —N(CH$_3$)(CH(CH$_3$)$_2$), —N(CH$_2$CH$_3$)$_2$, —N(CH$_2$CH$_3$)(CH$_2$CH$_2$CH$_3$), —N(CH$_2$CH$_3$)(CH(CH$_3$)$_2$), —N(CH$_2$CH$_2$CH$_3$)$_2$, and —N(CH(CH$_3$)$_2$)$_2$. In a still further aspect, each occurrence of Ar$^2$, when present, is furan substituted with 0, 1, or 2 groups independently selected from —OH, —CN, —NO$_2$, methyl, ethyl, —OCH$_3$, —OCH$_2$CH$_3$, —N(CH$_3$)$_2$, —N(CH$_3$)(CH$_2$CH$_3$), and —N(CH$_2$CH$_3$)$_2$. In yet a further aspect, each occurrence of Ar$^2$, when present, is furan substituted with 0, 1, or 2 groups independently selected from —OH, —CN, —NO$_2$, methyl, —OCH$_3$, and —N(CH$_3$)$_2$.

u. Reduced Solvent

In one aspect, the disclosed polymer networks contain a reduced amount of solvent compared to linear polymer melts. During the synthesis of the polymer networks, solvent fraction in the range of from about 0 wt % to about 50 wt % may be used to dissolve the radical initiator. However, the resulting polymer network may be solvent-less. Thus, in various aspects, the polymer network contains less than about 50 wt % solvent. In a further aspect, the polymer network contains less than about 45 wt % solvent. In a still further aspect, the polymer network contains less than about 40 wt % solvent. In yet a further aspect, the polymer network contains less than about 35 wt % solvent. In an even further aspect, the polymer network contains less than about 30 wt % solvent. In a still further aspect, the polymer network contains less than about 25 wt % solvent. In yet a further aspect, the polymer network contains less than about 20 wt % solvent. In an even further aspect, the polymer network contains less than about 15 wt % solvent. In a still further aspect, the polymer network contains less than about 10 wt % solvent. In yet a further aspect, the polymer network contains less than about 5 wt % solvent. In an even further aspect, the polymer network contains less than about 4 wt % solvent. In a still further aspect, the polymer network contains less than about 3 wt % solvent. In yet a further aspect, the polymer network contains less than about 2 wt % solvent. In an even further aspect, the polymer network contains less than about 1 wt % solvent. In a still further aspect, the polymer network contains less than about 0.5 wt % solvent. In yet a further aspect, the polymer network contains less than about 0.1 wt % solvent. In an even further aspect, the polymer network contains less than about 0.05 wt % solvent. In a still further aspect, the polymer network contains less than about 0.01 wt % solvent. In yet a further aspect, the polymer network contains no solvent.

The amount of solvent contained within a sample can be determined, for example, by nuclear magnetic resonance (NMR) spectroscopy. Alternatively, the amount of solvent contained within a sample can be determined via elemental analysis. Other techniques for determining the purity of a sample (i.e., the amount of contamination via solvent) would be understood by those of skill in the art.

v. Improved Softness

In one aspect, the disclosed polymer networks exhibit an improvement in softness compared to linear polymer melts. Thus, in various aspects, the polymer network has a rubbery plateau in the modulus of elasticity of less than about 10$^5$ Pa. In a still further aspect, the polymer network has a rubbery plateau in the modulus of elasticity of less than about 10$^4$ Pa. In yet a further aspect, the polymer network has a rubbery plateau in the modulus of elasticity of less than about 10$^3$ Pa. In an even further aspect, the polymer network has a rubbery plateau in the modulus of elasticity of less than about 500 Pa. In a still further aspect, the polymer network has a rubbery plateau in the modulus of elasticity of less than about 100 Pa.

Polymer softness can be determined, for example, via tensile testing. Alternatively, polymer softness can be determined, for example, via dynamic mechanical analysis (DMA). Other techniques for determining the softness of a polymer sample would be understood by those of skill in the art.

w. Improved Elasticity

In one aspect, the disclosed polymer networks exhibit an improvement in elasticity compared to linear polymer melts. Thus, in various aspects, the polymer network has a maximum extendability of at least about 10. In a still further aspect, the polymer network has a maximum extendability of at least about 20. In yet a further aspect, the polymer network has a maximum extendability of at least about 50.

Polymer elasticity can be determined, for example, via tensile testing. Alternatively, polymer elasticity can be determined, for example, via dynamic mechanical analysis (DMA). Other techniques for determining the elasticity of a polymer sample would be understood by those of skill in the art.

x. Degree of Polymerization (DP)

In one aspect, the disclosed polymer networks exhibit an increase in the degree of polymerization (DP) of the side chains (e.g., the monomers and/or cross-linkers) and/or of the backbone compared to linear polymers. In a further aspect, the disclosed polymer networks exhibit an increase in the DP of the side chains (e.g., the monomers and/or cross-linkers) compared to linear polymers. In a still further aspect, the disclosed polymer networks exhibit an increase in the DP of the backbone compared to linear polymers.

In various aspects, the entanglement modulus may be inversely proportional to the DP of the side chains (e.g., the monomers and/or cross-linkers) of the disclosed polymer network. In a further aspect, the inverse relationship is not linear.

In various aspects, the DP of the backbone is dependent on the molar ratio of the initiator to the monomer and/or cross-linker.

In a further aspect, the disclosed polymer networks have a DP of the backbone of from about 2 to about 800, of from about 2 to about 700, of from about 2 to about 600, of from about 2 to about 500, of from about 2 to about 400, of from about 2 to about 300, of from about 2 to about 200, or of from about 2 to 100. In a still further aspect, the disclosed polymer networks have a DP of the backbone of from about 4 to about 800, of from about 4 to about 700, of from about 4 to about 600, of from about 4 to about 500, of from about 4 to about 400, of from about 4 to about 300, of from about 4 to about 200, or of from about 4 to 100.

In a further aspect, the disclosed polymer networks have a DP of the side chain of from about 5 to about 3000, of from about 5 to about 2000, of from about 5 to about 1000, of from about 5 to about 900, of from about 5 to about 800, of from about 5 to about 700, of from about 5 to about 600, of from about 5 to about 500, of from about 5 to about 400, of from about 5 to about 300, of from about 5 to about 200, or of from about 5 to about 100. In a still further aspect, the disclosed polymer networks have a DP of the side chain of from about 2 to about 800, of from about 2 to about 700, of from about 2 to about 600, of from about 2 to about 500, of from about 2 to about 400, of from about 2 to about 300, of from about 2 to about 200, or of from about 2 to about 100.

It would be understood by one of skill in the art that the molecular weight of the polymer could be determined, for example, by multiplying the degree of polymerization of the backbone by the average molecular weight of the monomer.

y. Cross-Linking Density

In one aspect, the disclosed polymer networks exhibit a decrease in elastic modulus (i.e., softness) with decreasing cross-linking density. In a further aspect, the disclosed polymer networks exhibit an increase in elastic modulus with decreasing cross-linking density.

In a further aspect, the cross-linking density is dependent on the ratio of the cross-linker to the monomer. Thus, in various aspects, the ratio of the cross-linker to the monomer is about 1:1,000. In a further aspect, the ratio of the cross-linker to the monomer is about 1:750. In a still further aspect, the ratio of the cross-linker to the monomer is about 1:500. In yet a further aspect, the ratio of the cross-linker to the monomer is about 1:400. In an even further aspect, the ratio of the cross-linker to the monomer is about 1:200. In a still further aspect, the ratio of the cross-linker to the monomer is about 1:100. In yet a further aspect, the ratio of the cross-linker to the monomer is about 1:50. In an even further aspect, the ratio of the cross-linker to the monomer is about 1:25.

2. Monomers

In one aspect, disclosed are monomers having a structure represented by a formula:

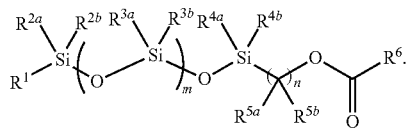

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —$NO_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —$NO_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is C2-C10 alkenyl, wherein the unsaturated bond is alpha to the carbonyl.

Examples of monomers include, but are not limited to, alkyl acrylates, butyl acrylates, methyl acrylates, ethyl In a further aspect, the ratio of the cross-linker to the monomer is about 1:1,000. In a still further aspect, the ratio of the cross-linker to the monomer is about 1:750. In yet a further aspect, the ratio of the cross-linker to the monomer is about 1:500. In an even further aspect, the ratio of the cross-linker to the monomer is about 1:400. In a still further aspect, the ratio of the cross-linker to the monomer is about 1:200. In yet a further aspect, the ratio of the cross-linker to the monomer is about 1:100. In an even further aspect, the ratio of the cross-linker to the monomer is about 1:50. In a still further aspect, the ratio of the cross-linker to the monomer is about 1:25.

In a further aspect, the ratio of the initiator to the monomer is about 1:2,000. In a still further aspect, the ratio of the initiator to the monomer is about 1:1,750. In yet a further aspect, the ratio of the initiator to the monomer is about 1:1,500. In an even further aspect, the ratio of the initiator to the monomer is about 1:1,250. In a still further aspect, the ratio of the initiator to the monomer is about 1:1,000. In yet a further aspect, the ratio of the initiator to the monomer is about 1:750. In an even further aspect, the ratio of the initiator to the monomer is about 1:500. In a still further aspect, the ratio of the initiator to the monomer is about 1:250.

In a further aspect, the monomer has a structure renresented by a formula:

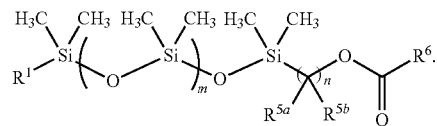

In a further aspect, the monomer has a structure represented by a formula:

In a further aspect, the monomer has a structure represented by a formula:

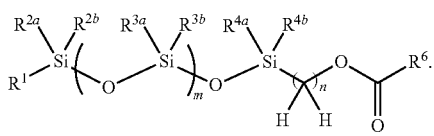

In a further aspect, the monomer has a structure represented by a formula:

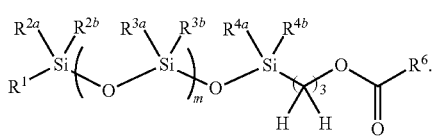

In a further aspect, the monomer has a structure represented by a formula:

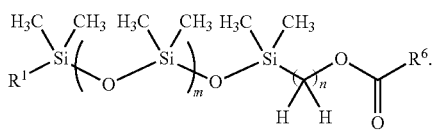

In a further aspect, the monomer has a structure represented by a formula:

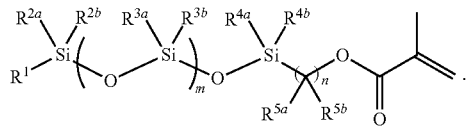

In a further aspect, the monomer has a structure represented by a formula:

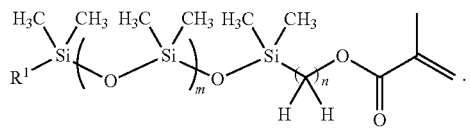

In a further aspect, the monomer is monomethacryloxypropyl terminated poly dimethylsiloxane.

3. Cross-Linkers

In one aspect, disclosed are cross-linkers having a structure represented by a formula:

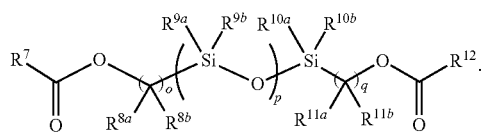

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

In a further aspect, the ratio of the cross-linker to the monomer is about 1:1,000. In a still further aspect, the ratio of the cross-linker to the monomer is about 1:750. In yet a further aspect, the ratio of the cross-linker to the monomer is about 1:500. In an even further aspect, the ratio of the cross-linker to the monomer is about 1:400. In a still further aspect, the ratio of the cross-linker to the monomer is about 1:200. In yet a further aspect, the ratio of the cross-linker to the monomer is about 1:100. In an even further aspect, the ratio of the cross-linker to the monomer is about 1:50. In a still further aspect, the ratio of the cross-linker to the monomer is about 1:25.

In a further aspect, the cross-linker has a structure represented by a formula:

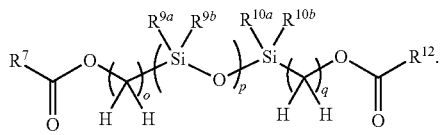

In a further aspect, the cross-linker has a structure represented by a formula:

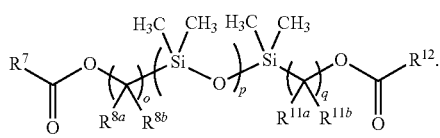

In a further aspect, the cross-linker has a structure represented by a formula:

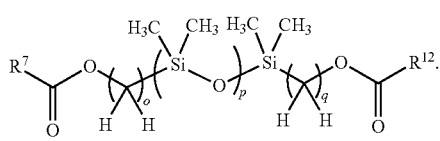

In a further aspect, the cross-linker has a structure represented by a formula:

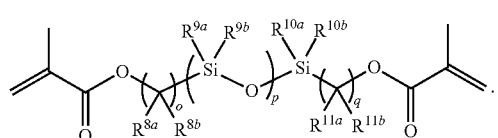

In a further aspect, the cross-linker has a structure represented by a formula:

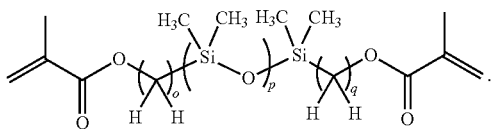

In a further aspect, the cross-linker is methacryloxypropyl terminated polydimethylsiloxane.

4. Diluent Monomers

In one aspect, disclosed are diluent monomers having a structure represented by a formula:

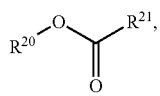

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl. Examples of diluent monomers include, but are not limited to, butyl acrylate, butyl methacrylate, isopropyl acrylate, isopropyl methacrylate, n-propyl acrylate, n-propyl methacrylate, ethyl acrylate, and ethyl methacrylate.

In a further aspect, the ratio of the monomer to the diluent monomer is about 1:1. In a still further aspect, the ratio of the monomer to the diluent monomer is about 1:0.7. In yet a further aspect, the ratio of the monomer to the diluent monomer is about 1:0.5. In an even further aspect, the ratio of the monomer to the diluent monomer is about 1:0.2. In a still further aspect, the ratio of the monomer to the diluent monomer is about 1:0.1. In yet a further aspect, the ratio of the monomer to the diluent monomer is about 1:0.07. In an even further aspect, the ratio of the monomer to the diluent monomer is about 1:0.05. In a still further aspect, the ratio of the monomer to the diluent monomer is about 1:0.02. In yet a further aspect, the ratio of the monomer to the diluent monomer is about 1:0.01. In an even further aspect, the ratio of the monomer to the diluent monomer is about 1:0.007. In a still further aspect, the ratio of the monomer to the diluent monomer is about 1:0.005. In yet a further aspect, the ratio of the monomer to the diluent monomer is about 1:0.002. In an even further aspect, the ratio of the monomer to the diluent monomer is about 1:0.001.

In a further aspect the diluent monomer has a structure represented by a formula:

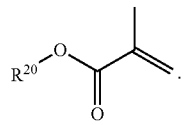

In a further aspect the diluent monomer has a structure represented by a formula:

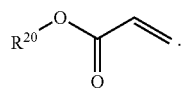

In a further aspect, the diluent monomer is butyl acrylate.

C. METHODS OF MAKING POLYMER NETWORKs

In one aspect, disclosed are methods of making a polymer network, the method comprising polymerizing a mixture comprising: (a) a monomer having a structure represented by a formula:

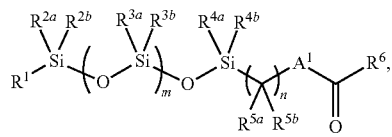

wherein m is an integer selected from 5 to 300; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl, wherein the unsaturated bond is alpha to the carbonyl; (b) a cross-linker having a structure represented by a formula:

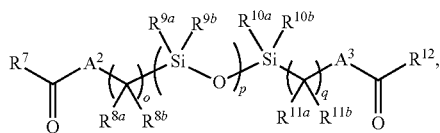

wherein each of o and q is independently an integer selected from 0, 1, 2, 3, 4, and 5; wherein p is an integer selected from 2 to 800; wherein each of $A^2$ and $A^3$ is selected from O and NH; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl; and (c) optionally, a diluent monomer having a structure represented by a formula:

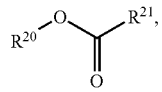

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl.

In one aspect, disclosed are methods of making a polymer network, the method comprising polymerizing a mixture comprising: (a) a monomer having a structure represented by a formula:

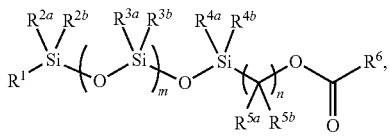

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl, wherein the unsaturated bond is alpha to the carbonyl; and (b) a cross-linker having a structure represented by a formula:

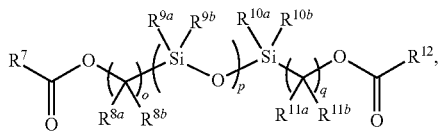

wherein each of o and q is independently an integer selected from 0, 1, 2, 3, 4, and 5; wherein p is an integer selected from 2 to 800; wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$; wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl.

In one aspect, disclosed are methods of making a polymer network, the method comprising polymerizing a mixture comprising: (a) a monomer having a structure represented by a formula:

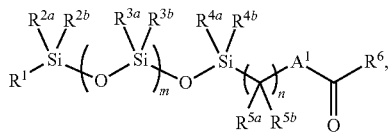

wherein m is an integer selected from 5 to 3000; wherein n is an integer selected from 0, 1, 2, 3, 4, and 5; wherein $A^1$ is selected from O and NH; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl and C2-C10 alkynyl; (b) a radical initiator; and (c) optionally, a diluent monomer having a structure represented by a formula:

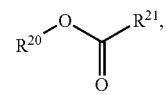

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl.

In one aspect, disclosed are methods of making a polymer network, the method comprising polymerizing a mixture comprising: (a) a monomer having a structure represented by a formula:

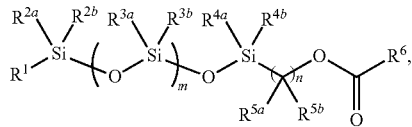

wherein m is an integer selected from 5 to 300; wherein n is an integer selected from 0, 1, 2, 3, 4, and 5; wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$; wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl; wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; wherein each of $R^{5a}$ and $R^{5b}$ is independently selected from hydrogen and C1-C10 alkyl; and wherein $R^6$ is selected from C2-C10 alkenyl and C2-C10 alkynyl; and (b) a radical initiator.

In one aspect, each occurrence of m is an integer independently selected from 5 to 300. In a further aspect, each occurrence of m is an integer independently selected from 5 to 275. In a still further aspect, each occurrence of m is an integer independently selected from 5 to 250. In yet a further aspect, each occurrence of m is an integer independently selected from 5 to 225. In an even further aspect, each occurrence of m is an integer independently selected from 5 to 200. In a still further aspect, each occurrence of m is an integer independently selected from 5 to 175. In yet a further aspect, each occurrence of m is an integer independently selected from 5 to 150. In an even further aspect, each occurrence of m is an integer independently selected from 5 to 125. In a still further aspect, each occurrence of m is an integer independently selected from 5 to 100. In yet a further aspect, each occurrence of m is an integer independently selected from 5 to 75. In an even further aspect, each occurrence of m is an integer independently selected from 5 to 50. In a still further aspect, each occurrence of m is an integer independently selected from 5 to 25.

In one aspect, each occurrence of p is an integer independently selected from 2 to 800. In a further aspect, each occurrence of p is an integer independently selected from 2 to 700. In a still further aspect, each occurrence of p is an integer independently selected from 2 to 600. In yet a further aspect, each occurrence of p is an integer independently selected from 2 to 500. In an even further aspect, each occurrence of p is an integer independently selected from 2 to 400. In a still further aspect, each occurrence of p is an integer independently selected from 2 to 300. In yet a further aspect, each occurrence of p is an integer independently selected from 2 to 200. In an even further aspect, each occurrence of p is an integer independently selected from 2 to 100.

In one aspect, each occurrence of m is an integer independently selected from 5 to 300 and each occurrence of p is an integer independently selected from 2 to 800. In a further aspect, each occurrence of m is an integer independently selected from 5 to 275 and each occurrence of p is an integer independently selected from 2 to 700. In a still further aspect, each occurrence of m is an integer independently selected from 5 to 250 and each occurrence of p is an integer independently selected from 2 to 600. In yet a further aspect, each occurrence of m is an integer independently selected from 5 to 225 and each occurrence of p is an integer independently selected from 2 to 500. In an even further aspect, each occurrence of m is an integer independently selected from 5 to 200 and each occurrence of p is an integer independently selected from 2 to 400. In a still further aspect, each occurrence of m is an integer independently selected from 5 to 175 and each occurrence of p is an integer independently selected from 2 to 50. In yet a further aspect, each occurrence of m is an integer independently selected from 5 to 150 and each occurrence of p is an integer independently selected from 2 to 100. In an even further aspect, each occurrence of m is an integer independently selected from 5 to 200 and each occurrence of p is an integer independently selected from 2 to 200.

In a further aspect, the method further comprises reacting the mixture with a catalytically effective amount of a radical initiator. Examples of radical initiators include, but are not limited to, diethyl meso-2,5-dibromoadipate, dimethyl 2,6-dibromoheptanedioate, ethylene glycol bis(2-bromopropionate), ethylene bis(2-bromoisobutyrate), ethylene glycol mono-2-bromopropionate, trimethylolpropane tris(2-bromopropionate), pentaerythritol tetrakis (2-bromopropionate), 2,2-dichloacetophenone, methyl 2-bromopropionate, methyl 2-chloropropionate, N-chloro-2-pyrrolidinone, N-bromosuccinimide, polyethylene glycol bis(2-bromopropionate), polyethylene glycol mono(2-bromopropionate), 2-bromopropionitrile, dibromochloromethane, 2,2-dibromo-2-cyanoacetamide, α,α'-dibromo-meta-xylene, α,α'-dibromo-para-xylene, α,α'-dichloro-para-xylene, 2-bromopropionic acid, methyl trichloroacetate, para-tolunesulfonyl chloride, biphenyl-4,4'-disulfonyl chloride, diphenylether-4,4'-disulfonylchloride bromoform, and iodoform carbon tetrachloride, or a mixture thereof. Thus, in various aspects, the radical initiator is ethylene bis(2-bromoisobutyrate).

In a further aspect, the radical initiator is an alkyl halide. In a still further aspect, the alkyl halide is an alkyl monohalide. In yet a further aspect, the alkyl halide is an alkyl polyhalide. In an even further aspect, the alkyl halide is an alkyl dihalide.

In a further aspect, the radical initiator is a photoinitiator.

In a further aspect, the catalytically effective amount of the radical initiator is of from about 25 mol % to about 250 mol %. In a still further aspect, the catalytically effective amount of the radical initiator is of from about 25 mol % to about 200 mol %. In yet a further aspect, the catalytically effective amount of the radical initiator is of from about 25 mol % to about 150 mol %. In an even further aspect, the catalytically effective amount of the radical initiator is of from about 25 mol % to about 100 mol %. In a still further aspect, the catalytically effective amount of the radical initiator is of from about 25 mol % to about 50 mol %. In an even further aspect, the catalytically effective amount of the radical initiator is of from about 50 mol % to about 250 mol %. In a still further aspect, the catalytically effective amount of the radical initiator is of from about 100 mol % to about 250 mol %. In yet a further aspect, the catalytically effective amount of the radical initiator is of from about 150 mol % to about 250 mol %. In an even further aspect, the catalytically effective amount of the radical initiator is of from about 200 mol % to about 250 mol %. In a still further aspect, the catalytically effective amount of the radical initiator is of from about 50 mol % to about 200 mol %. In yet a further aspect, the catalytically effective amount of the radical initiator is of from about 75 mol % to about 175 mol %. In an even further aspect, the catalytically effective amount of the radical initiator is of from about 100 mol % to about 150 mol %. In a still further aspect, the catalytically effective amount of the radical initiator is of from about 50 mol % to about 200 mol %.

In a further aspect, the method further comprises reacting the mixture with a catalytically effective amount of a transition metal catalyst. Examples of transition metal catalysts include, but are not limited to, copper catalysts and iron catalysts.

In a further aspect, the transition metal catalyst is a copper catalyst. Examples of copper catalysts include, but are not limited to, copper (0), copper (I) sulfide, copper (I) telluride, copper (I) selenide, copper (I) chloride, copper (II) chloride, copper (I) bromide, and copper (II) bromide, or a mixture thereof.

In a further aspect, the catalytically effective amount of the transition metal catalyst is of from about 0.001 mol % to about 0.2 mol %. In a still further aspect, the catalytically effective amount of the transition metal catalyst is of from about 0.001 mol % to about 0.15 mol %. In yet a further aspect, the catalytically effective amount of the transition metal catalyst is of from about 0.001 mol % to about 0.1 mol %. In an even further aspect, the catalytically effective amount of the transition metal catalyst is of from about 0.001 mol % to about 0.05 mol %. In a still further aspect, the catalytically effective amount of the transition metal catalyst is of from about 0.001 mol % to about 0.01 mol %. In yet a further aspect, the catalytically effective amount of the transition metal catalyst is of from about 0.001 mol % to about 0.005 mol %. In an even further aspect, the catalytically effective amount of the transition metal catalyst is of from about 0.005 mol % to about 0.2 mol %. In a still further aspect, the catalytically effective amount of the transition metal catalyst is of from about 0.01 mol % to about 0.2 mol %. In yet a further aspect, the catalytically effective amount of the transition metal catalyst is of from about 0.05 mol % to about 0.2 mol %. In an even further aspect, the catalytically effective amount of the transition metal catalyst is of from about 0.1 mol % to about 0.2 mol %. In a still further aspect, the catalytically effective amount of the transition metal catalyst is of from about 0.15 mol % to about 0.2 mol %. In yet a further aspect, the catalytically effective amount of the transition metal catalyst is of from about 0.005 mol % to about 0.1 mol %. In an even further aspect, the catalytically effective amount of the transition metal catalyst is of from about 0.01 mol % to about 0.05 mol %. In a still further aspect, the catalytically effective amount of the transition metal catalyst is of from about 0.005 mol % to about 0.1 mol %.

In a further aspect, the method further comprises reacting the mixture with a ligand. Examples of ligands include, but are not limited to, 2,2'-bipyridine (byp), 4,4'-di-5-nonyl-2,2'-bipyridine (dNbpy), 4,4',4''-tris(5-nonyl)-2,2':6',2''-terpyridin (tNtpy), N,N,N',N',N''-pentamethyldiethylenetriamine (PMDETA), 1,1,4,7,10,10-hexamethyltriethylenetetramine, tris(2-dimethylaminoethyl)amine, N,N-bis(2-pyridylmethyl)octadecylamine, N,N,N',N'-tetra[(2-pyridapmethyl)ethylenediamine, tris[(2-pyridyl)methyl]amine, tris(2-aminoethyl)amine (Me$_6$TREN), tris(2-bis(3-butoxy-3-oxopropyl)aminoethyl)amine, tris(2-bis(3-(2-ethylhexoxy)-3-oxopropyl)aminoethyl)amine, and tris(2-bis(3-dodecoxy-3-oxopropyl)aminoethyl)amine, or a mixture thereof. Thus, in various aspects, the ligand is Me$_6$TREN.

D. ARTICLES

In one aspect, the invention relates to articles comprising the disclosed compositions. In a further aspect, the present invention contemplates the use of the disclosed compositions in the manufacture of certain items such as articles.

1. Tissue Scaffolds

In one aspect, disclosed are tissue scaffolds comprising the disclosed compositions. In a further aspect, the tissue scaffolds are two- or three-dimensional. In a still further aspect, the tissue scaffolds are two-dimensional. In yet a further aspect, the tissue scaffolds are three-dimensional.

2. Implants

In one aspect, disclosed are implants comprising the disclosed compositions.

E. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The Examples are provided herein to illustrate the invention, and should not be construed as limiting the invention in any way. Examples are provided herein to illustrate the invention and should not be construed as limiting the invention in any way.

1. Synthesis of PDMS Bottlebrush Elastomers Using ATRP

Methacryloxypropyl terminated polydimethylsiloxane (DMS-R11) as cross-linker and monomethacryloxypropyl terminated polydimethylsiloxane (5.0 g, 5.0 mmol) (MCR-M11) as monomer with molar ratio of 0.005, 0.01, 0.02, and 0.04, and ethylene bis(2-bromoisobutyrate) (1.80 mg, 0.005 mmol), Me$_6$TREN (2.0 µL, 0.01 mmol) and p-xylene (4.0 mL) were added to an oxygen free flask. CuCl (1.0 mg, 0.01 mmol) was added while the flask was purging with nitrogen and thermostated at 40° C. to start the polymerization. The formed polymer networks were purified using a Soxhlet extraction apparatus with chloroform and dried at atmospheric pressure and room temperature and then finally dried in a vacuum at 60° C. overnight. This resulted in a gel fraction of 95% measured as a mass ratio of dried and as-prepared networks.

2. Synthesis of PDMS Bottlebrush Elastomers Using Photopolymerization

Networks were prepared by a one-step polymerization of monomethacryloxypropyl terminated poly(dimethylsiloxane) (MCR-M11, 1000 g/mol, M12 2000 g/mol) with different molar ratios of cross-linker (DMS-R18 and DMS-R22 for making elastomer with M11 and M12, respectively) as listed in Table 1 below. The initial reaction mixture contained 57 wt % of the monomers (M11 or M12), 32 mg of phenylbis(2,4,6-trimethyl-benzoyl)phosphine oxide as photo-initiator, and 9 g of p-xylene as a solvent. The mixtures of monomer (M11 or M12), cross-linker, and photoinitiator in p-xylene were degassed by nitrogen bubbling for 30 minutes. For preparation of an elastomer film, the mixtures were injected between two glass plates with a 0.25, 0.5, 1.0, and 3 mm PDMS spacer. The elastomer films were then allowed to polymerize at room temperature under N$_2$ using a UV cross-linking chamber with 365 nm UV lamp for 12 hrs (0.1 mW/cm$^{-2}$, 10 cm distance). Elastomer tubes were prepared by injection of the above mixtures between two concentric cylindrical molds with inner and outer diameters of 9.5 mm and 12.5 mm, respectively. The cylinders were then allowed to polymerize at similar condition as explained for elastomer film preparation. Films and tubes swelled in chloroform in a glass petri dish. The chloroform was replaced with fresh chloroform every 8 hrs to remove unreacted monomers. Next, the samples were de-swelled with ethanol and dried in an oven at 50° C. The conversion of monomers to elastomers (gel fraction) was measured as being between 87 to 95 wt % as detailed below.

TABLE 1

| Sample | $n_{sc}^a$ | $n_x^b$ | G (kPa)$^d$ | $\beta^e$ | $G_0$ (kPa)$^f$ | $\lambda_{max}^g$ | $\lambda_{max, ex}^h$ |
|---|---|---|---|---|---|---|---|
| Series 1 | 14 | 400 | 1.3 | 0.09 | 1.5 | 3.3 ± 0.2 | 2.9 |
| | 14 | 200 | 2.8 ± 0.1 | 0.11 ± 0.01 | 3.3 | 3.0 ± 0.2 | 2.7 |

TABLE 1-continued

| Sample | $n_{sc}{}^a$ | $n_x{}^b$ | G (kPa)$^d$ | $\beta^e$ | $G_0$ (kPa)$^f$ | $\lambda_{max}{}^g$ | $\lambda_{max,\,ex}{}^h$ |
|---|---|---|---|---|---|---|---|
| | 14 | 100 | 6.2 ± 0.1 | 0.17 ± 0.01 | 8.1 | 2.4 ± 0.1 | 2.1 |
| | 14 | 67 | 10 ± 0.4 | 0.23 ± 0.01 | 15.0 | 2.1 ± 0.1 | 1.9 |
| | 14 | 50 | 13.5 ± 0.5 | 0.28 ± 0.02 | 22.0 | 1.9 ± 0.1 | 1.5 |
| Series 2 | 28 | 200 | 1.1 | 0.23 | 1.5 | 2.1 | 2.4 |
| | 28 | 100 | 1.8 | 0.25 | 2.7 | 2.0 | 2.2 |
| | 28 | 67 | 2.0 | 0.3 | 3.4 | 1.8 | 1.9 |

$^a$degree of polymerization (DP) of the sidechain;
$^b$DP of the backbone between crosslinks calculated from the molar fraction of the difunctional cross-linker;
$^c$mole fraction of cross-linker used in the synthesis;
$^d$structural shear modulus;
$^e$extension of network strands comprising bottlebrush elastomers were determined by fitting tensile stress-strain curves in FIG. 3A with Eq. 1 below;
$^f$apparent shear modulus;
$^g$maximum uniaxial extension;
$^h$experimentally measured elongation at break.

used in the synthesis; $^d$ structural shear modulus; $^e$ extension of network strands comprising bottlebrush elastomers were determined by fitting tensile stress-strain curves in FIG. 3A with Eq. 1 below; $^f$ apparent shear modulus; $^g$ maximum uniaxial extension; $^h$ experimentally measured elongation at break.

$$\sigma_{true}(\lambda) = \frac{G}{3}(\lambda^2 - \lambda^{-1})\left[1 + 2\left(1 - \frac{\beta I_1(\lambda)}{3}\right)^{-2}\right] \quad (1)$$

3. Synthesis of PDMS Comb Elastomers Using Photopolymerization

Networks were prepared by a one-step polymerization of monomethacryloxypropyl terminated poly(dimethylsiloxane) (MCR-M11, 1000 g/mol, M12 2000 g/mol) and an adequate amount of diluent monomer such as butyl acrylate (Diluent monomer/M11 mole ratio is 1 to 100) with different molar ratios of cross-linker (DMS-R18 and DMS-R22 for making elastomer with M11 and M12, respectively) as listed in Table 2 below. The initial reaction mixture contained 57 wt % of the monomers (M11 or M12), 32 mg of phenylbis (2,4,6-trimethyl-benzoyl)phosphine oxide as photo-initiator, and 9 g of p-xylene as a solvent. The mixtures of monomer (M11 or M12), cross-linker, and photoinitiator in p-xylene were degassed by nitrogen bubbling for 30 minutes. For preparation of an elastomer film, the mixtures were injected between two glass plates with a 0.25, 0.5, 1.0, and 3 mm PDMS spacer.

TABLE 2

| $n_g$ | G (Pa) | Lambda | Toughness (MPa) | Tensile Strength (Mpa) |
|---|---|---|---|---|
| 2 | 2620 ± 55 | 5.6 ± 0.6 | 1.8 | 0.2 |
| 4 | 8200 ± 281 | 6.1 ± 0.7 | 8.2 | 0.6 |
| 8 | 14300 ± 667 | 6.8 ± 0.5 | 23.7 | 1.3 |
| 16 | 20100 ± 709 | 7.7 ± 0.7 | 29.3 | 2.3 |
| 32 | 23600 ± 388 | 7.61 ± 0.2 | 64.4 | 2.7 |
| 64 | 26500 ± 357 | 8.18 ± 0.3 | 97.4 | 3.5 |

4. Modulus and Deformation of PDMS Bottlebrush Elastomers

A series of poly(dimethylsiloxane) (PDMS) bottlebrush and comb elastomers having a degree of polymerization (DP) of side chains ($n_{sc}$) of 14 and a grafting density ($n_g^{-1}$) of 1 to 64 and different crosslinking densities were prepared as described above using atom-transfer radical polymerization (ATRP) or photopolymerization of mono-diluent monomer and di-functional macromonomers. The following dimensions were predicted for the entanglement strand of this bottlebrush architecture: $n_{e,bb} \cong 2900$ (backbone DP) and $M_e \cong 2.9 \times 10^6$ g/mol (molar mass). Without wishing to be bound by theory, melts comprised of these PDMS bottlebrushes are expected to exhibit an entanglement modulus of $G_e \cong 800$ Pa, which (within a numerical prefactor on the order of 1) corresponds to a lower limit for elastic modulus of PDMS bottlebrush elastomers with $n_{sc} = 14$ and $n_g^{-1} = 1$. In agreement with this prediction, FIG. 1A shows a consistent modulus decrease down to the $10^2$ Pa range with decreasing crosslinking density, which is ca. $10^3$ times softer than the entanglement modulus of linear PDMS melts ($G_{e,lin} \cong 200$ kPa).

Furthermore, without wishing to be bound by theory, the effective dilution of chain entanglements in bottlebrush melts may not only reduce the elastic modulus, but may also allow for higher deformation limits of bottlebrush elastomers. To test this prediction, samples of PDMS bottlebrush elastomers and poly(acrylamide) (PAM) hydrogels containing similar modulus and fraction of covalently cross-linked material were subjected to uniaxial compression. As evident from the true stress measurements illustrated in FIG. 1B, the bottlebrush elastomers exhibit superior deformability with elastomer-like compression ratio of $\lambda^{-1} = L_0/L \cong 9$ while possessing similar modulus to swollen gel counterparts (2000 Pa). FIG. 1C illustrates a visual comparison of the compressibility of a PAM hydrogel with a poly(dimethylsiloxane) (PDMS) bottlebrush elastomer, in which the volume fraction of backbone segments is similar to the gel fraction of the hydrogel.

Referring to FIG. 1A, PDMS bottlebrush elastomers displaying moduli on the order of 100 to 1000 times softer than linear PDMS entanglement modulus as a function of crosslinker/macromonomer fraction are shown.

Figure 1B:
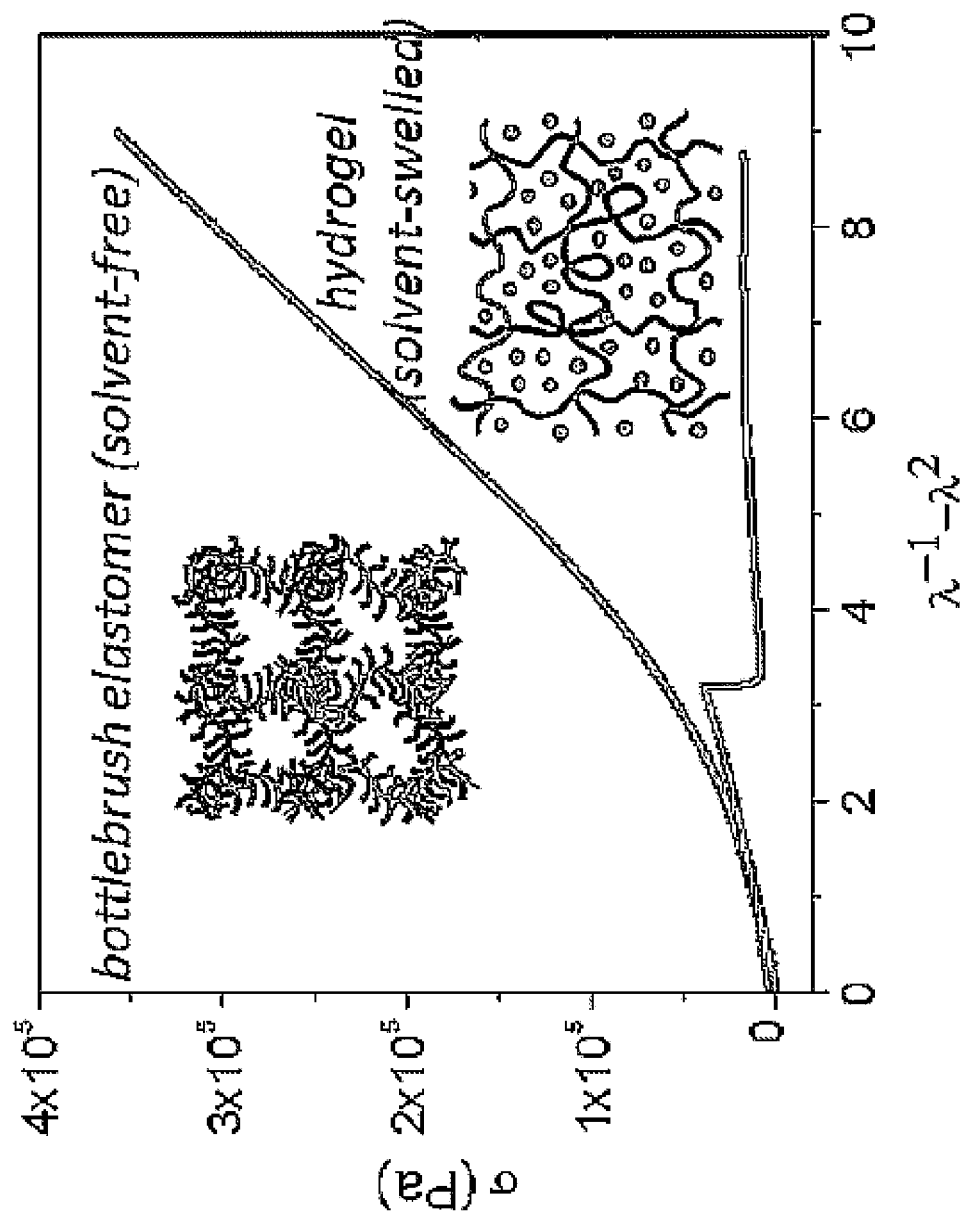
Figure 1C:
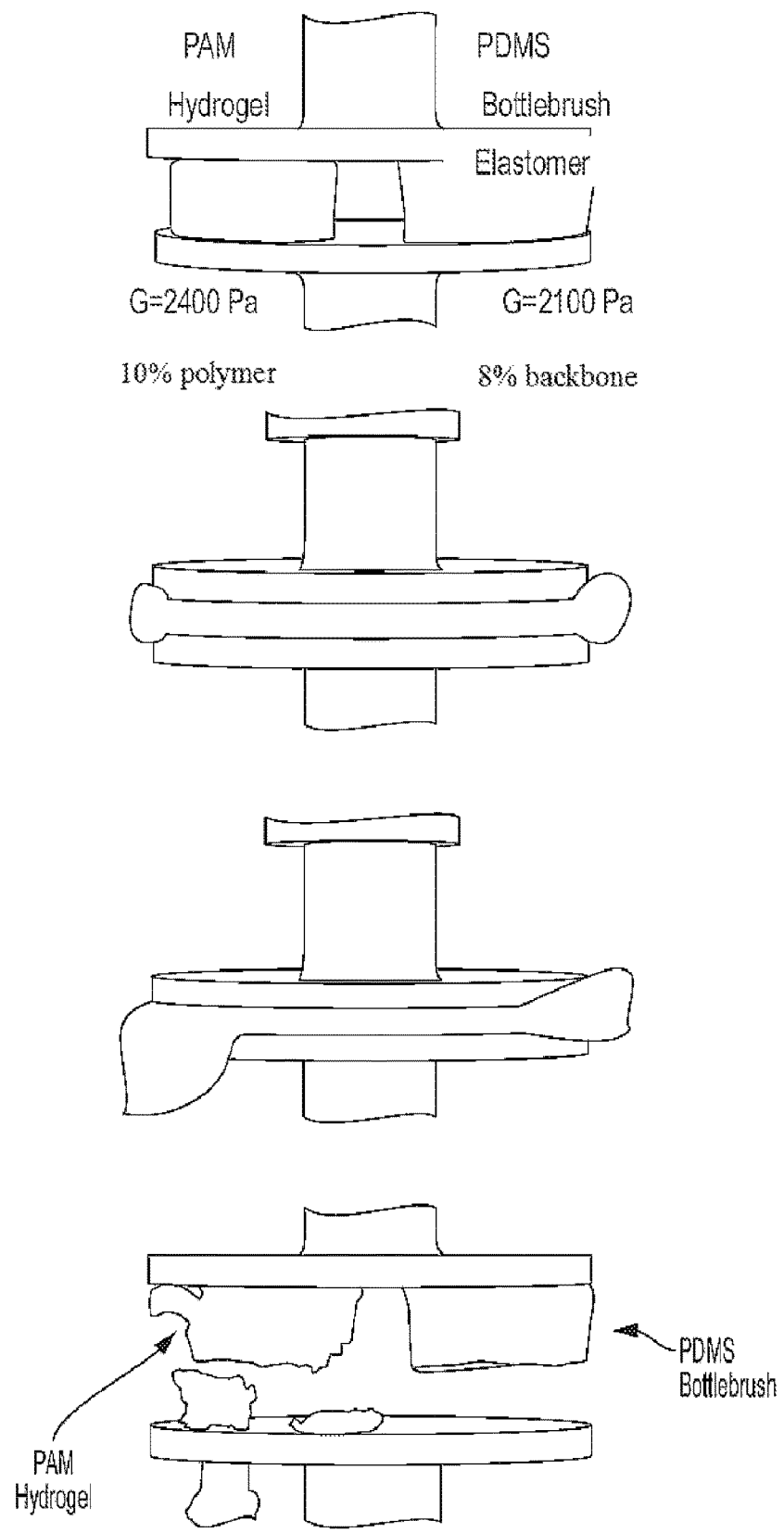
Figure 2:
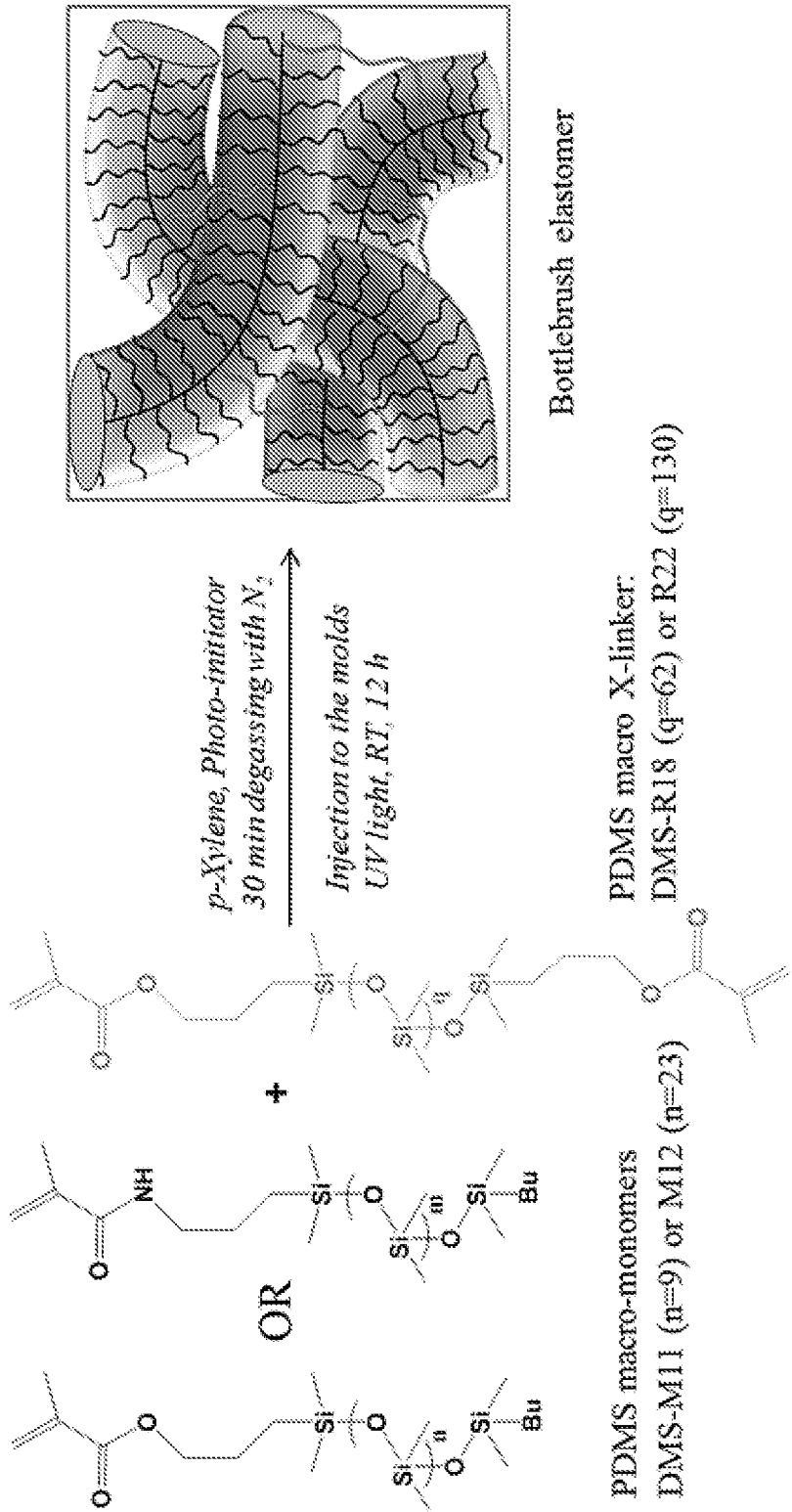
FIG. 2 shows a representative synthesis of bottlebrush elastomers by photo initiated radical polymerization of monofunctional macromonomers in the presence of a di-functional crosslinker.
Figure 4:
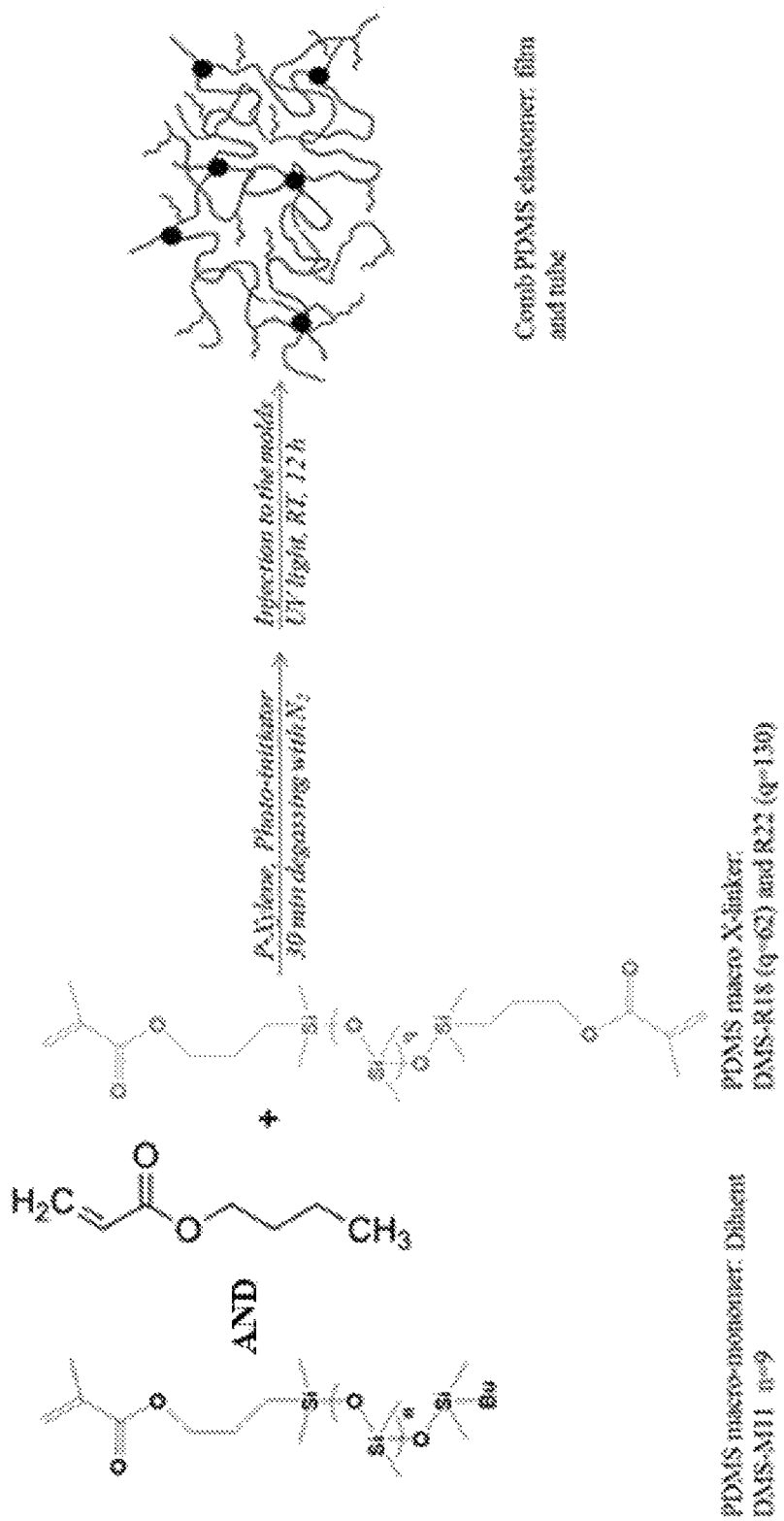
FIG. 4 shows a representative synthesis of comb elastomers by photo initiated radical polymerization of monofunctional macromonomers in the presence of a di-functional crosslinker.
Figure 5A:
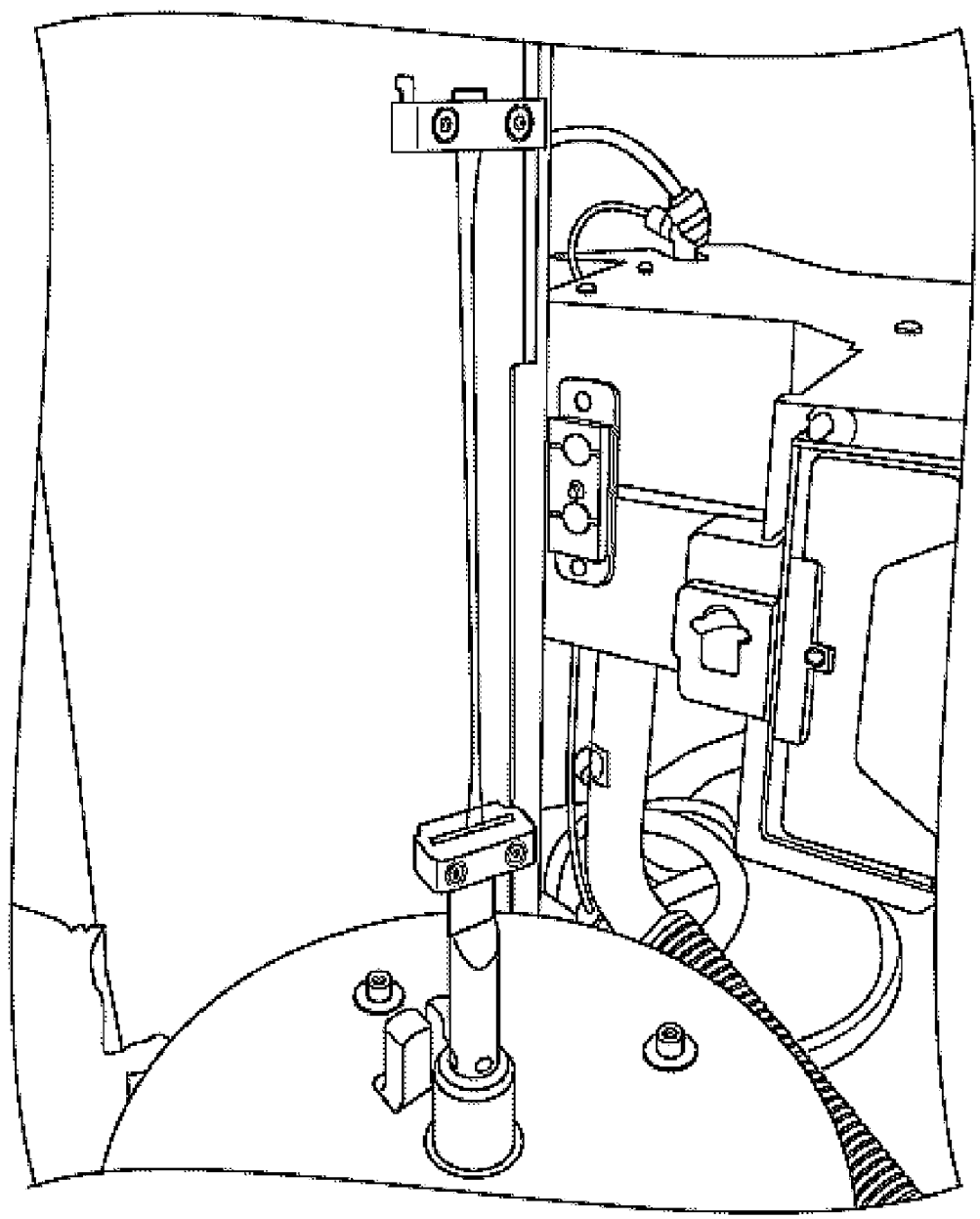
FIG. 5A shows a representative image illustrating the super extensibility of a comb elastomer.
Figure 5B:
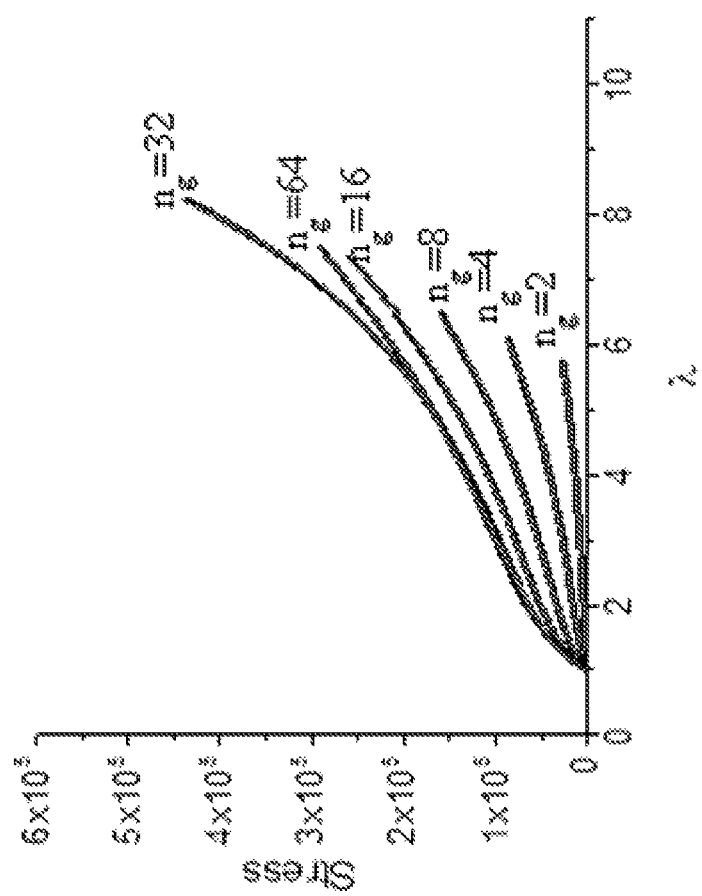
FIG. 5B shows representative data illustrating true stress as a function of uniaxial extension upon tensile deformation of comb elastomers with different grafting density and same cross-link densities ($n_x^{-1}$).

Referring to FIG. 1B, the compression of a PDMS bottlebrush elastomer and PAM hydrogel of similar modulus and fraction of cross-linked material are shown. The bottlebrush elastomer exhibits considerably higher fracture energy than the swollen gel counterparts. Bottlebrush elastomers display considerably higher compressibility (compression ratio at break $\lambda^{-1} = L_0/L \cong 9$ for bottlebrushes and 3 for PAM gel) for similar modulus and fraction of cross-linked material.

Referring to FIG. 1C, the compression of PAM hydrogel with network modulus 2100 Pa (by shear) and 10% by mass polymer compared with PDMS bottlebrush elastomer modulus 2400 PA (by shear) and 8% cross-linked backbone by mass is shown.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising a polymer network, wherein the polymer network comprises the reaction product of:
   a) a monomer having a structure represented by a formula:

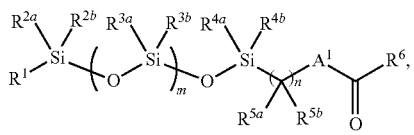

wherein m is an integer selected from 5 to 300;
wherein n is an integer selected from 0, 1, 2, 3, 4, and 5;
wherein $A^1$ is selected from O and NH;
wherein each of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$;
   wherein each occurrence of $Cy^1$, when present, is independently selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl;
   wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl;
wherein each of $R^{5a}$ and $R^{5b}$ is independently selected from hydrogen and C1-C10 alkyl; and
wherein $R^6$ is C2-C10 alkenyl, wherein the unsaturated bond is alpha to the carbonyl; and
   b) a cross-linker having a structure represented by a formula:

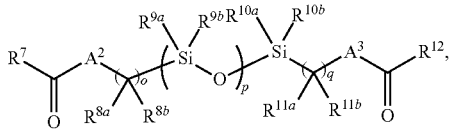

wherein each of o and q is independently an integer selected from 0, 1, 2, 3, 4, and 5;
wherein p is an integer selected from 2 to 800;
wherein each of $A^2$ and $A^3$ is selected from O and NH;
wherein each of $R^7$ and $R^{12}$ is independently C2-C10 alkenyl, wherein the unsaturated bond is alpha to the carbonyl; and
wherein each of $R^{9a}$, $R^{9b}$, $R^{10a}$, and $R^{10b}$ is independently selected from C1-C10 alkyl, $Cy^2$, and $Ar^2$;
   wherein each occurrence of $Cy^2$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl;
   wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and
wherein each of $R^{8a}$, $R^{8b}$, $R^{11a}$, and $R^{11b}$ is independently selected from hydrogen and C1-C10 alkyl,
wherein the polymer network has a rubbery plateau in the modulus of elasticity of less than about 500 Pa, and/or
wherein the polymer network has a maximum extendibility of at least about 50.

2. The composition of claim 1, wherein m is an integer selected from 5 to 200 and p is an integer selected from 2 to 200.

3. The composition of claim 1, wherein the monomer is monomethacryloxypropyl terminated polydimethylsiloxane.

4. The composition of claim 1, wherein the cross-linker is methacryloxypropyl terminated polydimethylsiloxane.

5. The composition of claim 1, wherein the polymer network comprises the reaction product of the monomer, the crosslinker, and a radical initiator.

6. The composition of claim 1, wherein the reaction product further comprises at least one residue of a diluent monomer having a structure represented by a formula:

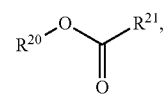

wherein $R^{20}$ is selected from C1-C10 alkyl, $Cy^1$, and $Ar^1$; and
wherein $R^{21}$ is C2-C10 alkenyl, wherein the unsaturated bond is alpha to the carbonyl.

7. The composition of claim 6, wherein the diluent monomer is butyl acrylate.

8. The composition of claim 6, wherein the monomer is monomethacryloxypropyl terminated polydimethylsiloxane, the cross-linker is methacryloxypropyl terminated polydimethylsiloxane, and the diluent monomer is butyl acrylate.

9. A composition comprising a polymer network, wherein the polymer network consist of a residue having a structure represented by a formula:

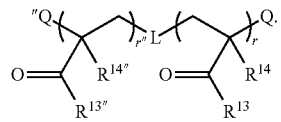

wherein each occurrence of $R^{13}$ is a structure represented by a formula selected from:

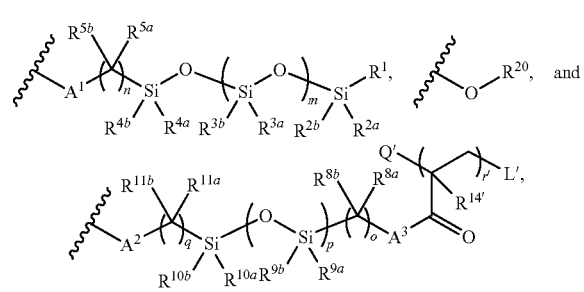

provided that at least one occurrence of $R^{13}$ is a structure represented by a formula selected from:

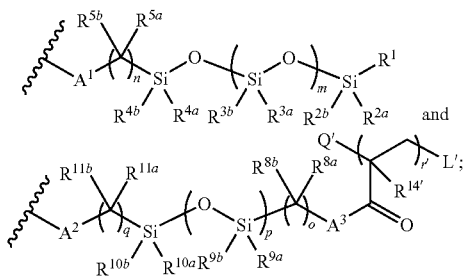
and wherein each occurrence of m is an integer independently selected from 5 to 300;
wherein each occurrence of n is an integer independently selected from 0, 1, 2, 3, 4, and 5;
wherein each occurrence of o and each occurrence of q is independently an integer selected from 0, 1, 2, 3, 4, and 5;
wherein each occurrence of p is an integer independently selected from 2 to 800;
wherein each occurrence of r and r' is an integer independently selected from 2 to 800;
wherein each occurrence of $A^1$, $A^2$, and $A^3$ is independently selected from O and NH;
wherein each occurrence of L and L' is independently a residue of a radical initiator;
wherein each occurrence of Q and Q' is independently a residue of a quenching agent;
wherein each occurrence of $R^1$, $R^{2a}$, $R^{2b}$, $R^{3a}$, $R^{3b}$, $R^{4a}$, and $R^{4b}$ is independently selected from C1-C10 alkyl, $Cy^1$, and $Ar^1$;
  wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl;
  wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl;
wherein each occurrence of $R^{5a}$ and $R^{5b}$ is independently selected from hydrogen and C1-C10 alkyl;
wherein each occurrence of $R^{9a}$, $R^{9b}$, $R^{10a}$, and $R^{10b}$ is independently selected from C1-C10 alkyl, $Cy^2$, and $Ar^2$;
  wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl;
  wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl;
wherein each occurrence of $R^{8a}$, $R^{8b}$, $R^{11a}$, and $R^{11b}$ is independently selected from hydrogen and C1-C10 alkyl;
wherein each occurrence of $R^{14}$ and $R^{14'}$ is independently selected from hydrogen and C1-C10 alkyl;

wherein each occurrence of $R^{20}$ is independently selected from C1-C10 alkyl, $Cy^1$, and $Ar^1$;
wherein each occurrence of r" is an integer independently selected from 2 to 800;
wherein each occurrence of Q" is independently a residue of a quenching agent;
wherein each occurrence of $R^{13"}$ is a structure represented by a formula selected from:

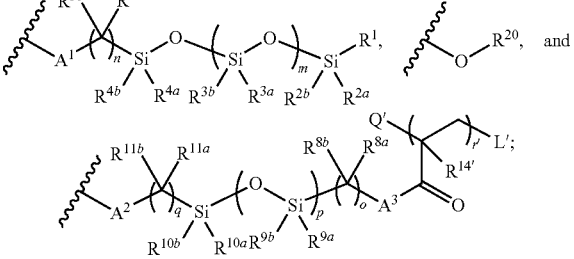

wherein each occurrence of $R^{14"}$ is independently selected from hydrogen and C1-C10 alkyl,
wherein the polymer network has a rubbery plateau in the modulus of elasticity of less than about 500 Pa, and/or
wherein the polymer network has a maximum extendibility of at least about 50.

10. The composition of claim 9, wherein each occurrence of m is an integer independently selected from 5 to 200, each occurrence of p is an integer independently selected from 2 to 200, and each occurrence of r and r' is an integer independently selected from 4 to 200.

11. The composition of claim 9, wherein the residue of a radical initiator is a structure represented by a formula:

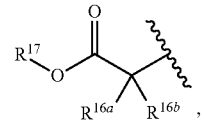

wherein each of $R^{16a}$ and $R^{16b}$ is independently selected from hydrogen and C1-C10 alkyl;
wherein $R^{17}$ is selected from C1-C8 alkyl, —(C1-C8 alkyl)-O—(C=O)(C1-C8 alkyl), and $Cy^3$ and substituted with 0 or 1 group selected from —OH, —CN, —NO$_2$, and —N$_3$; and
  wherein $Cy^3$, when present, is selected from cycle and heterocycle and substituted with 0, 1, or 2 groups independently selected from —OH, —CN, —NO$_2$, C1-C4 alkyl, C1-C4 alkoxy, and C1-C4 dialkylaminomethyl.

12. The composition of claim 9, wherein the residue of a quenching agent is selected from hydrogen, bromine, chlorine, —OH, —N$_3$, and C2-C4 alkenyl.

13. The composition of claim 9, wherein at least one occurrence of $R^{13}$ is a structure having a formula:

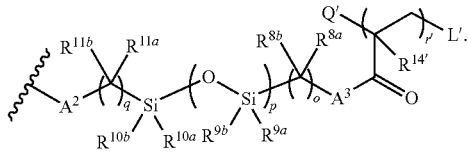

14. The composition of claim 9, wherein at least one occurrence of $R^{13}$ is a structure having a formula:

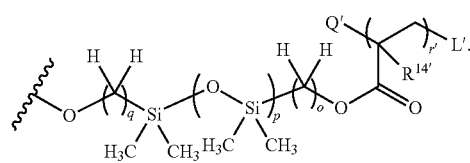

15. A method of making a polymer network, the method comprising polymerizing a mixture comprising:

a) a monomer having a structure represented by a formula:

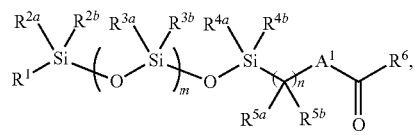

wherein m is an integer selected from 5 to 300;

wherein n is an integer selected from 0, 1, 2, 3, 4, and 5;

wherein $A^1$ is selected from O and NH;

wherein each of $R^1$, $R^2$, $R^{2b}$, $R^{3a}$, $R^{3b}$, $R^{4a}$, and $R^{4b}$ is independently selected from C1-C10 alkyl, $Cy^1$, and $Ar^1$;

wherein each occurrence of $Cy^1$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl;

wherein each occurrence of $Ar^1$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl;

wherein each of $R^5$ and $R^{5b}$ is independently selected from hydrogen and C1-C10 alkyl; and wherein $R^6$ is selected from C2-C10 alkenyl, wherein the unsaturated bond is alpha to the carbonyl; and b) a cross-linker having a structure represented by a formula:

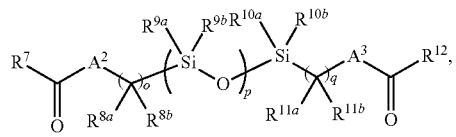

wherein each of o and q is independently an integer selected from 0, 1, 2, 3, 4, and 5;

wherein p is an integer selected from 2 to 800;

wherein each of $A^2$ and $A^3$ is selected from O and NH;

wherein each of $R^7$ and $R^{12}$ is independently C2-C10 alkenyl, wherein the unsaturated bond is alpha to the carbonyl; and wherein each of $R^{9a}$, $R^{9b}$, $R^{10a}$, and $R^{10b}$ is independently selected from C1-C10 alkyl, $Cy^2$, and $Ar^2$;

wherein each occurrence of $Cy^2$, when present, is independently selected from cycle and heterocycle substituted with 0, 1, or 2 groups independently selected from —OH, —CN, —NO$_2$, C1-C4 alkyl, C1-C4 alkoxy, and C1-C4 dialkylaminomethyl;

wherein each occurrence of $Ar^2$, when present, is independently selected from aryl and heteroaryl and substituted with 0, 1, or 2 groups independently selected from —OH, —CN, —NO$_2$, C1-C4 alkyl, C1-C4 alkoxy, and C1-C4 dialkylaminomethyl; and wherein each of $R^{8a}$, $R^{8b}$, $R^{11a}$, and $R^{11b}$ is independently selected from hydrogen and C1-C10 alkyl; and c) optionally, a diluent monomer having a structure represented by a formula:

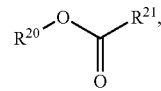

wherein $R^{20}$ is selected from C1-C10 alkyl, $Cy^1$, and $Ar^1$; and wherein $R^{21}$ is C2-C10 alkenyl, wherein the unsaturated bond is alpha to the carbonyl, wherein the polymer network has a rubbery plateau in the modulus of elasticity of less than about 500 Pa, and/or wherein the polymer network has a maximum extendibility of at least about 50.

16. The method of claim 15, further comprising reacting the mixture with a catalytically effective amount of a radical initiator.

17. The method of claim 16, wherein the radical initiator is a photoinitiator.

* * * * *